United States Patent
Capote et al.

(10) Patent No.: US 8,252,244 B2
(45) Date of Patent: Aug. 28, 2012

(54) METHOD AND APPARATUS OF TREATING WASTE

(75) Inventors: Jose A. Capote, Hillsdale, NJ (US); Deepak Shah, Gujarat (IN); Parameswaran Venugopal, Trivandrum (IN); Hsien E. Wu, Oakland, CA (US); Daniel Ripes, Chicago, IL (US); Joseph A. Rosin, Naples, FL (US)

(73) Assignee: PEAT International, Inc., Northbrook, IL (US)

( * ) Notice: Subject to any disclaimer, the term of this patent is extended or adjusted under 35 U.S.C. 154(b) by 728 days.

(21) Appl. No.: 12/364,613

(22) Filed: Feb. 3, 2009

(65) Prior Publication Data

US 2009/0200180 A1 Aug. 13, 2009

Related U.S. Application Data

(60) Provisional application No. 61/027,117, filed on Feb. 8, 2008.

(51) Int. Cl.
*B01J 19/12* (2006.01)

(52) U.S. Cl. ............ 422/186.26; 422/186; 422/186.21

(58) Field of Classification Search ............ 422/186, 422/186.21, 186.26; 204/164, 178; 110/346
See application file for complete search history.

(56) References Cited

U.S. PATENT DOCUMENTS

| | | | |
|---|---|---|---|
| 3,622,493 A | 11/1971 | Crusco | |
| 3,741,134 A | 6/1973 | Roberts et al. | |
| 3,779,182 A | 12/1973 | Camacho | |
| 3,780,674 A * | 12/1973 | Liu | 110/238 |
| 3,841,239 A | 10/1974 | Nakamura | |
| 3,875,357 A | 4/1975 | Foster et al. | |
| 4,181,504 A | 1/1980 | Camacho | |
| 4,326,842 A | 4/1982 | Adachi et al. | |
| 4,361,441 A | 11/1982 | Tylko | |
| 4,438,706 A | 3/1984 | Boday et al. | |
| 4,479,443 A | 10/1984 | Faldt et al. | |
| 4,508,040 A | 4/1985 | Santén et al. | |
| 4,615,285 A | 10/1986 | Bentell | |
| 4,635,573 A | 1/1987 | Santén | |
| 4,644,877 A | 2/1987 | Barton et al. | |
| 4,770,109 A | 9/1988 | Schlienger | |
| 4,831,944 A | 5/1989 | Durand et al. | |

(Continued)

FOREIGN PATENT DOCUMENTS

BE 1014965 A4 7/2004

(Continued)

OTHER PUBLICATIONS

Official Letter and Search Report, dated Mar. 31, 2011, for Taiwanese (R.O.C.) Patent Application No. 094108020 (and Translation).

(Continued)

*Primary Examiner* — Arlen Soderquist
*Assistant Examiner* — Christopher A Hixson
(74) *Attorney, Agent, or Firm* — Brinks Hofer Gilson & Lione

(57) ABSTRACT

A waste treatment system processes waste upon the application of energy. The system includes a vessel that has an open space that receives waste feedstock. At least two plasma electrodes are mounted to the vessel. An electrode movement control system may position the plasma electrodes to facilitate a pryolysis process to treat the waste feedstock.

15 Claims, 44 Drawing Sheets

U.S. PATENT DOCUMENTS

| | | | |
|---|---|---|---|
| 4,886,001 A | 12/1989 | Chang et al. | |
| 4,896,614 A | 1/1990 | Kulkarni | |
| 4,980,092 A | 12/1990 | Pineau et al. | |
| 4,989,522 A | 2/1991 | Cline et al. | |
| 4,998,486 A | 3/1991 | Dighe et al. | |
| 5,010,829 A | 4/1991 | Kulkarni | |
| 5,065,680 A | 11/1991 | Cheetham | |
| 5,090,340 A | 2/1992 | Burgess | |
| 5,095,828 A | 3/1992 | Holden et al. | |
| 5,108,718 A | 4/1992 | Dummersdorf | |
| 5,127,347 A | 7/1992 | Cheetham | |
| 5,134,946 A | 8/1992 | Poovey | |
| 5,143,000 A | 9/1992 | Camacho | |
| 5,206,879 A | 4/1993 | Moody et al. | |
| 5,222,448 A | 6/1993 | Morgenthaler et al. | |
| 5,280,757 A | 1/1994 | Carter et al. | |
| 5,319,176 A | 6/1994 | Alvi et al. | |
| 5,363,781 A | 11/1994 | Chang et al. | |
| 5,399,833 A | 3/1995 | Camacho | |
| 5,451,738 A | 9/1995 | Alvi et al. | |
| 5,497,710 A | 3/1996 | Camacho | |
| 5,534,659 A | 7/1996 | Springer et al. | |
| 5,541,386 A | 7/1996 | Alvi et al. | |
| 5,544,597 A | 8/1996 | Camacho | |
| 5,606,925 A | 3/1997 | Boen et al. | |
| 6,018,471 A * | 1/2000 | Titus et al. | 363/126 |
| 6,021,723 A | 2/2000 | Vallomy | |
| 6,153,158 A | 11/2000 | Flannery et al. | |
| 6,153,852 A | 11/2000 | Blutke et al. | |
| 6,155,182 A | 12/2000 | Tsangaris et al. | |
| 6,173,002 B1 | 1/2001 | Robert | |
| 6,182,585 B1 | 2/2001 | Gonopolsky et al. | |
| 6,215,678 B1 | 4/2001 | Titus et al. | |
| 6,222,153 B1 | 4/2001 | Wald | |
| 6,250,236 B1 | 6/2001 | Feizollahi | |
| 6,355,904 B1 * | 3/2002 | Batdorf et al. | 219/121.59 |
| 6,380,507 B1 | 4/2002 | Childs | |
| 6,388,226 B1 | 5/2002 | Smith et al. | |
| 6,514,469 B1 | 2/2003 | Kado et al. | |
| 6,551,563 B1 | 4/2003 | Kado et al. | |
| 6,576,807 B1 | 6/2003 | Brunelot et al. | |
| 6,630,113 B1 | 10/2003 | Surma | |
| 6,645,438 B1 | 11/2003 | Dubrovsky | |
| 6,763,772 B2 | 7/2004 | Gnedenko et al. | |
| 6,781,087 B1 | 8/2004 | Chism et al. | |
| 6,810,821 B2 | 11/2004 | Chan | |
| 6,817,388 B2 | 11/2004 | Tsangaris et al. | |
| 7,216,593 B2 | 5/2007 | Capote et al. | |
| 2002/0192030 A1 | 12/2002 | Almeida | |
| 2003/0024806 A1 | 2/2003 | Foret | |
| 2003/0048828 A1 | 3/2003 | Titus | |
| 2003/0167983 A1 | 9/2003 | Gnedenko et al. | |
| 2004/0159366 A1 | 8/2004 | Tsangaris et al. | |
| 2005/0070751 A1 | 3/2005 | Capote et al. | |
| 2005/0204969 A1 | 9/2005 | Capote et al. | |
| 2007/0199485 A1* | 8/2007 | Capote et al. | 110/250 |
| 2007/0267289 A1* | 11/2007 | Jabs et al. | 204/170 |

FOREIGN PATENT DOCUMENTS

| | | |
|---|---|---|
| EP | 0330872 | 9/1989 |
| EP | 0 469 737 A2 | 2/1992 |
| JP | 2001-289427 | 10/2001 |
| WO | WO 01/53434 A | 7/2001 |
| WO | WO 01/79774 A | 10/2001 |
| WO | WO 01/92784 A1 | 12/2001 |
| WO | WO 03/006927 A1 | 8/2003 |

OTHER PUBLICATIONS

Extended European Search Report, dated Mar. 10, 2011, for Patent Application No. 07709771.5.
Japanese Office Action, dated Aug. 17, 2010, Patent Application No. 2007-503967 (and Translation).
Rutberg, "Plasma pyrolysis of toxic waste", Plasma Phys. Control Fusion, vol. 45, pp. 957-969.
Scope of Supply, Terms and Conditions, and Notice to Proceed regarding NCKU PTDR System.
Rutberg et al., "The Technology and Execution of Plasmachemical Disinfection of Hazardous Medical Waste", IEEE Transactions on Plasma Science, vol. 30, No. 4, pp. 1445-1448.
Rutberg, "Some plasma environmental technologies developed in Russia", Plasma Sources Sci. Technol., vol. 11, pp. A159-A165.
Fauchais et al., "Thermal Plasmas", IEEE Transactions on Plasma Science, vol. 25, No. 6, pp. 1258-1280.
Municipal Solid Waste Feasibility of Gasification with Plasma ARC, Environmental Analyses, presented to EPRI Symposium Industrial Applications of Plasma, Palo Alto, CA.
Reference regarding PLASCON™ system.
Chinese Office Action, for Chinese Patent Application No. 200980104529.5, dated Dec. 28, 2011 (7 pgs.).
Translation of Examination Report for Taiwanese Patent Application No. 98103513, dated Apr. 30, 2012 (3 pgs.).
International Search Report for PCT Application No. PCT/2005/007904.
International Search Report for PCT Application No. PCT/US2004/031310.
Rutberg, "Plasma pyrolysis of toxic waste", Plasma Phys. Control Fusion, vol. 45, pp. 957-969, 2003.
Scope of Supply, Terms and Conditions, and Notice to Proceed regarding NCKU PTDR System, Submitted 2009.
Rutberg et al., "The Technology and Execution of Plasmachemical Disinfection of Hazardous, Medical Waste", IEEE Transactions on Plasma Science, vol. 30, No. 4, pp. 1445-1448, 2002.
Rutberg, "Some plasma environmental technologies developed in Russia", Plasma Sources Sci. Technol., vol. 11, pp. A159-A165, 2002.
Fauchais et al., "Thermal Plasmas", IEEE Transactions on Plasma Science, vol. 25, No. 6, pp. 1258-1280, 1997.
Municipal Solid Waste Feasibility of Gasification with Plasma ARC, Environmental Analyses, presented to EPRI Symposium Industrial Applications of Plasma, Palo Alto, CA, Submitted 2009.
Reference regarding PLASCON™ system, Submitted 2009.

* cited by examiner

DETAIL
FOR N36,N38

DETAIL
FOR N31

DETAIL FOR N34

DETAIL-'F'

METHOD AND APPARATUS OF TREATING WASTE

PRIORITY CLAIM

This application claims the benefit of U.S. Provisional Application No. 61/027,117, filed Feb. 8, 2008, which is incorporated by reference.

BACKGROUND OF THE INVENTION

1. Field of the Invention

This disclosure relates to the treatment of waste material and, more particularly, to the controlled thermal destruction of hazardous and non-hazardous materials.

2. Background

This invention relates to the treatment of waste material and, more particularly, to the controlled thermal destruction and conversion into usable products of hazardous and non-hazardous materials.

Waste material may be in a solid, semi-solid or liquid form and may include organic and/or inorganic material. Some solid waste materials have been disposed in landfills. However, public opposition and regulatory pressures may restrict some landfill practice.

Other solid waste and some liquid waste materials have been disposed of through combustion and/or incineration. These processes may produce substantial amounts of fly ash (a toxic constituent) and/or bottom ash, both of which by-products require further treatment. Additionally, some combustion and/or incineration systems suffer from the inability to maintain sufficiently high temperatures throughout the waste treatment process. In some systems, the lower temperature may result from the heterogeneity of the waste materials. In other systems, the reduced temperature may result from the varying amount of combustible and non-combustible material and/or moisture within an incinerator. As a result of the lower temperatures, and other factors such as the need for excess air and supplementary fossil fuels to maintain proper combustion, these incineration systems may generate hazardous materials which may be released into the atmosphere.

SUMMARY

A waste treatment system processes waste upon the application of energy. The system includes a vessel that has an opening. At least one plasma electrode is mounted to the vessel. In some waste treatment systems, an electrode movement control system may position the plasma electrodes to obtain a desired arc voltage or temperature within the vessel. Organic and/or inorganic waste may be introduced into the vessel and the electrode(s) may supply energy to treat the waste.

In other waste treatment systems, the electrode movement control system may automatically position the plasma electrodes to operate within the open space of the vessel according to a "transferred-arc mode," where at least one electrode mounted in a vertical or generally vertical direction transfers an arc to an electrode located at or near the bottom of the vessel, and a "non-transferred-arc" mode where the vertical or generally vertically mounted electrode transfers an arc to an electrode mounted horizontally or at a selected angle to the horizontal through the side wall of the vessel. Organic and/or inorganic waste may be introduced into the vessel, and the electrodes may supply energy to treat the waste.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A waste treatment system processes waste through the application of energy. The system may receive and treat inorganic and/or organic solid waste, semi-solid waste and/or liquid waste. The system may include plasma torches with multiple electrodes whose positions may be varied to facilitate the processing of received waste.

Figure 1:
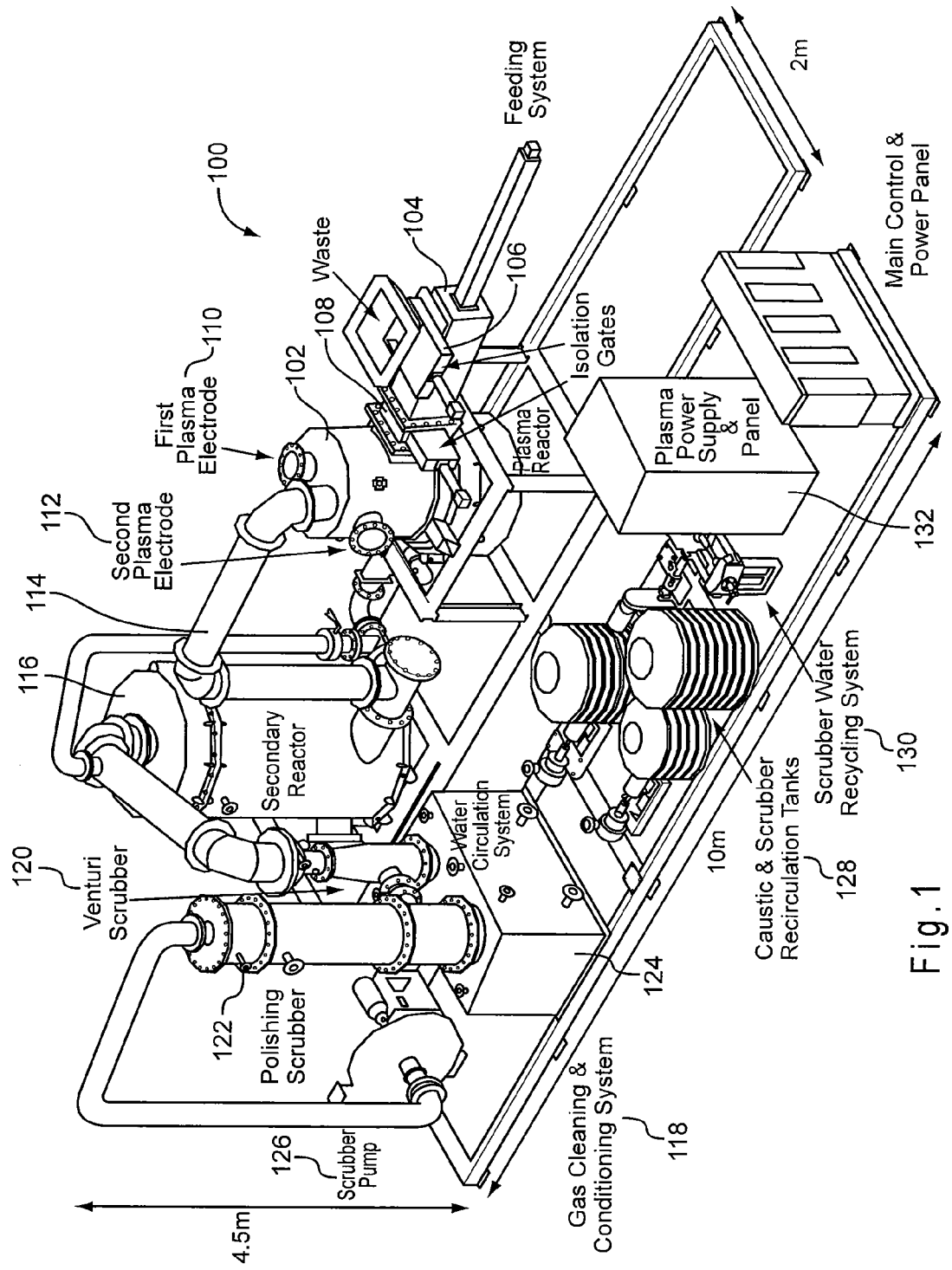
FIG. 1 is a diagram of a waste treatment system.

FIG. 1 is a diagram of a waste treatment system 100. The waste treatment system 100 may treat inorganic and/or organic solid waste, semi-solid waste and/or liquid waste. The waste treatment system 100 may be controlled by a computerized control system located proximate to or a distance apart from the waste treatment system 100. The computerized control system may include one or more processors, memories (e.g., Random-Access-Memory, Read-Only-Memory, Flash Memory, and/or other optical or digital storage devices) that access or run software applications, and network connectivity ports. The computerized control system may be coupled to a computer system and/or server running one or more software programs operating to control waste treatment system 100. The computerized control system may obtain inputs from all of the subsystems/subprocesses of the waste treatment system 100. Safety interlocking features and emergency shut-down aspects to the whole system and/or subsystems/subprocesses may be incorporated to ensure the protection of the equipment and/or users. For instance, in some waste treatment systems 100, the controlling software may be configured to prevent the reactor isolation gate from opening (and thus preventing waste from entering the reactor vessel) if the pressure inside the reactor is at any time higher than the operating range of negative pressure established by the operator. In such a case when the operating negative pressure is higher than the operator-established negative pressure set point, the control system will also increase the speed of the ID fan to bring the reactor pressure below the required set point pressure. All systems are also provided with an emergency vent that is equipped with a control valve that is designed to open when the pressure inside the reactor goes positive above a specific set point. Such set point will be in the range of about 2 mm Water Column ('W.C.") to about 5 mm, W.C. In other systems, the control system may shut down the feeder and the plasma torch if a pressure threshold is exceeded for a period of time (e.g., exceeding a pressure above about −5 mm of water column for about 3 to about 10 seconds). In all systems, the control system will shut down the system and place the system in a "safe mode" in the event of a power failure, and/or loss of cooling when such emergency shut-down occurs, the reactor emergency vent valve will open. In the event that one or more of the arc electrodes fails, the waste treatment system 100 may transition into a standby mode such that an operator may decide a further course of action.

Some waste treatment systems 100, may include a user interface or a graphical user interface coupled to the computerized control system. Each of the subsystems/subprocesses may have customized interface screens that display information to a user. The computerized control system may monitor input and output parameters of the waste treatment system and may prompt a user to make appropriate adjustments to the waste feed rate, the vessel 102 temperature, oxidant input (if required), and/or the gas cleaning and conditioning system. Alternatively, the adjustments may be made automatically by the waste treatment system.

The waste treatment system 100 may include a processing chamber or vessel 102 having an open space in which waste may be processed. The vessel 102 may be coupled to a solid waste feed system 104 that may include a feeding chamber that is positioned at an inclined angle. In some systems, this inclined angle may vary between approximately 7 degrees from the horizontal to approximately 15 degrees from the horizontal. In other systems, the inclined angle may be smaller or larger than this approximate range, but inclined to a point where gravity assists with feeding waste and draining liquids (such as water) that may have been extruded or leaked from the waste packages from the feeding chamber into the vessel 102. In some systems, the solid waste feed system 104 may provide to the vessel 102 waste feedstock, such as municipal solid waste, Polychlorinated Biphenyls ("PCB") contaminated materials, refinery waste, office waste, cafeteria waste, facilities maintenance waste (e.g., wooden pallets, oil, grease, discarded light fixtures, yard waste, wastewater sludge), pharmaceutical waste, medical waste, fly and bottom ash, industrial and laboratory solvents, organic and inorganic chemicals, pesticides, organo-chlorides, thermal batteries, post-consumer batteries, and military waste, including weapon components. The solid waste feed system 104 may include multiple retractable isolation gates.

In FIG. 1, two retractable isolation gates are shown. A first isolation gate 106 may be positioned proximate to a feeding hopper to permit feeding of waste feedstock into a feeding chamber of the solid waste feed system 104. The second isolation gate 108 is shown positioned proximate to the vessel 102 and may permit the feeding of the waste feedstock into the vessel 102. The solid waste feed system 104 may be controlled by the waste treatment system computer such that one isolation gate is open at a time. In some systems, a sensor may monitor the quantity of feedstock being introduced into the waste feed system 104. After the first isolation gate 106 closes, nitrogen may be used to pressurize the feeding chamber to substantially reduce and/or prevent air from entering the vessel 102 with the waste feedstock and to substantially prevent the potential for back-flow of combustible synthesis gas (e.g., gas generated by the treatment of waste in the vessel or secondary reaction chamber; also referred to as "syngas") from the vessel 102. In some systems a nitrogen "dump" may be introduced into the feeding chamber whenever there is an emergency shut-down of the system as a safety feature to prevent back-flow of combustible gases. In some systems such emergency nitrogen "dump" may also be introduced into the reactor vessel 102. In some systems, a hydraulic-powered ram feeder may be installed within the feeder chamber and may push the waste feedstock into the vessel 102 once the second isolation gate 108 is opened, such that there would be substantially no waste material remaining in the area between the isolation gate 108 and the vessel's 102 entrance. In addition to the inclined position of the feeding chamber allowing gravity to help move the waste feedstock into the vessel 102, its inclined position may aid the draining of any free-standing water or other liquids in the waste into the vessel 102. In some systems a method of feeding powdered wastes may also be included. Such a system may consist of a single or double-screw feeder that is also inclined at an angle to the horizontal. Such angle may be in the range of about 15 degrees to about 30 degrees from the horizontal; but the angle may be larger or smaller depending on the application. Such powdered waste feeding system will also be outfitted with double isolation gates. In other systems, the powdered wastes may be fed through a rotary valve or dump-valve arrangement where the feeding port is located in a vertical position relative to the plasma reactor.

To help minimize and/or prevent the generation and/or release of toxic or hazardous materials from the feeding chamber when waste is received, a disinfectant could be introduced into the feeding chamber through an opening. In some systems, this opening may be the hopper opening that receives waste prior to entry into the feeding chamber. In other systems, the opening may be located along a portion of the feeding chamber. The disinfectant introduced into the feeding chamber may drain into the vessel 102 and be processed as waste. In yet other systems, the disinfectant may be introduced through nozzles positioned along a path of the feeding chamber.

Depending upon the design of the solid waste feeding system 104, various sizes and quantities of waste feedstock may be accommodated. In some systems, approximately 30-gallon medical waste bags and boxes having dimensions of approximately 250 mm by approximately 250 mm by approximately 250 mm may be processed. Other systems, however, may process and/or treat other sizes and/or quantities of waste feedstock. The portion of the feeding system that is between the reactor isolation gate and the entrance to the reactor may be refractory lined to help protect it from the increased temperature of the vessel 102.

A liquid waste (e.g., solvent waste) feed system, such as the solvent feed system disclosed in U.S. patent application Ser. No. 10/673,078, filed Sep. 27, 2003, now U.S. Published Application No. 2005/0070751, published Mar. 31, 2005, which is incorporated by reference herein, may provide liquid waste to the vessel 102. Some of these liquid waste materials may be provided to vessel 102 through the feeding chamber, such as the one included with solid waste feed system 104. Alternatively, liquid waste may be injected directly into the vessel 102 through one or more nozzles positioned around the circumference of the vessel 102. Solvent waste may be fed through the one or more nozzles from one or more waste sources in an alternating manner, a sequential manner, or at substantially the same time. In some waste treatments systems, the waste fed through multiple solvent waste feed nozzles may comprise different types of waste. For example, the solvent waste from one manufacturing process may be introduced through one nozzle and solvent waste of a different composition from a different manufacturing process may be introduced through another nozzle. The number of solvent waste feed nozzles used, and the manner in which they are employed may vary based upon design and/or application.

In some waste treatment systems 100, the solvent waste feed nozzles may be positioned to introduce, such as through the use of a pump, solvent waste into the vessel 102 and/or into the path of a heating source within the vessel 102. In other waste treatment systems 100, the solvent waste feed nozzles may be positioned to introduce solvent waste into other areas within the vessel 102, such as a turbulent region or a region having a different temperature then the rest of the vessel 102.

Some or all of the solvent waste feed nozzles may be configured to substantially maximize the surface area of the solvent waste. In some designs, this may be accomplished by generating substantially micro-droplets. By substantially maximizing the surface area of the droplets, energy from the heat source (e.g., plasma plumes generated by the plasma electrodes) may be transferred to the droplets at a substantially greater rate than droplets having a reduced surface area. Maximizing the surface area of the solvent waste droplets may be accomplished by mixing compressed air with the solvent waste in the nozzles.

Solid and liquid waste may be treated separately or at substantially the same time. To process the waste separately, the solid and liquid waste are separately introduced into the vessel 102. To process the waste at substantially the same time, the solid and liquid waste are introduced into the vessel 102 at substantially the same time or substantially subsequent to one another, such that both solid and liquid waste are in the vessel 102 at a similar time. When the solid and liquid waste is processed at substantially the same time, liquid waste may be introduced into solid waste feed system 104 to create a homogenous mix of solid and liquid waste. Alternatively, liquid waste may be introduced into the vessel 102 through the solvent waste system at substantially the same time that solid waste is introduced into the vessel 102 through solid waste feed system 104. The waste treatment system 100 may process equal or non-equal portions of solid and liquid waste.

The desired rate at which waste is fed into vessel 102 may be dependent on various factors, such as the characteristics of the waste, the energy available from a heating system versus the energy expected to be required for the completion of a molecular dissociation, pyrolysis, gasification and melting process, the expected amount of synthesis gas to be generated versus the design capacity of a gas cleaning and conditioning system, and/or the temperature and/or oxygen conditions within the vessel 102. The feed rate may be initially calculated based on an estimation of the energy required to process the specific waste type being treated, based on an estimation of the expected quantity of syngas to be produced versus the limitation imposed by the physical size of the plasma reactor (e.g., maintaining a desired residence time in the plasma reactor, or based on limitations regarding the design capacity of the scrubber system.

The vessel 102 may be vertically oriented, and may be constructed in parts or sections such that if a part is removed for maintenance the other parts may remain in place. In some systems, the vessel 102 may include a lower generally cylindrical chamber that is joined to an upper generally cylindrical chamber having a substantially identical diameter as the lower chamber. In other systems, the vessel 102 may include a lower generally cylindrical chamber, and an upper generally cylindrical chamber. The lower and upper chambers may be joined by a generally frustoconical section.

The lower chamber of the vessel 102 may include a molten slag/metal section and a high temperature turbulent section which may promote gaseous dissociation and pyrolysis reactions. The lower chamber may be removable during a shutdown/maintenance period for maintenance of the vessel 102. In some waste treatment systems, an anode electrode consisting of about a 150 mm by about a 150 mm graphite "block" may be mounted at the bottom of the vessel 102. In other systems the anode electrode may consist of a graphite "rod" with general dimensions of about 150 mm by about 150 mm in cross-section and be manufactured in sections of about 450 mm in length. Each section may have threaded male and female connections such that sections may be connected to each other. Either type of anode electrode configuration can be used, depending on the system configuration chosen and either configuration can be used when the system is configured to operate between a "transferred-arc" and "non-transfer-arc" mode.

The vessel 102 may be lined with a combination of refractory materials which may be arranged in several layers. In some waste treatment systems, the vessel 102 may be made of a mild steel and insulated inside by layers of refractory material which may include Silicon Carbide or graphite tiles, castable refractory, ceramic board, ceramic blanket, cerawool and/or Hysil Block. The vessel 102 lining may be designed to provide operational flexibility, minimize heat-up time, allow for natural cooling, and/or allowing for the heat-up and cool-down, as a minimum, on a daily basis, without causing harm to the refractory insulation and/or the other portions of the vessel 102. In some waste treatment systems 100, the vessel 102 may be designed such that replacement of its refractory lining is not required for a minimum interval of about two years. Nonetheless, as designed the system provides easy access and flexibility to repair sections of damaged refractory material/insulation on a routine basis prior to the desired interval of about two years.

In some systems, the temperature and/or pressure in the vessel 102 may be continuously or substantially continuously monitored to ensure that negative pressure in the vessel 102 is within a predetermined range. Monitoring of the temperature and/or pressure in the vessel 102 may be through one or more monitoring ports positioned around the vessel 102 and may include the use of one or more sensors in communication with the computerized control system. In some vessels 102, the predetermined negative pressure range may be between about −5 mm W.C. and about −25 mm W.C., but the low-end of the operating pressure set-point may vary depending on the nature of the waste material being processed. In some systems, a typical operating range may be between about −5 mm W.C. to about −15 mm W.C.

Inorganic waste may be fed into the vessel 102 where it may be vitrified or melted, by a heating system. The heating system may include one or more devices that convert electrical energy into thermal energy. In some waste treatment systems 100, these devices may be multiple plasma torches consisting of two electrodes (an anode and a cathode) which are mounted to the vessel 102 and which may generate controlled plasma fields that are directed to an interior of the vessel 102. In other systems, a plasma electrode may generate a controlled plasma field when a substantially steady flow of gas is forced between electrodes with a high electrical current flowing between the electrodes. In some systems, the heating system may generate approximately 100 kW of plasma energy.

Movement of the electrodes may be controlled manually, remote manually, or automatically by an electrode movement control system. By controlling a gap between the electrodes, an arc-voltage between the electrodes may be controlled which in turn can be used to regulate the internal temperature of the vessel 102. The size of the gap between electrodes may be selected so that the arc-voltage is substantially maintained at a design level. The design level may be selected based on design considerations of the system, such as the characteristics of the waste, the energy available from a heating system versus the energy expected to be required for the completion of a molecular dissociation, pyrolysis, gasification and melting process, the expected amount of synthesis gas to be generated versus the design capacity of a gas cleaning and conditioning system, and/or the temperature and/or oxygen conditions within the vessel 102. The higher the operating voltage, the larger the gap that may be allowed between the electrodes and the lower the operating current. If the voltage drops below a minimum predetermined threshold level, the gap between the electrodes may be increased until the voltage is increased to or above the minimum predetermined threshold level. If the voltage increases above a maximum predetermined threshold level, the gap between electrodes may be reduced until the voltage is stabilized within the minimum to maximum predetermined threshold range. In some waste treatment systems 100 that operate with 100 kW power from the plasma electrodes, the gap between the electrodes may be selected so that the operating voltage is approximately 100 volts. In these systems, the minimum and maximum threshold predetermined threshold levels may be selected to be about 80 to about 120 volts, and the gap between electrodes may be about 10 mm to about 75 mm.

The initial position of the electrodes may be based on operator measurements according to the design of the system and may be identified with respect to the center lines of the vessel 102. As the electrodes are consumed, unused portions of one or more of the electrodes may be moved into the vessel 102. Movement of the electrodes may be performed manually, remote manually, or automatically by an electrode movement control system. When a certain amount of one or more of the electrodes is consumed, a replacement length of electrode may be attached to the end of an electrode that is furthest from the center of the vessel 102. The replacement length of electrode may be attached by threading the new portion of electrode length to the existing electrode.

The electrode movement control system may include a mechanical system coupled to the computerized control system to control the movement of one or more of the electrodes. In some systems, the mechanical system may include an inching motor and gear mechanism. The electrode movement control system may also include a Supervisory Control and Data Acquisition ("SCADA") system, such as the hardware and software system developed and used by PEAT International, Inc. (Northbrook, Ill.) and which may be configured to run on a computer utilizing a Windows operating system. The SCADA system may acquire, through vessel temperature sensors, measurement data about the arc voltage and adjust the position of one or more electrodes automatically through the motor and gear system to obtain a desired arc voltage or temperature within the vessel 102. Alternatively, the position of one or more electrodes may be adjusted manually or remote manually through the motor and gear system to obtain a desired arc voltage or temperature within the vessel 102. In some waste treatment systems, the electrode movement control system may include safety features that prevent movement of the electrodes. In some systems, these safety features may include preventing movement of the electrodes when two or more electrodes are touching one another. In such instances, the movement control system may disable the inching motor until the position of one or more of the electrodes is manually reset by operator action. In other systems, movement of the electrodes may include physical equipment, such as limiting switches, guide pins/tracks, or evaluative software to inhibit movement of one or more electrodes beyond a particular point into or out of the vessel 102.

In some waste treatment systems 100, the positioning of the electrodes may influence cyclonic air flow within the vessel 102. A small channel may be drilled and/or formed through the center of one or more of the electrodes (e.g., electrode 110 and/or 112) to accommodate a small flow of air to act as a plasma carrier gas. In some systems, the amount of air flowing through the channel may be about 5 liters per minute.

The heating system may be powered by a power supply 132, such as an advanced insulated gate bipolar transistor ("IGBT") power supply. The IGBT power supply 132 may use an input current that is approximately 30% less that a silicon controlled rectifier system. The IGBT power supply may result in: power factors that are in the range of about 0.85 and about 0.90, low harmonic distortion, high arc stability, and/or a smaller control panel. Alternatively, the heating system may be powered by alternating current and/or direct current.

The vitrified or melted waste from the waste feedstock may form a slag (e.g., molten material), such as a glass-like slag, which may collect in a slag pool at the bottom of vessel 102. In some instances, a separable metal layer may form in slag pool. The slag may be drained from the vessel 102, through one or more tapping ports which may be positioned at an appropriately designated elevation from the bottom of the vessel 102 and may be located at radial locations around the circumference of the vessel 102. One or more of the tapping ports may be positioned at an angle such that the molten slag layer may maintain an approximately continuous gas seal. The angle of the one or more tapping ports may be about 10 degrees with respect to a horizontal plane intersecting the vessel 102 at the location of a tapping port. Alternatively, the tapping ports may be positioned at different angles.

Slag may be removed/drained from the slag pool through the tapping ports into a slag/metal alloy collection system. In some systems 100, the slag/metal alloy collection system may include a tap cart. The tap cart is designed to allow the slag/metal to be tapped into a sand bed (that provides proper insulation to the tap cart metal) or the slag/metal may be tapped into a tap cart containing a water bath (where the slag may fracture into a "powder-like" consistency as it is quickly quenched). The tap carts may be air cooled (using air supplied by the air supply fan that supplies air to a secondary reaction chamber), may be double-walled with the space between the steel surfaces filled with cooling water, or they may be cooled by natural convection from ambient air. In yet other systems, the drained slag may be quenched in a water tank, causing the drained slag to solidify and fracture into smaller pieces. Solid slag may be essentially inert because heavy metals may be bound within it. Consequently, the slag may resist leaching in the solid state. Solid slag removed from the vessel 102 may be transported from the slag/metal alloy collection system to a bin by a conveyor or other suitable device for transport and reused or disposed of. In yet other systems, the slag may be drained into other specially designed components, such as molds insulated by sand.

In some systems, the tapping ports may include one or more than one tap. Where there is more than one tap, the taps may be positioned at different locations around the vessel 102 and/or at different heights. The taps may be opened one at a time, in an alternating sequence, or at substantially the same time. During tapping, feeding and/or treatment of waste in vessel 102 may continue.

The solid slag, which may be benign and may not require landfilling, may be used for a number of commercial applications, such as road construction, concrete aggregate, blast cleaning, fiberglass, and/or fiberglass-like material. It may also be formed into decorative tiles, or used in conjunction with building materials to create lightweight pre-engineered home construction materials. When tapping is to be initiated, the tap plug is pulled from the vessel 102 through the tap port opening. In other systems, the tapping ports are closed by a tap plug consisting of high temperature resistant material. In these systems, when tapping is to be initiated, the tap plug is manually or remote manually pulled out allowing the molten slag/metal mixture to flow out of the vessel 102 into a collection system. In yet other systems, the tapping ports are closed by using water-cooled or refractory encased steel plugs that may be manually or remote manually removed.

As a result of the low oxygen environment in the vessel 102, some metal-oxides present in the waste streams may be reduced into their elemental form. Metals and metal alloys present in the waste feedstock may also melt in the vessel 102. Over a period of time, a layer of metals may accumulate at the bottom of the slag pool. Certain metals such as iron may not react readily with silicates contained in slag pool. The slag may absorb some of these metals and metal oxides, but the metals may accumulate if a large amount of metal is present in the waste. The molten metals may be drained, along with the molten slag, through the tapping ports, and processed as described above.

Waste received in the vessel 102 may undergo a molecular dissociation and pyrolysis process. Pyrolysis is a process by which intense heat operating in an extremely low oxygen environment dissociates molecules, as contrasted with incineration or burning. During this process, the waste may be heated by the heating system. The heated waste may be processed until it dissociates into its elemental components, such as solid carbon (carbon particulate) and hydrogen gas. Oxygen, nitrogen, and halogens (such as chlorine) may also be liberated if present in the waste in the form of a hydrocarbon derivative. After pyrolysis and/or partial oxidation, a resulting gas (e.g., synthesis gas) may include carbon monoxide, hydrogen, carbon dioxide, water vapor, methane, and/or nitrogen.

Dissociated oxygen, and chlorine may be free to react with the carbon and hydrogen produced, and may reform as a wide array of complex and potentially hazardous organic compounds. Such compounds, however, generally cannot form at the high temperatures maintained within the vessel 102, at which only a limited number of simple compounds may be stable. The most common and stable of these simple compounds are carbon monoxide (formed from a reaction between the free oxygen and carbon particulate), diatomic nitrogen, hydrogen gas, and hydrogen chloride gas (as representative of a Hydrogen-halogen gas) (when chlorine or other halogens are present).

The amount of oxygen present in the waste material may be insufficient to convert all of the carbon present in the waste material into carbon monoxide gas. Moisture present in the waste material may absorb energy from the high temperature environment in the vessel 102 through a "steam-shift" reaction and form carbon monoxide and hydrogen gas. If an insufficient amount of stoichiometric oxygen or moisture, is present in the waste stream and/or as a result of inherent process inefficiencies, unreacted carbon particulates may be entrained in the gas stream and carried out of the vessel 102.

To increase the amount of solid carbon converted to carbon monoxide gas, an additional source of oxygen may be introduced into the vessel 102 and/or into the secondary reactor chamber. The waste processing system 100 may include a system that injects an oxidant into the waste system 100 in an amount that facilitates a conversion of some or a substantial portion of the carbon or carbon particulate in the vessel to carbon monoxide. In some systems 100, the injection system may be an oxidant supply system which may include oxygen lances to inject additional oxygen into the vessel 102. The oxygen lances may be mounted to or formed as a unitary part of the vessel 102, and may inject oxygen with a purity in the range of 90% to 93% into the vessel 102. Predetermined amounts of the oxidant may be injected into the vessel 102 at one or more locations. Alternatively, different oxidants such as air or steam may be used alone or in combination with other methods. In some waste treatment systems 100, the oxidant may be introduced into the vessel 102 through other systems and/or components, such as through the plasma heating system, mixed with the waste in the solvent feed system 100. Alternatively, oxidants may be supplied through oxygen cylinders, a pressure swing absorption system or through a steam generator and steam valve, opened in a controlled manner, automatically through the waste system control computer, manually, or remote manually, which may be coupled to an upper portion of the vessel 102 and/or a gas pipe.

The oxidant injected into the system may convert some or a substantial portion of the carbon in the waste or carbon that is dissociated in the vessel as free carbon into carbon monoxide. Because pure carbon is more reactive at the high operating temperatures than the carbon monoxide gas, the additional oxygen may react with the carbon and form carbon monoxide, and not with the carbon monoxide to form carbon dioxide (assuming that the oxidant is not added in excess).

The carbon and oxidant may remain in the vessel 102 for a period of time such that a substantial portion of the previously unconverted solid carbon may be converted to carbon monoxide (e.g., "residence time"). The residence time may be a function of the system volume, vessel geometry, and/or the syngas flow rate. In some waste treatment systems 100 using a gas flow rate of about 2.5 to about 3.0 $Nm^3$/minute, the residence time may be about 2.0 seconds. In waste treatment systems 100 using different gas flow rates, the residence time may be greater than or less than about 2.0 seconds. Additional residence time may be provided by a gas vent piping (e.g., "Hot Pipe") 114 leading to a secondary reaction chamber 116, such that the total residence time of the waste treatment system 100 may exceed about 2.0 seconds. In other systems, the Hot Pipe may be connected directly to a gas cleaning and conditioning system. The Hot Pipe may be provided with nozzles where the operator may inject prescribed quantities of atomized water and/or steam. The water/steam injection will provide a way to force the conversion of any unreacted carbon particles carried over from the vessel 102 into carbon monoxide and hydrogen gas as well as reacting volatile metal constituents into metal oxides and hydrogen gas. This will also help to reduce the temperature of the syngases since the reactions with moisture will be endothermic. The addition of hydrogen into the syngas helps to increase the heat value of the resulting syngas product.

The amount of oxidant injected into the vessel 102 and/or the secondary reaction chamber 116 may be determined through a gas analysis system. The gas analysis system may monitor at a substantially continuous rate the composition of the synthesis gas generated in the vessel 102 and/or secondary reaction chamber 116. In some systems, the gas analysis system may include a mass spectrometer, online gas analyzers (including Non-dispersive Infrared ("NDIR"), electrochemical, thermal conductivity, or laser based systems) that may measure the masses and relative concentrations of the atoms and molecules exiting the vessel 102 and/or the secondary reaction chamber 116. Measured components may include $CO$, $CO_2$, $HCl$, $H_2$, $CH_4$, $N_2$, $O_2$, $H_2S$, and/or water vapor. In other systems, the gas analysis system may include a particulate monitor which may measure at a substantially continuous rate the broad level of particulates carried over in the synthesis gas stream exiting the vessel 102 and/or the secondary reaction chamber 116. With respect to the secondary reaction chamber 116, the gas analysis system may sample the synthesis gas at a point prior to or at the secondary reaction chamber 116. When no secondary reaction chamber 116 is present, the gas analysis system may sample the synthesis gas before the gas conditioning and cleaning system 118, and/or at a point after a gas cleaning and condition system 118. Based on the results of the analysis, manual and/or automatic adjustments may be made to the feed rate and/or composition of waste material, and/or plasma electrode power, and/or the amount of oxidant injected into the system. Alternatively, the gas analysis system may sample the synthesis gas at substantially regular intervals separated by a time period. These sample periods may be statistically analyzed to determine whether manual and/or automatic adjustments to the feed rate and/or composition of waste material, and/or plasma electrode power, and/or the amount of oxidant injected into the system are required. Other waste treatment systems 100 may not use a gas analysis system.

The synthesis gas, generated within vessel 102, may be heated to a temperature in the range of at least about 1000° C. (although depending on the nature and composition of the wastes to be processed, a temperature in the range of 850° C. may be allowed) to about 1500° C. After exiting the vessel 102, the synthesis gas may be processed by the secondary reaction chamber 116, which in some systems may be constructed from mild steel and lined with appropriate insulating/refractory material similar to those materials used in construction of the vessel 102. Depending on the configuration of the waste treatment system 100, the secondary reaction chamber 116 may be used in different operation modes. In a first operation mode, the secondary reaction chamber 116 may not be present or may act as a staging chamber that allows the syngas to pass through it as it is conveyed to the gas cleaning and conditioning system. In this operation mode, the syngas will be utilized in either a gas engine, boiler, or other downstream system. In a second operation mode, the secondary reaction chamber will be present and thermally oxidizes the syngas. In this operation mode, the syngas will not be reused and after thermal oxidation in the secondary reaction chamber 116 and then cleaning and conditioning in the gas cleaning and conditioning system, the gas is released into the atmosphere. When operating in the first mode (e.g., a syngas mode), water, steam, air or another oxidant may be introduced into the secondary reaction chamber 116 through an injection system or other input, where the synthesis gas may undergo further conditioning such as reacting any unreacted carbon constituents into carbon monoxide, or reacting volatile metals into metal oxides. When operating in the second mode (e.g., a non-syngas mode), usually in the event that the synthesis gas utilization system is not available, the secondary reaction chamber 116 may be designed to inject a larger amount of air into the chamber so that the synthesis gas may be transformed into nitrogen, oxygen, carbon dioxide, and/or water vapor. In some waste treatment systems 100, depending on the waste being processed, a minimum residence time in the secondary reaction chamber 116 may be approximately 2.0 seconds. However, the secondary reaction chamber 116 may be designed for longer or shorter residence times, depending on the mode of operation.

Downstream of the secondary reaction chamber 116, or directly downstream of the vessel 102, connecting through the Hot Pipe, the synthesis gas may be processed by a gas cleaning and conditioning system 118. Upon entering the gas cleaning and conditioning system 118, the synthesis gas may be at a high temperature. In some waste treatment systems, this temperature may be approximately 1100° C. However, in other systems, the temperature may be higher or lower. The gas cleaning and conditioning system 118 may quench the synthesis gas to substantially reduce its temperature or prevent the re-association of undesired complex molecules or the formation of new compounds such as dioxins and/or furans, and clean the synthesis gas to substantially remove any entrained particulate and/or acid gases. The gas cleaning and conditioning system 118 may comprise a high-pressure venturi system 120 and a packed bed scrubber 122. A water circulation system is provided for the venturi and packed bed tower systems. The water circulation system provides the water required by the venturi and packed bed tower to effect their required missions as described below. The water in the water circulation tank will require a small amount of "make-up" water to maintain the appropriate levels in the tank. The water circulation tank 124 may be shared between the venturi system 120 and the packed bed scrubber 122, with an internal partition provided where water from the portion of the tank assigned to the packed bed tower will overflow into the portion of the tank assigned to the venturi. In some waste treatment systems 100, separate water circulation tanks 124 may be used for the venturi system 120 and the packed bed scrubber 122. In other systems, a single tank may be provided without providing a partition between the two sections. In systems where a partition is provided, particulate matter removed from the synthesis gas may be substantially isolated from the packed bed scrubber 122 by measuring the level of the water in the circulation tank 124 from the section of the tank associated with the venturi system 120 and make-up water may be added to the section of the circulation tank that is associated with the packed bed scrubber 122. Alternatively, other waste treatment systems 100 may use separate water circulation tanks 124 for each of the venturi system 120 and the packed bed scrubber 122. The scrubber water circulation system is continuously cooled. The cooling medium may be by circulating the scrubber circulating water through a cooling tower directly (for systems where the tanks are provided with a partition or where that separate tanks are provided for the venturi and the packed bed tower). Other systems may use a single tank for both the venturi system 120 and the packed bed scrubber 122 and the system water will be recirculated through a heat exchanger that will cool the water in the scrubber system in conjunction with a cooling tower or other heat removal method.

The venturi system 120 and water circulation tank 124 may circulate water at the rate of approximately 6 m³/hr. To keep the venturi system 120 sufficiently clean, a water recycling system may be supplied with an inline filtration system. In some water filtration systems, particulate loading in the water may be maintained below about 500 parts per million ("ppm"). Solid residues removed by the filtration system may be accumulated and recycled back into the vessel 102 for additional vitrification. Some water recycling systems are designed for a flow-rate of approximately 4 m³/hr. Depending on the composition of the waste feedstock, particularly in terms of halogen content, water may be bled from the water recycling system at a rate of approximately 4 m³/day into a sewer system or effluent water treatment system, and may consist mainly of a salt solution in order to maintain the level of dissolved solids in the system below 2%. Additionally, in some systems, the packed tower recirculation flow rate may be about 10 m³/hr while a cooling tower's recirculation rate may be 5 m³/hr.

The venturi system 120 may also comprise an emergency water storage system to provide a gravity flow of water for cooling and particulate removal in case of a power failure. The emergency water storage system may comprise a separate, elevated, storage tank having a capacity of approximately 1000 liters. Alternatively, depending on site specific considerations, the venturi system water circulation tank may provide the emergency source of water.

A neutralizing agent, such as a solution of sodium hydroxide, described in U.S. Pat. No. 6,971,323, may be used to scrub the synthesis gas of acid gases. The neutralizing agent may be introduced by a pump 126 into a polishing scrubber 122. The recirculating water source 128 may be periodically sampled to ensure a pH level of about 9. A portion of the recirculating water, such as about 45 gallons per hour ("gph"), may be discharged from the scrubber water recycled through the scrubber water recycling system 130. The discharge may be periodically sampled to ensure that the discharge water flow meets regulatory limits. If found to meet regulatory discharge standards, some or all of the collected solution may be discharged to a wastewater treatment system or directly to the sewer. The discharged water may contain sodium salts or other dissolved salts. In some systems 100, the amount of salt in the discharge water may be less than about 2%.

FIGS. 2-18 are exemplary illustrations of a vessel 102 and corresponding components that may be used in connection with a first waste treatment system. While FIGS. 2-18 contain various design measurements and materials, other larger or smaller measurements and/or materials may be used in designing a waste treatment system.

Figure 2:
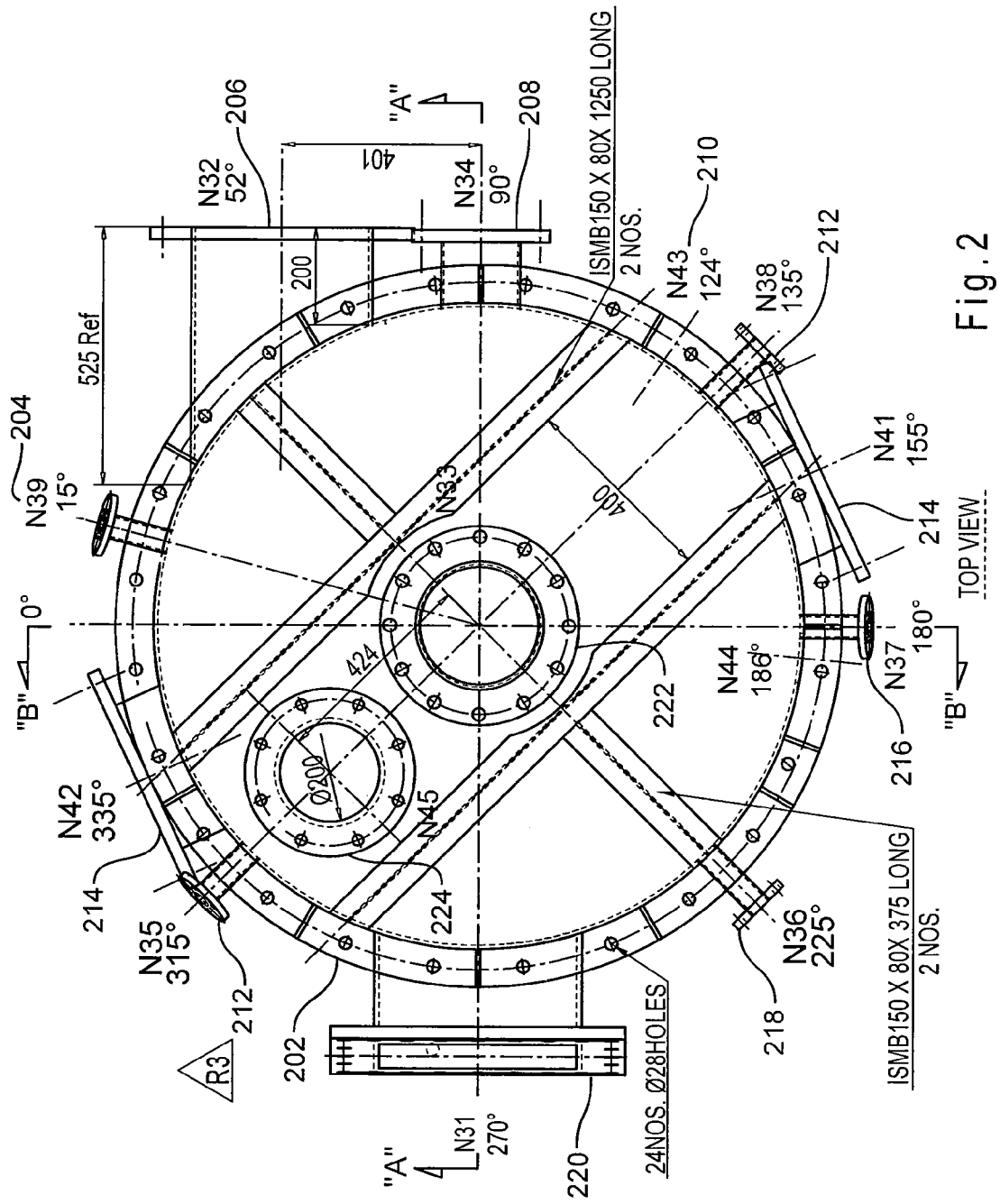
FIG. 2 is a partial schematic of a vessel of a waste treatment system.

FIG. 2 is a top view of a first exemplary vessel 202. In FIG. 2, the vessel includes a oxygen injection nozzle 204 positioned at 15 degrees from reference line B-B. Positioned at 52 degrees from line B-B is a gas outlet 206. The gas outlet 206 enables the synthesis gas generated inside vessel 202 to follow downstream to the rest of the waste treatment system. At 90 degrees from reference line B-B is positioned an inspection port 208 which may provide persons the ability to view the inside of the vessel 202, the placement of the electrodes, and/or the slag pool at the bottom of the vessel 202. As shown in FIG. 2, a tapping port 210 is positioned at 124 degrees from reference line B-B. Another tapping port 216 is also shown at 186 degrees from the reference line B-B. At 135 degrees and 315 degrees from the reference line B-B a temperature port 212 is shown. The temperature port 212 enables an operator to automatically, through the placement of a sensor(s) connected to the computerized control system, or through a manual sensor, measure the temperature within the vessel 202. Placement of various temperature ports 212 along the circumference of the vessel 202 enables monitoring of the vessel temperature at multiple locations which can result in a more accurate measurement. At 155 degrees and 335 from the reference line B-B is shown an insertion point of a lower electrode 214. Depending on the selected insertion point of a lower electrode another insertion point along the circumference of the vessel 202 may be capped off. At 180 degrees from the reference line B-B a spare nozzle 216 is shown. In some systems, the spare nozzle may be used as part of a solvent waste system. In other systems, the spare nozzle 216 may be used as a oxygen injection nozzle. At 225 degrees from the reference line B-B a liquid waste nozzle 218 is shown. At 270 degrees from the reference line B-B, a waste feed inlet 220 is shown. The waste feed inlet 220 may connect to the waste feed chamber and waste feed system that receives waste for processing. Positioned in the top center of the vessel 202 shown in FIG. 2 is an insertion portion for a top mounted electrode. Also shown in FIG. 2, positioned on the top of the vessel 202, but off-center, is an emergency vent 224. The emergency vent 224 may be opened, manually or by the computerized control system, in the event that the vessel 202 needs to be vented quickly or for purging operations. When the emergency vent 224 is opened, the contents of the vessel 202 (approximately 0.5 m3) are vented through an emergency vent pipe that would be vertically connected to the atmosphere such that the vent pipe has no bends that would otherwise cause an obstruction in the flowpath.

Figure 3:
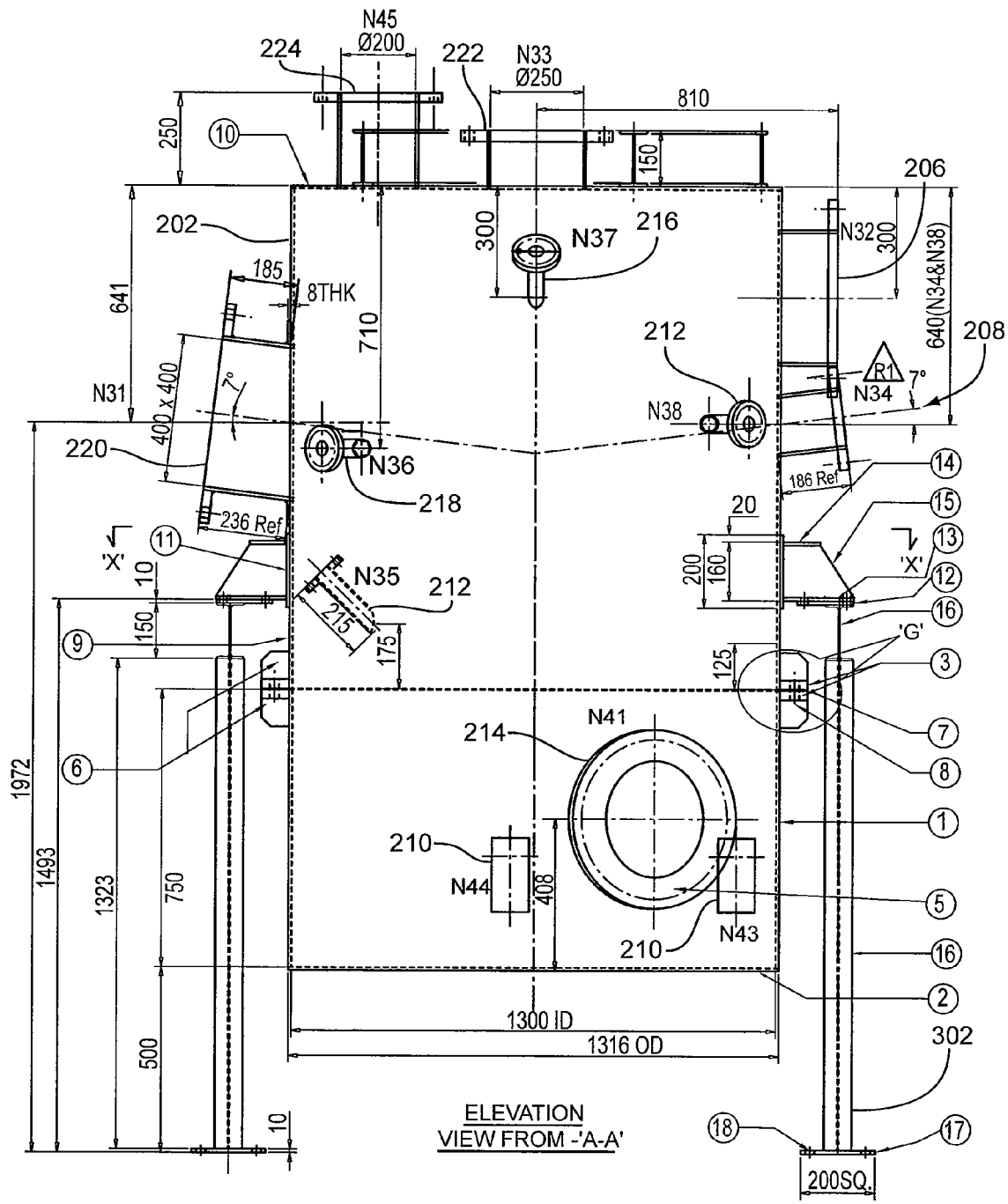
FIG. 3 is a second partial schematic of a vessel of a waste treatment system.

FIG. 3 is an elevation view of the outside of vessel 202 of FIG. 2 from the perspective of an observer looking in the direction of reference line A-A, as shown in FIG. 2. As shown in FIG. 3, the vessel 202 is mounted in a rack 302, such that the vessel 202 is raised off of the floor. As shown in FIG. 3 and subsequent FIGS. 4-14, circled reference numbers refer to hardware that may be used to construct vessel 202. A listing of this hardware may be found in Table 7 below.

Figure 4:
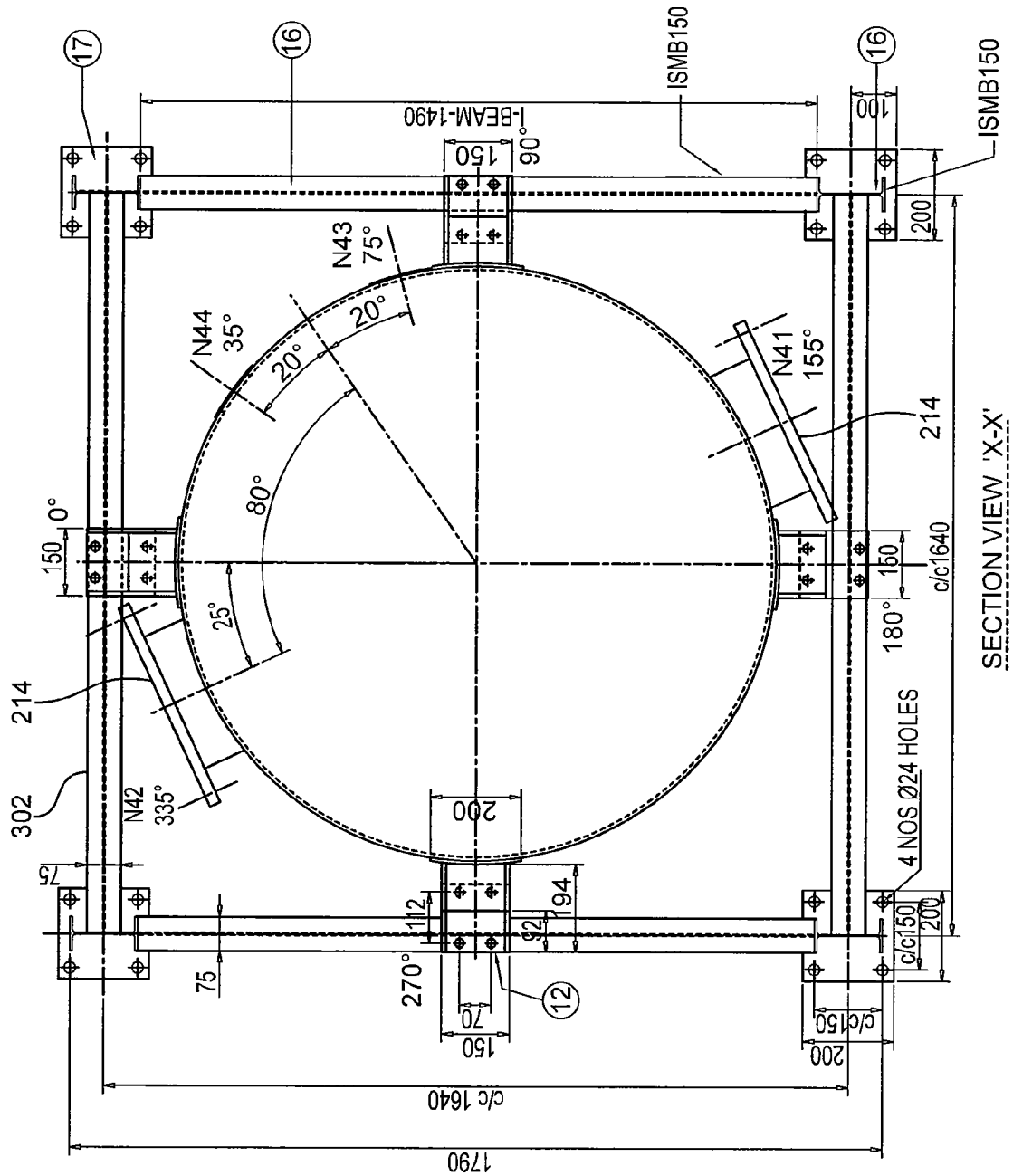
FIG. 4 is a third partial schematic of a vessel of a waste treatment system.
Figure 5:
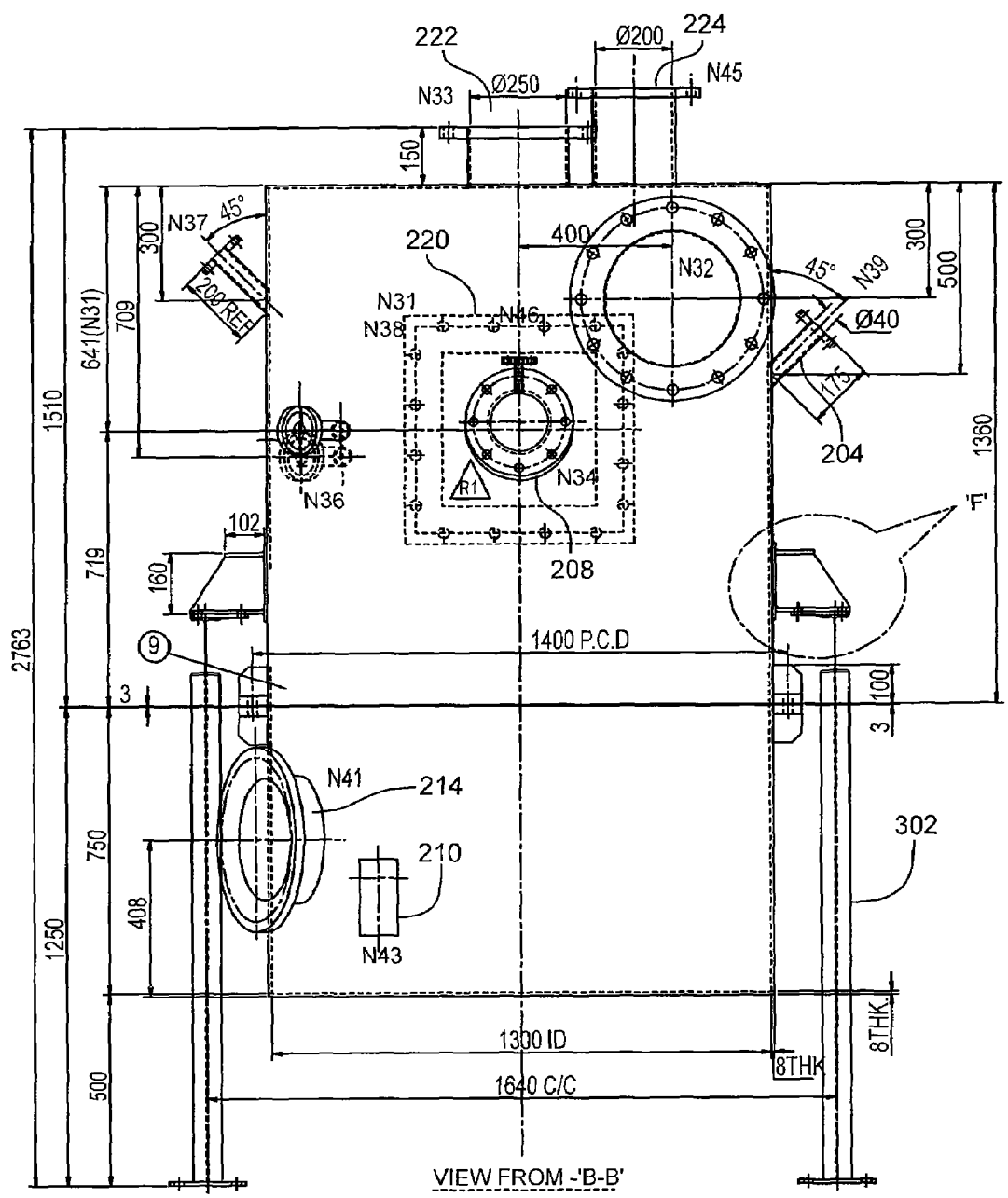
FIG. 5 is a fourth partial schematic of a vessel of a waste treatment system.

FIG. 4 is a cross-sectional view of vessel 202 taken along the reference line X-X as shown in FIG. 3. FIG. 5 is an elevation view of the outside of vessel 202 of FIG. 2 from the perspective of an observer looking in the direction of reference line B-B. In FIG. 5, the waste feed inlet 220 is superimposed on the vessel 202, even though it would not be readily viewable from the perspective of the observer in FIG. 5.

Figure 6:
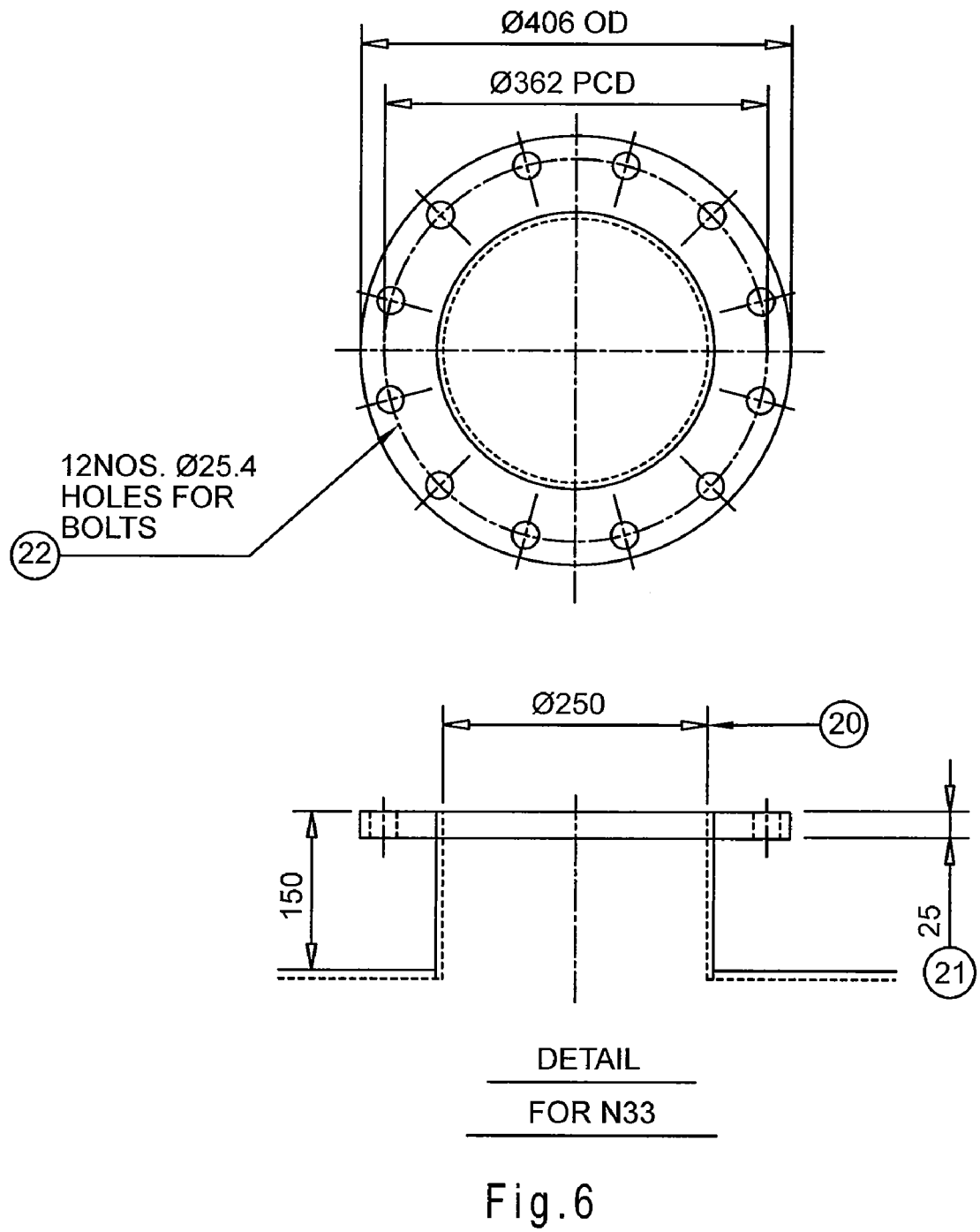
FIG. 6 is a detailed view of a portion of a vessel of a waste treatment system.
Figure 7:
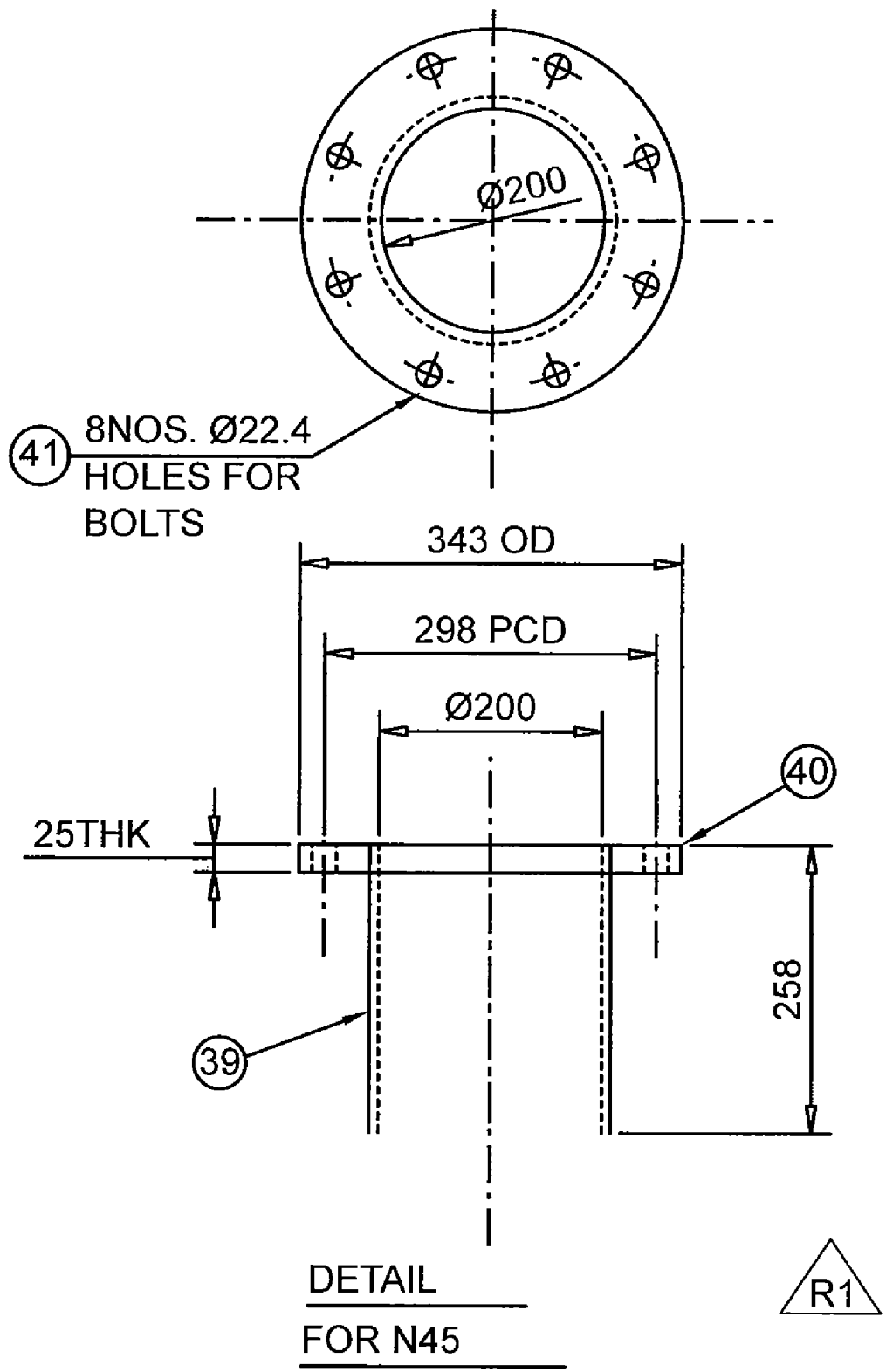
FIG. 7 is a second detailed view of a portion of a vessel of a waste treatment system.
Figure 8:
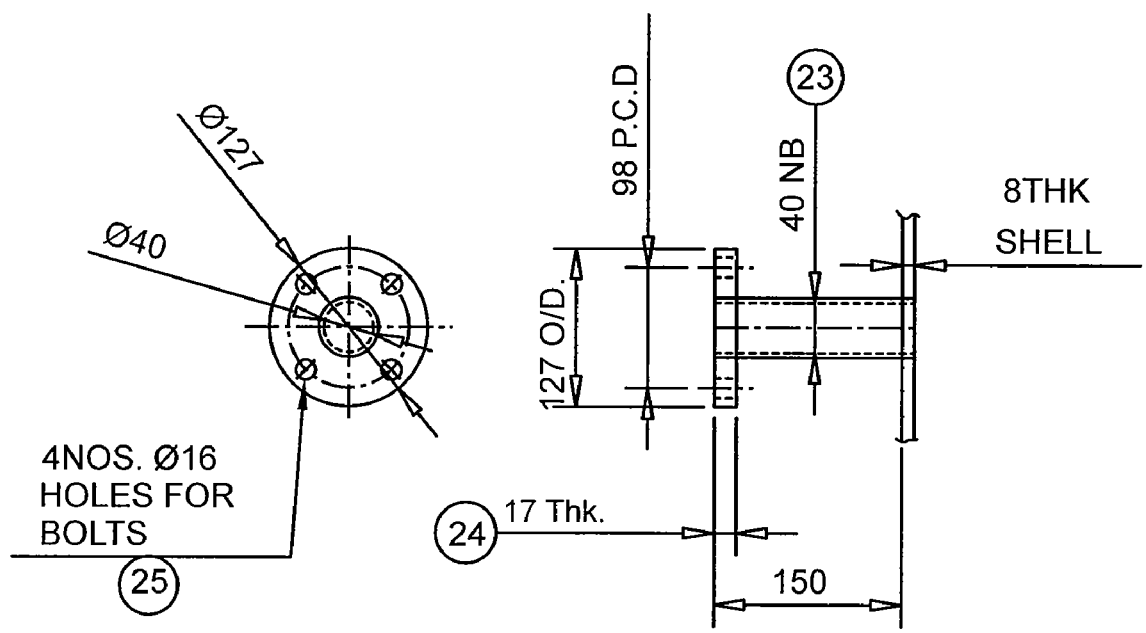
FIG. 8 is a third detailed view of a portion of a vessel of a waste treatment system.
Figure 9:
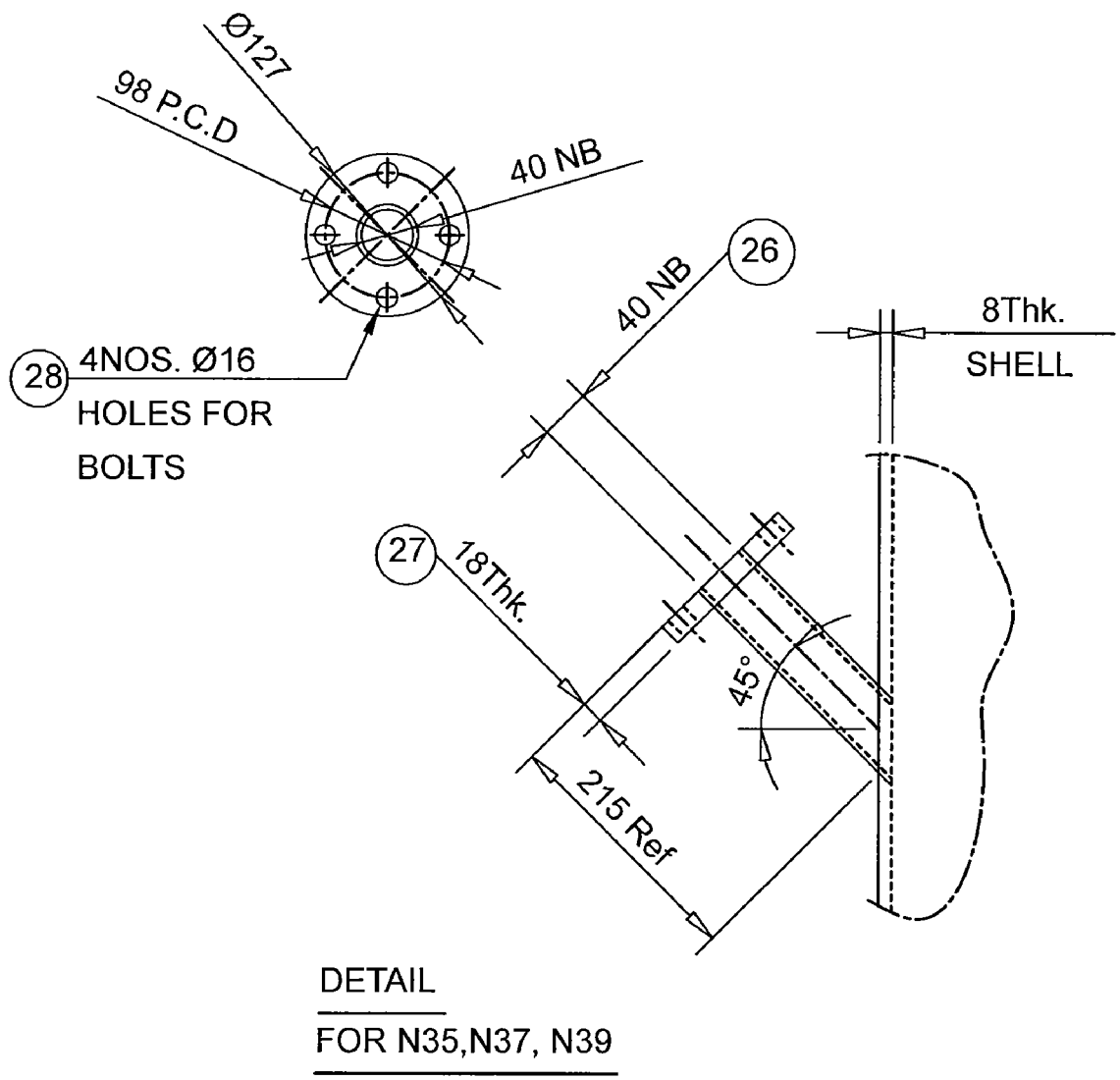
FIG. 9 is a fourth detailed view of a portion of a vessel of a waste treatment system.
Figure 10:
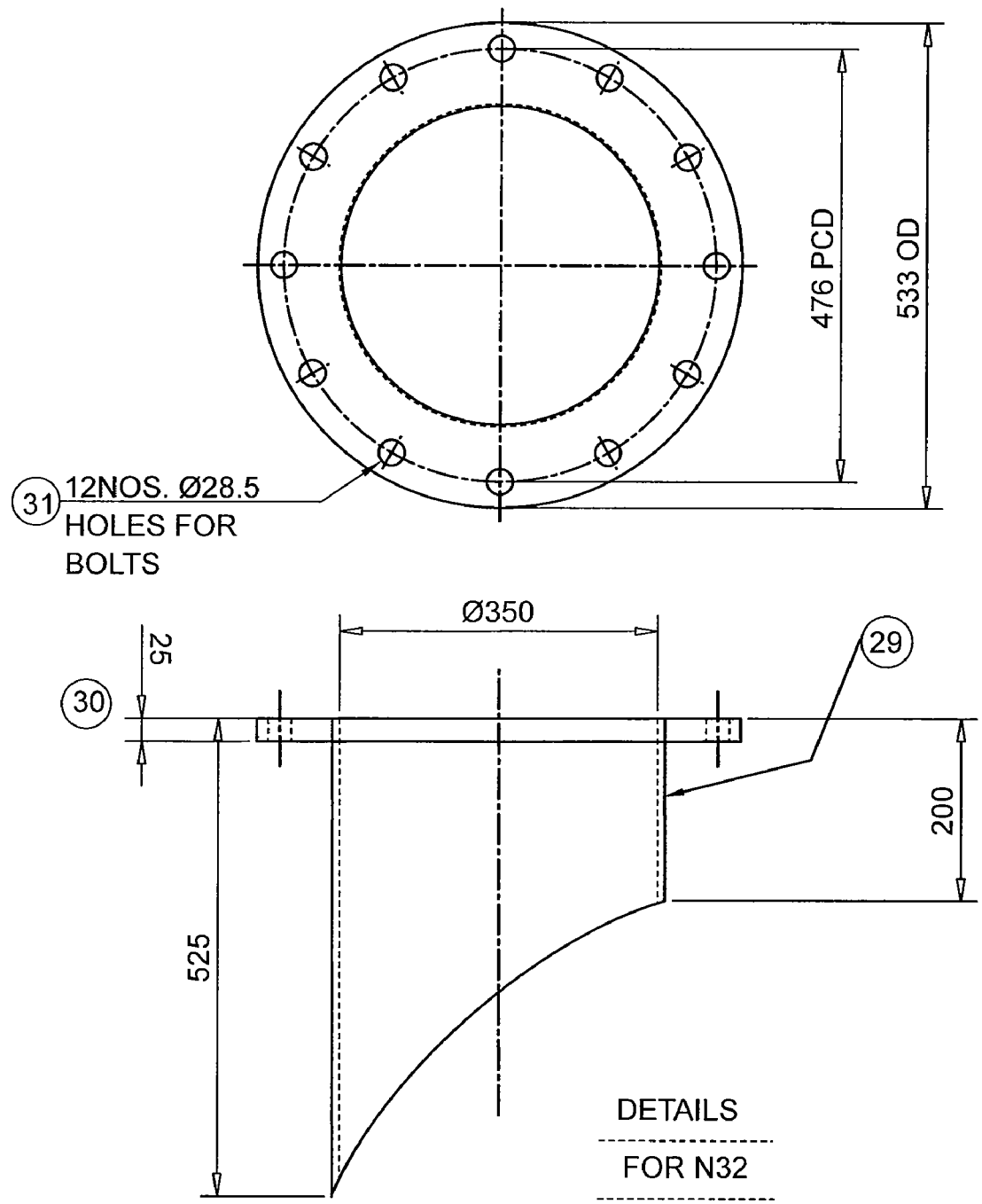
FIG. 10 is a fifth detailed view of a portion of a vessel of a waste treatment system.
Figure 11:
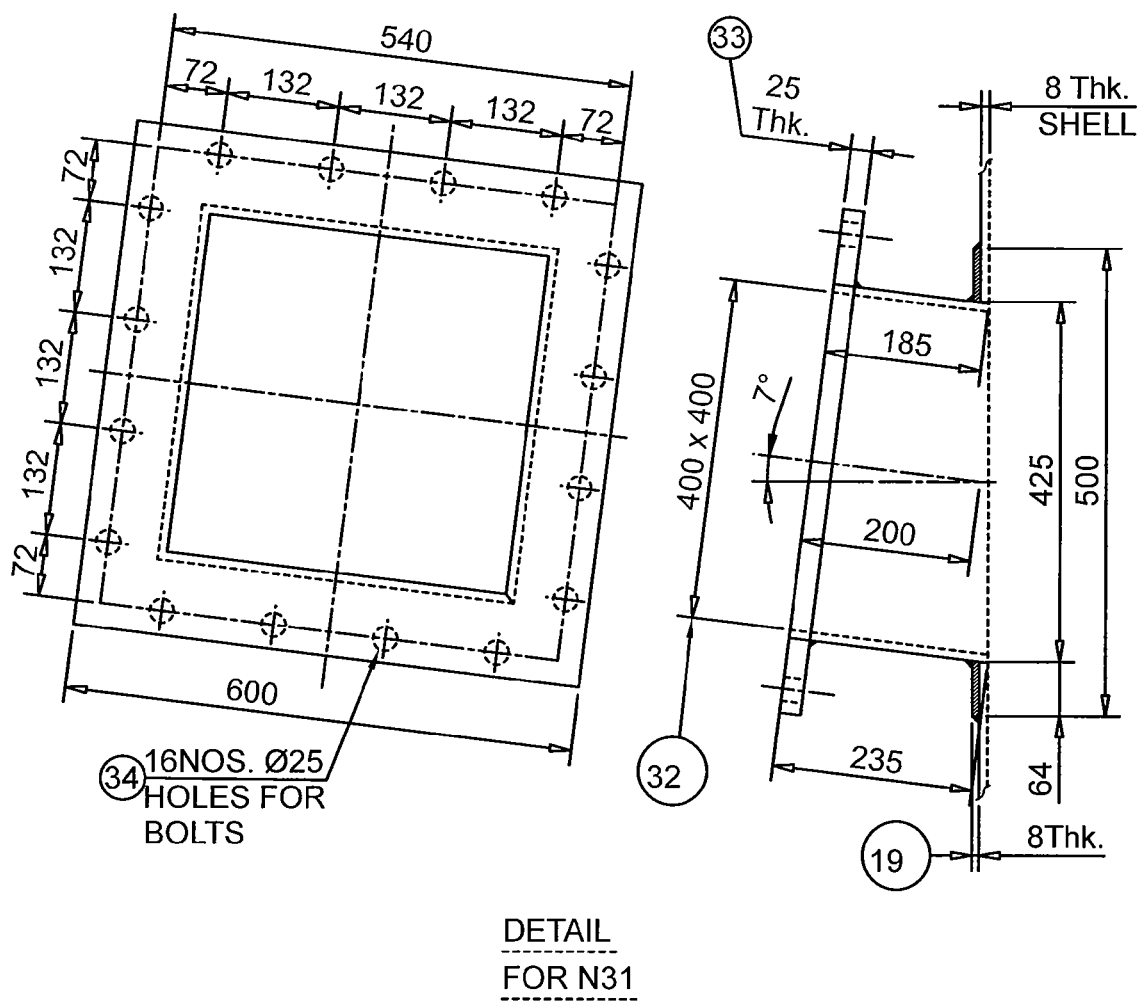
FIG. 11 is a sixth detailed view of a portion of a vessel of a waste treatment system.
Figure 12:
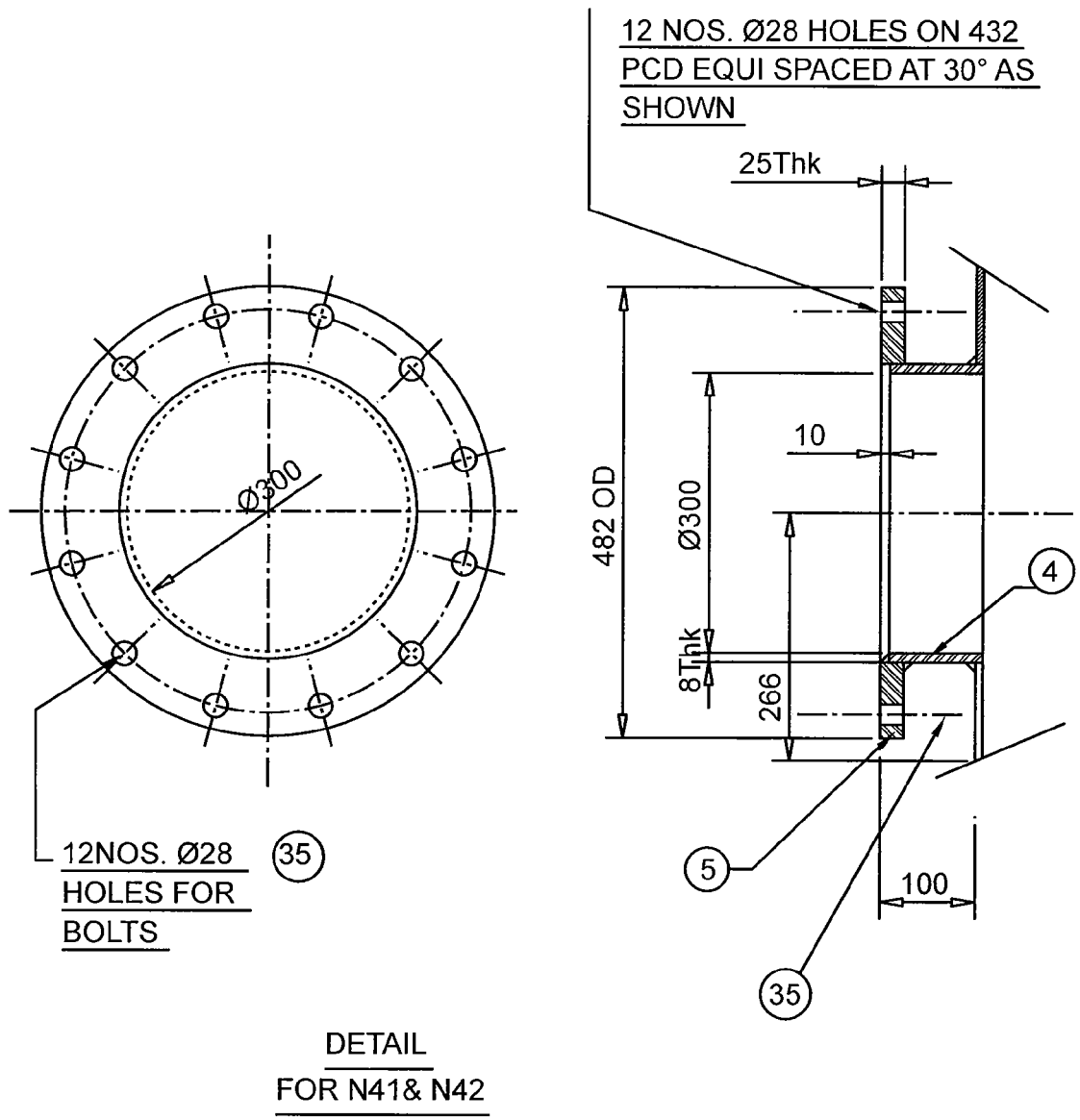
FIG. 12 is a seventh detailed view of a portion of a vessel of a waste treatment system.
Figure 13:
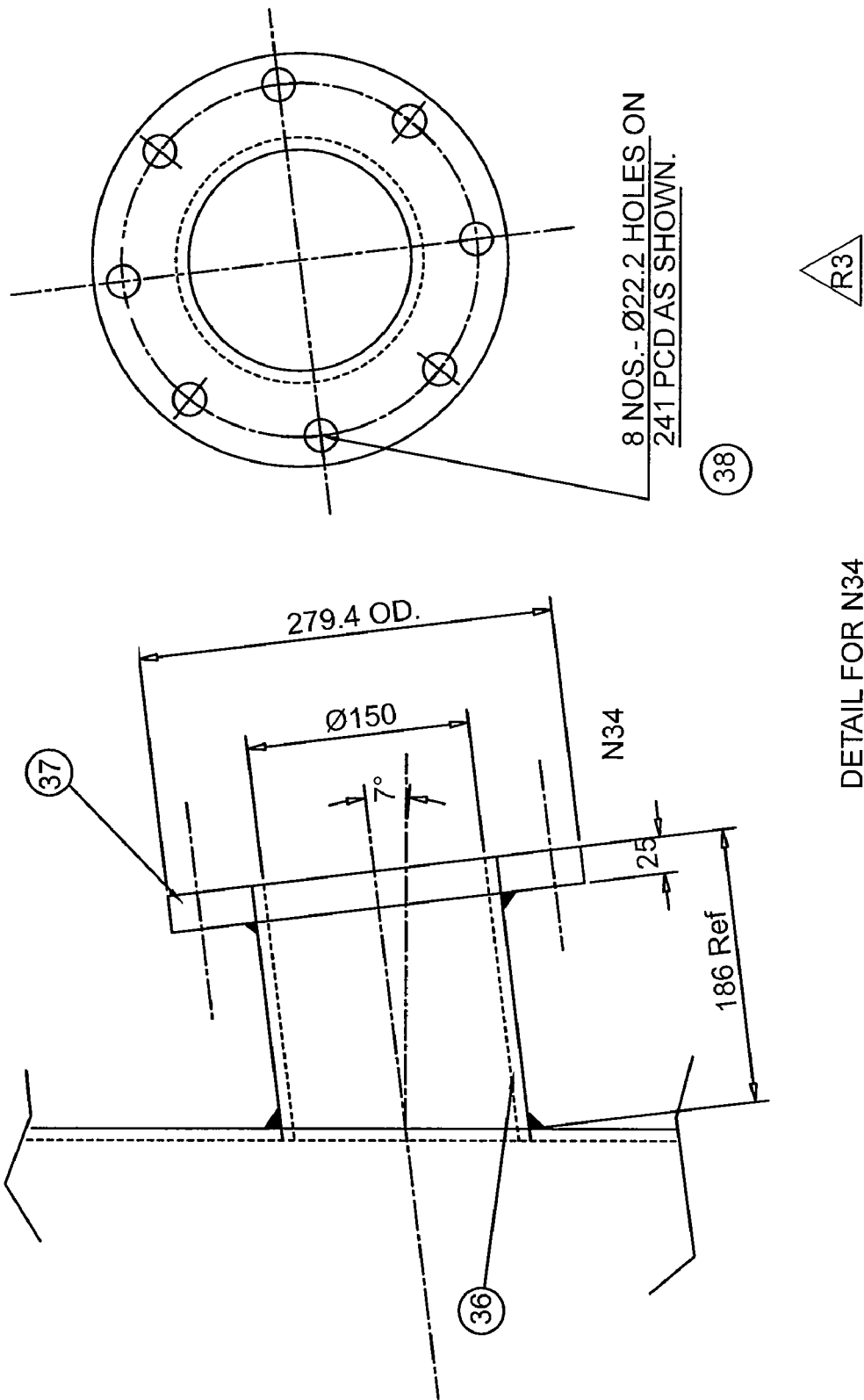
FIG. 13 is an eighth detailed view of a portion of a vessel of a waste treatment system.
Figure 14:
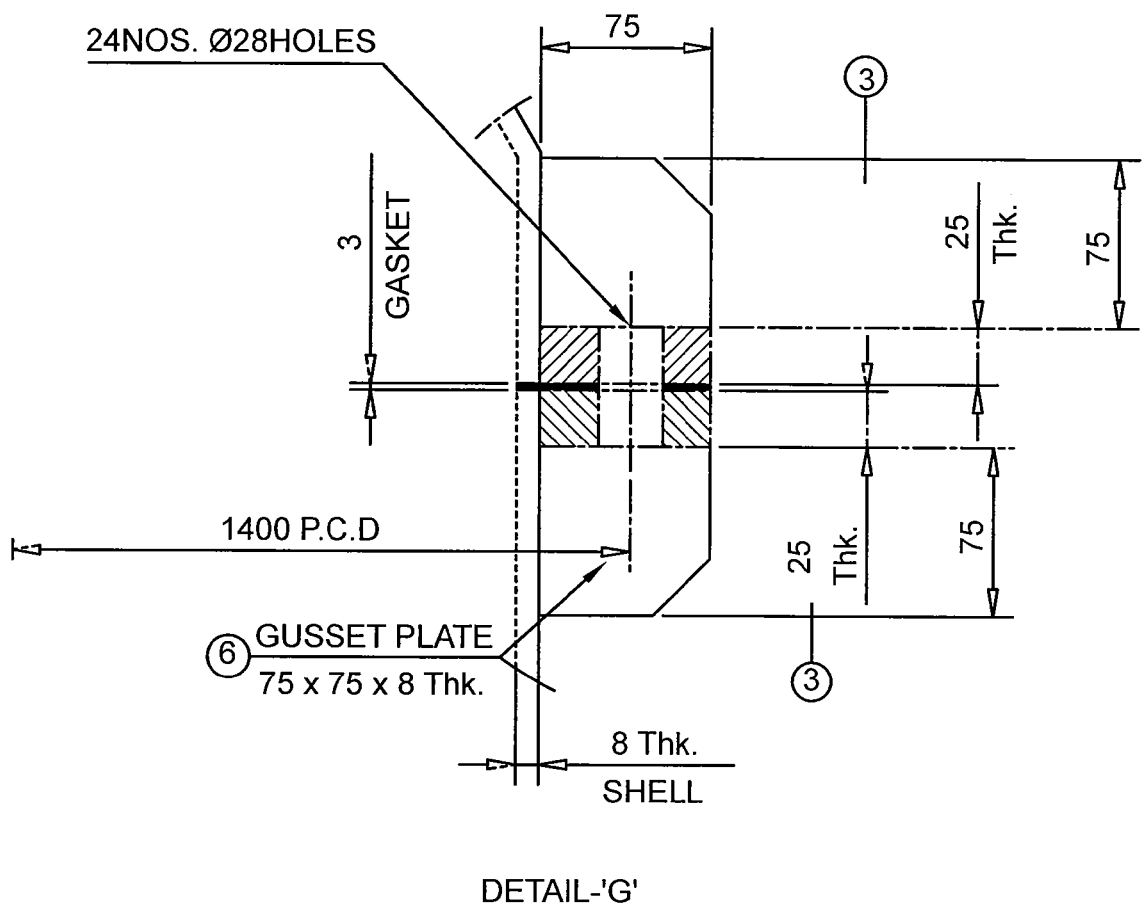
FIG. 14 is a ninth detailed view of a portion of a vessel of a waste treatment system.
Figure 15:
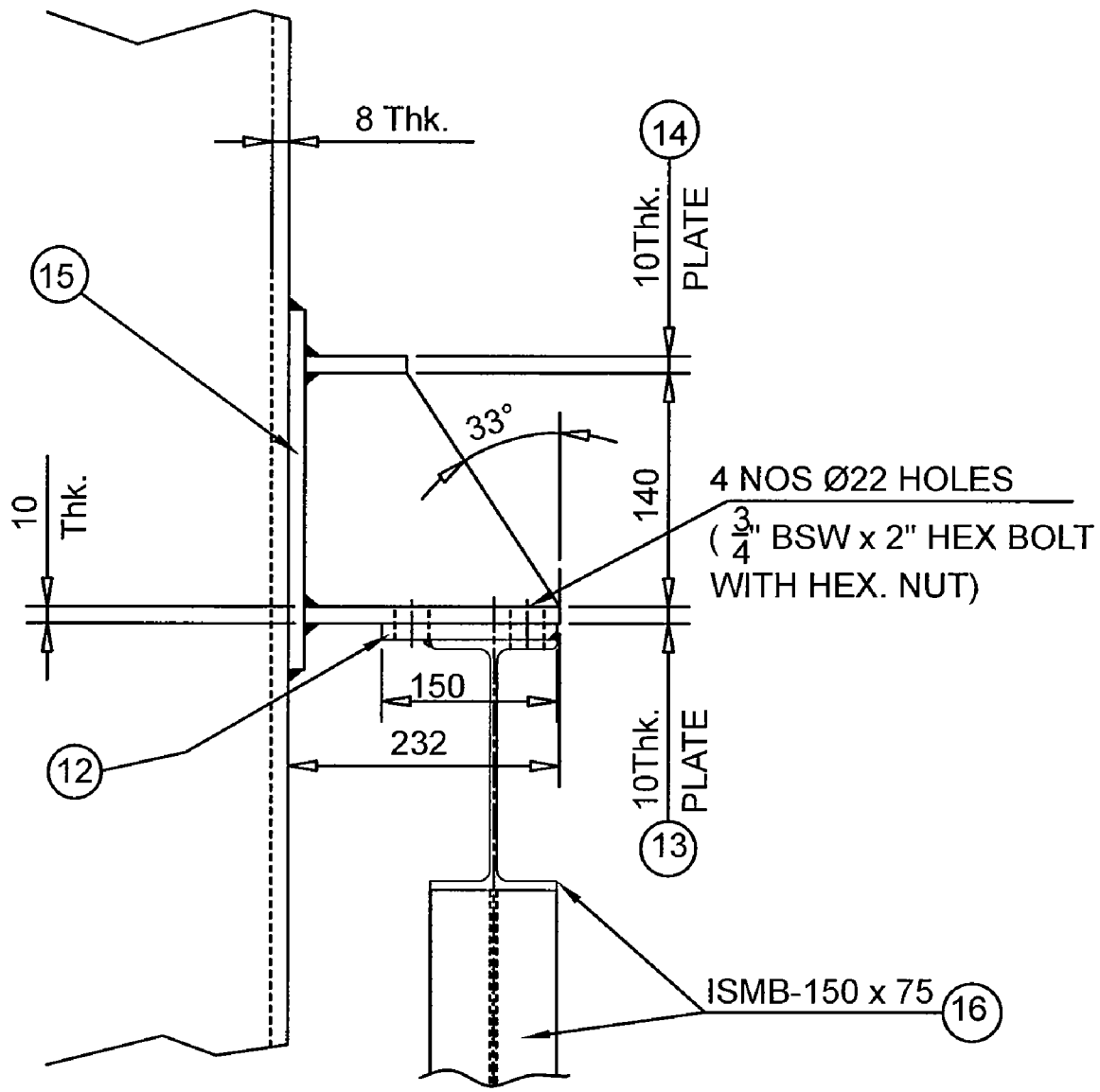
FIG. 15 is a tenth detailed view of a portion of a vessel of a waste treatment system.

FIG. 6 is detailed view of the top mounted electrode insertion point 222. FIG. 7 is a detailed view of the emergency vent 224. FIG. 8 is a detailed view of a temperature nozzle 212 and/or liquid feed nozzle 218. FIG. 9 is a detailed view of a temperature nozzle 212, spare nozzle 216, and the oxygen injector nozzle 204. FIG. 10 is a detailed view of the gas outlet 206. FIG. 11 is a detailed view of the waste feed inlet 220. FIG. 12 is a detailed view of a lower electrode insertion point 214. FIG. 13 is a detailed view of an inspection port 208. FIG. 14 shows detailed information for connecting the lower chamber of the vessel 202 to the upper chamber of the vessel 202. FIG. 15 shows detailed information for connecting the vessel 202 to the mounting rack 302.

Figure 16:
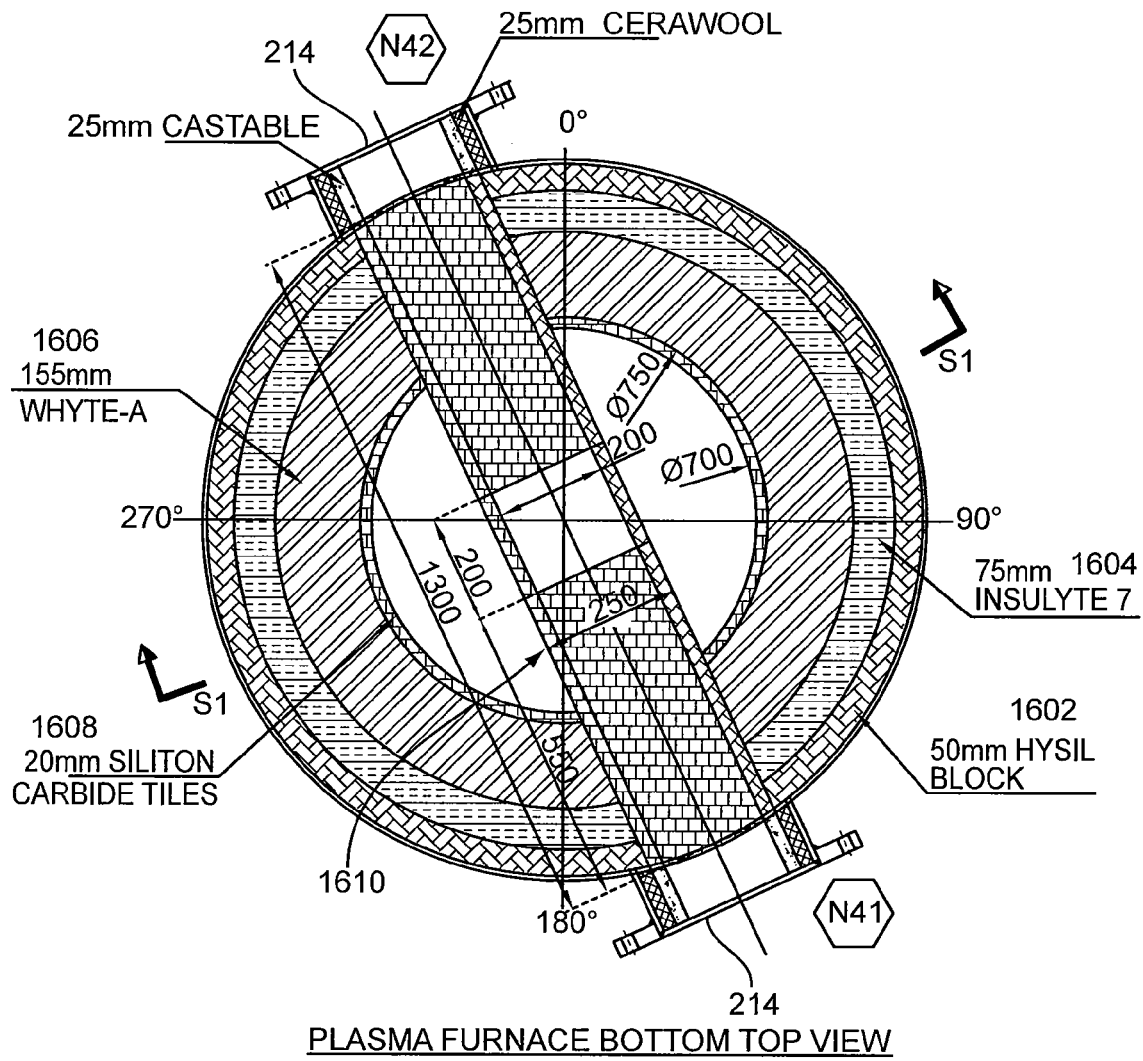
FIG. 16 is a fifth partial view of a vessel of a waste treatment system.

FIG. 16 is a cross-sectional view of a vessel 202 as shown in FIG. 2. In FIG. 16 different layers of refractory materials for the vessel 202 are shown. In FIG. 16, a first layer 1602 is 50 mm of Hysil Block. A second layer 1604 of refractory material is a 75 mm layer of Insulyte 7. A third layer 1606 of refractory material is 155 mm of Whyte-A. A fourth layer of refractory material 1608 is a 20 mm layer of Silicon Carbide Tiles. Inside of the layer of Silicon Carbide Tiles 1608, is the open space of the vessel 202 where the waste feedstock and/or molten slag may collect. Also shown in FIG. 16 is a "channel" 1610 that aside from an opening in its upper surface encases the lower horizontal or generally horizontal electrode used in vessel 202. As shown in FIG. 16, the channel 1610 is made from Cerawool. This channel 1610 is capable of withstanding the high temperature and highly corrosive environment at the bottom of the vessel 202, and promotes the conduction of heat. The channel 1610 shields the bottom electrode from the waste feedstock and molten slag that may collect at the bottom of the vessel 202. An opening in the channel 1610 allows an arc to be formed between the lower horizontally or substantially horizontally mounted electrode within the channel 1610, and a vertical or substantially vertical mounted electrode.

Figure 17:
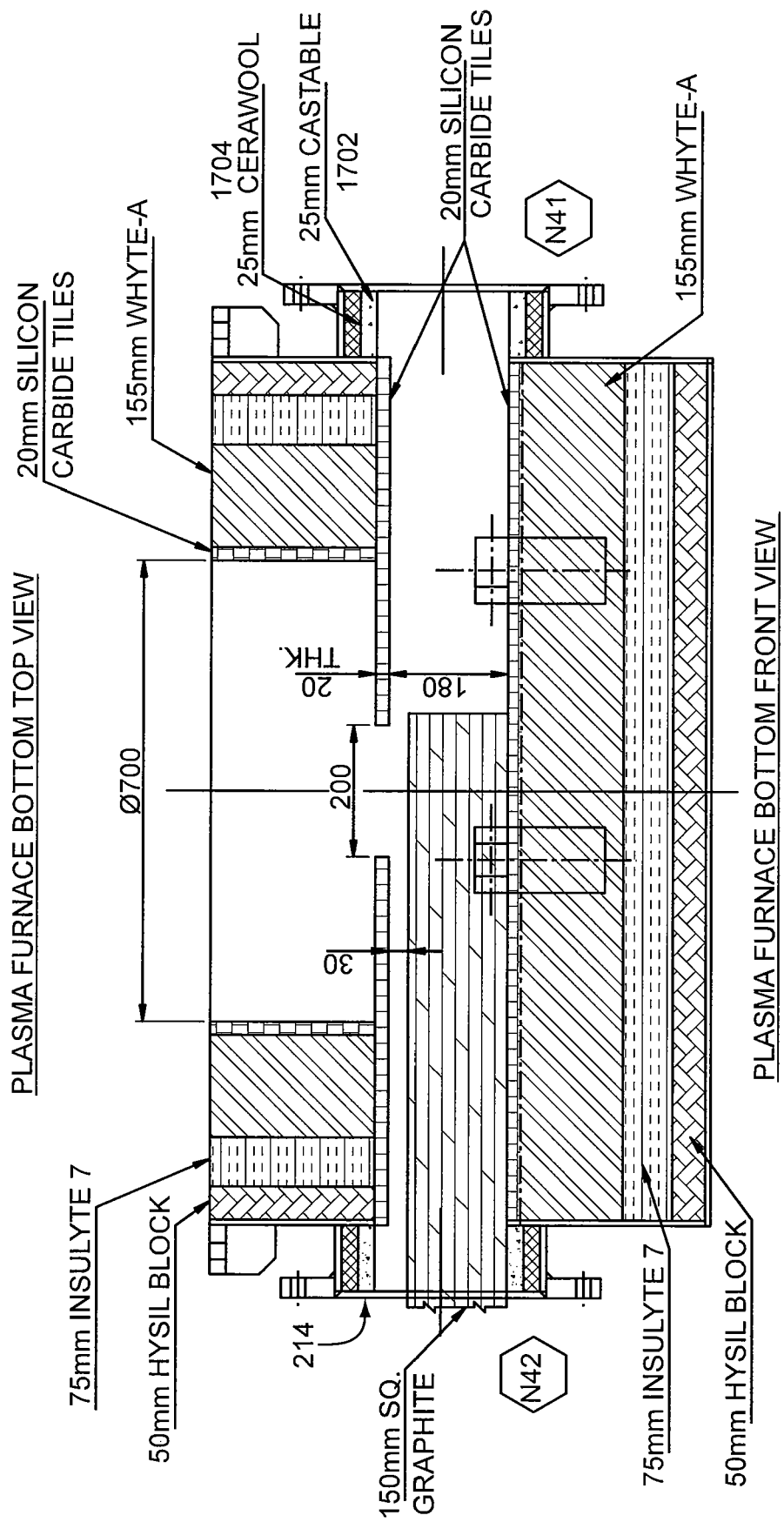
FIG. 17 is a sixth partial view of a vessel of a waste treatment system.

FIG. 17 is a cross-sectional view of the vessel 202 shown in FIG. 16. In FIG. 17, portions of the insertion point of the lower electrode 214 that extend outside of the vessel 202 include a 25 mm layer of castable material 1702 and a 25 mm layer of Cerawool 1704 to insulate the insertion points 214 from the heat generated in the vessel 202. In FIG. 17, the lower electrode is shown within channel 1610.

Figure 18:
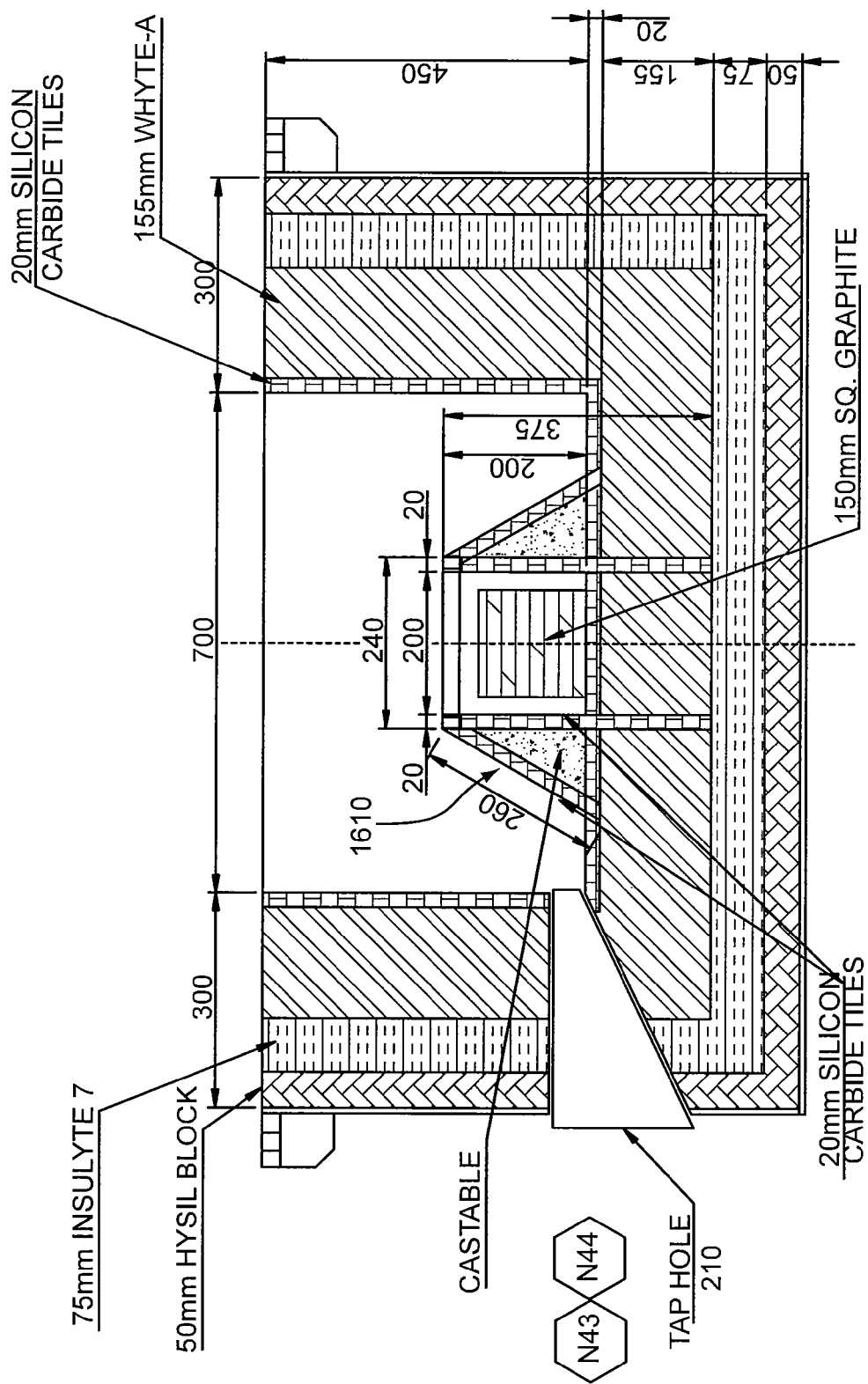
FIG. 18 is a seventh partial view of a vessel of a waste treatment system.

FIG. 18 is a cross-sectional view of the vessel 202 shown in FIG. 16 along the reference line S1-S1 shown in FIG. 16. In FIG. 18, a tapping port 210 is shown having access to the open space of the vessel 202. Also shown in FIG. 18 is the channel 1610. As shown in FIG. 18, the channel 1610 includes Silicon Carbide Tiles that form triangular portions and that are filled with castable material.

Figure 19:
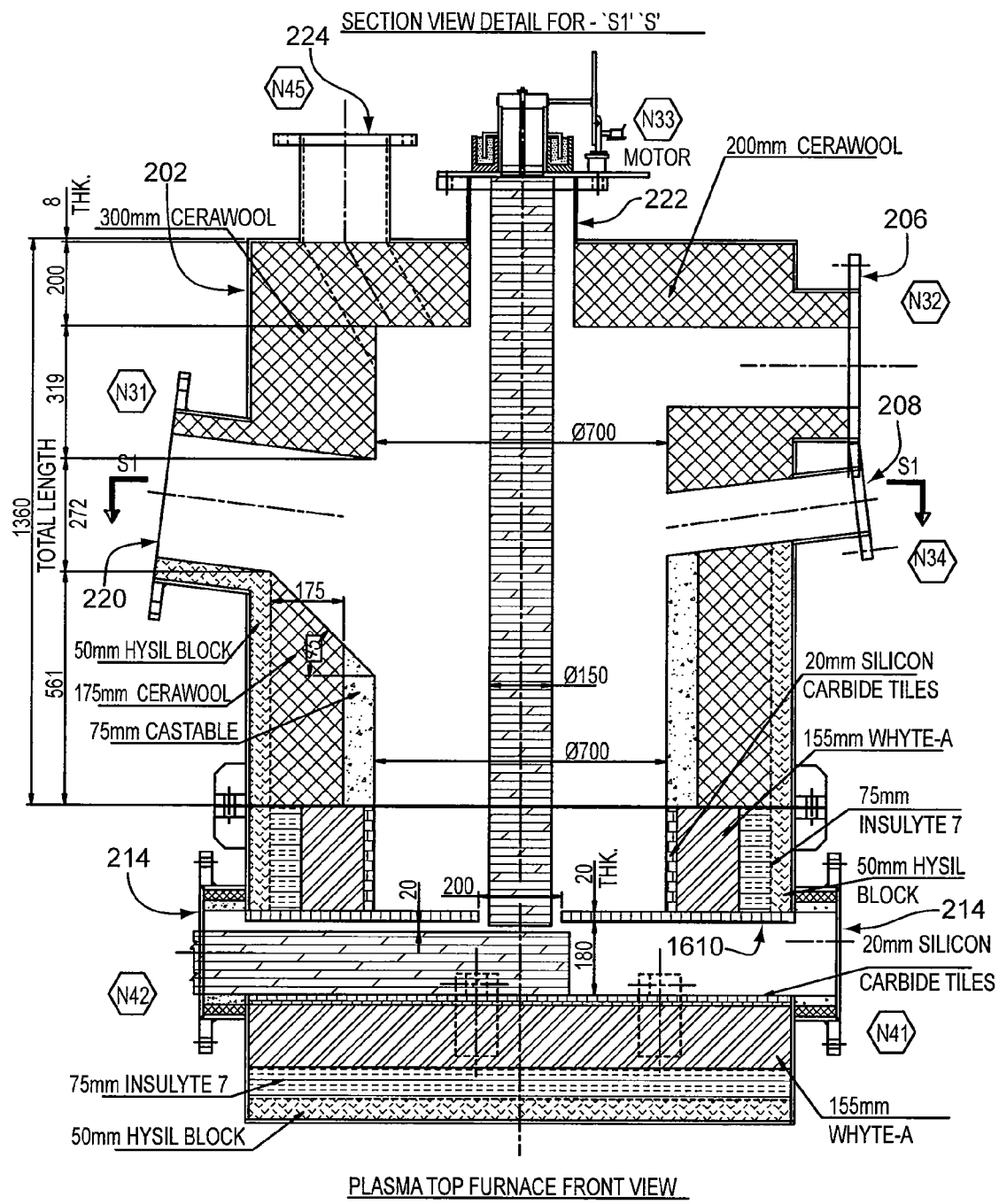
FIG. 19 is an eighth partial view of a vessel of a waste treatment system.

FIG. 19 is a front view of the vessel 202. In FIG. 19, refractory material used in the upper portion of the vessel 202 is shown. The upper portion of the vessel 202 may include layers of Silicon Carbide Titles, Hysil Block, and in some locations castable material. Also shown in the FIG. 19 are both the lower horizontal or substantially horizontal electrode, within the channel 1610, and the vertical or substantially vertical electrode. In FIG. 19, one end of the vertical or substantially vertical electrode is just inside of the channel 1610. In FIG. 19, both the lower horizontal or substantially horizontal electrode and the vertical or substantially vertical electrode are made from graphite material.

In some systems designed according to FIG. 2-19, the electrodes may comprise separate pieces of graphite material that are approximately 450 mm in length and have a main portion that is about 150 mm square. Each portion may have a male extending portion at one end, that extends beyond the about 150 mm square portion, and a female receiving portion at an opposite end capable of receiving a corresponding male portion from a separate piece of electrode material. Both of the male and female portions of the smaller electrode pieces of material may be configured with appropriate threaded connections. To create the electrodes, multiple portions of the separate graphite pieces may be screwed together to form a larger electrode. In some waste treatment systems, a small channel may be drilled and/or formed through the center of the vertical or substantially vertical electrode and/or the horizontal or substantially horizontal electrode to accommodate a small flow of air to act as a plasma carrier gas. In some systems, the amount of air flowing through the channel in the electrode(s) may be about 5 liters per minute. Although described here as being square shaped, some electrodes may be formed in cylindrical, triangular, or other shaped forms.

As part of the heating system, the electrodes may be used to bring the vessel 202 to an operating temperature, such as between about 1000° C. and about 1500° C. After reaching the operating temperature, waste feedstock may be introduced into the system. The waste feedstock may comprise organic waste feedstock, liquid waste feedstock, and waste feedstock containing mixtures of organic and inorganic. As the graphite electrodes are consumed, a replacement length of electrode may be attached to the end that is furthest away from the center of the vessel 202. The replacement length of graphite may be attached by threading the new portion of graphite to the existing electrode.

Figure 20A:
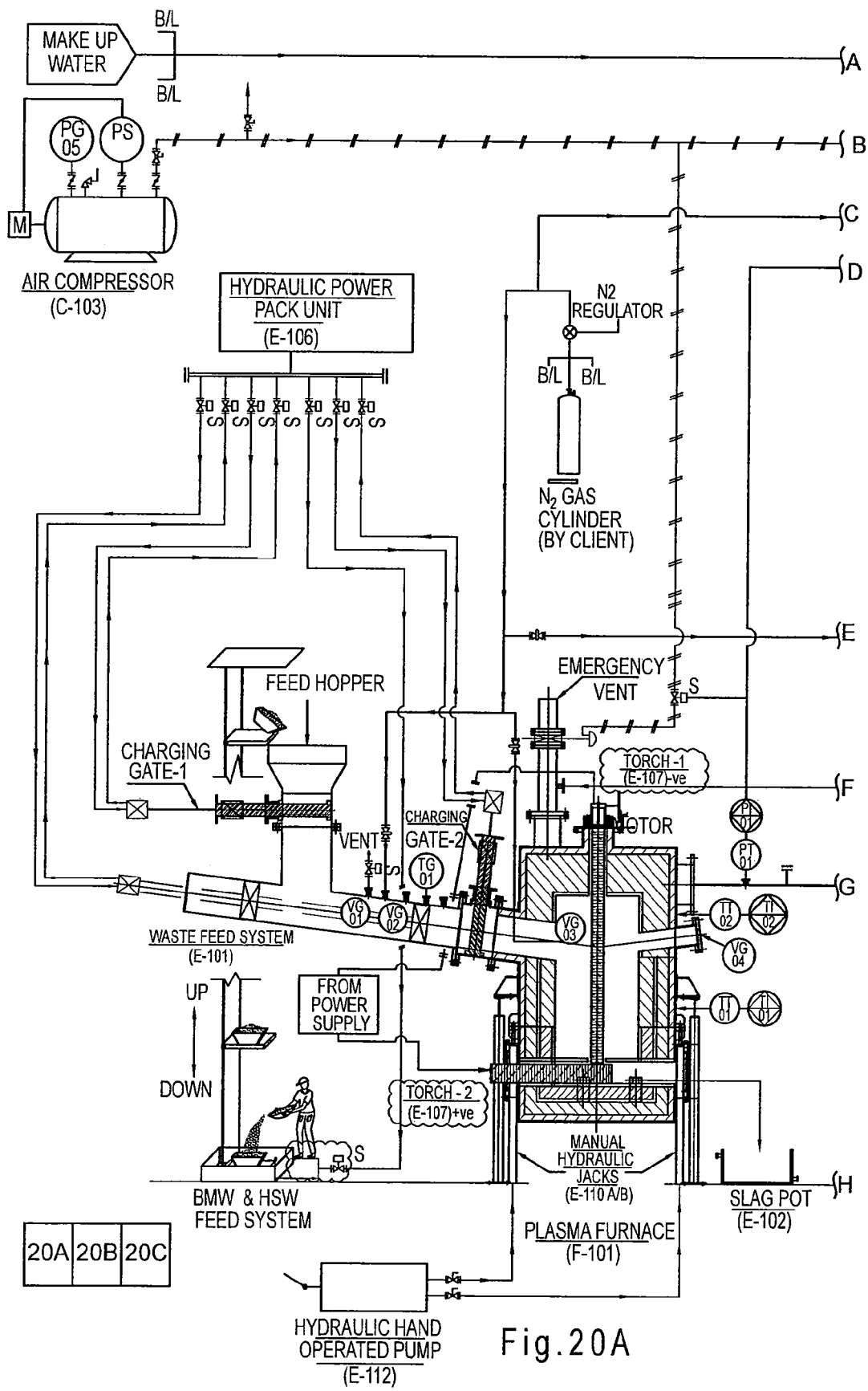
FIGS. 20A-20C are a schematic of a waste treatment system.
Figure 20B:
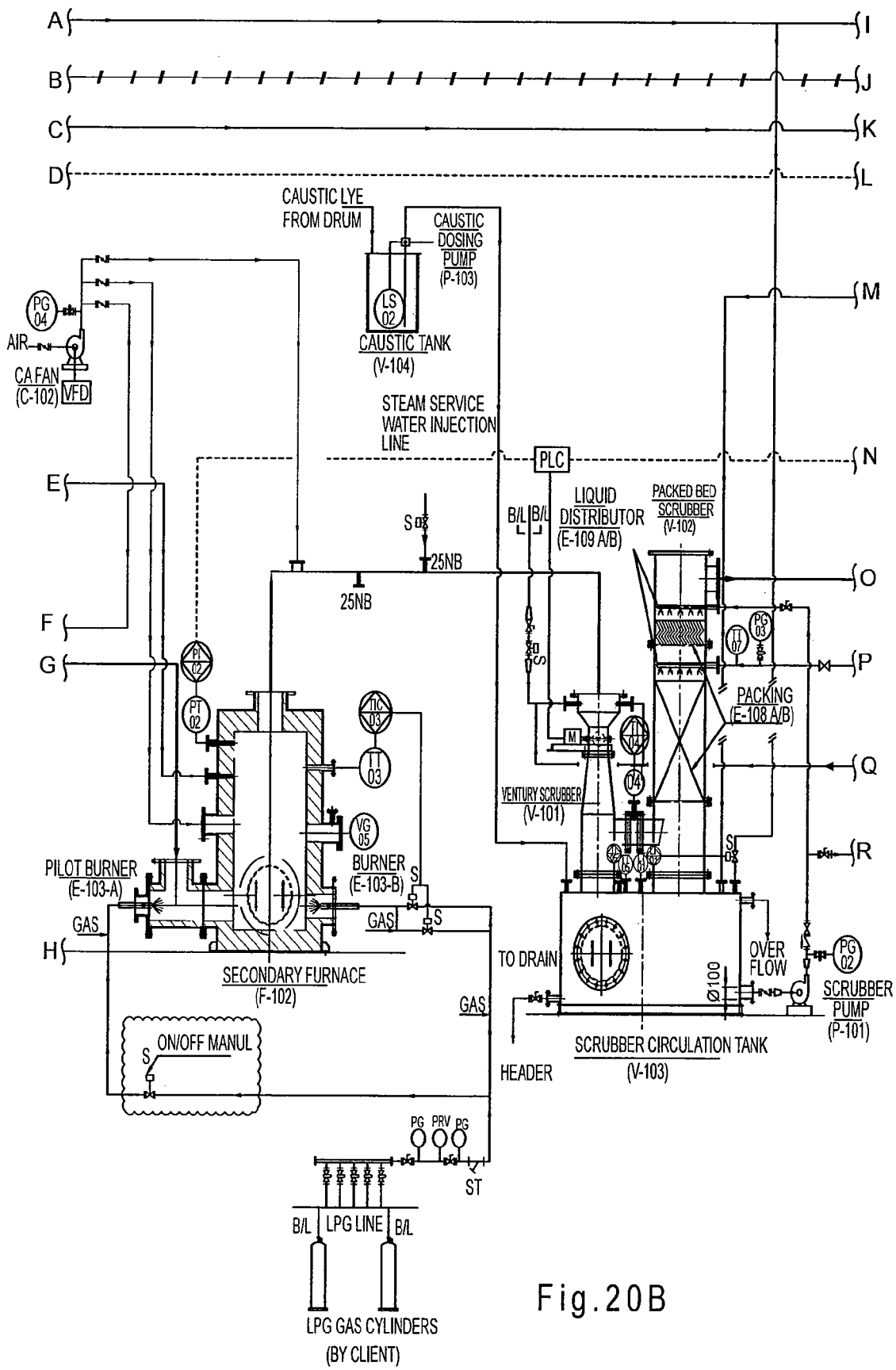
Figure 20C:
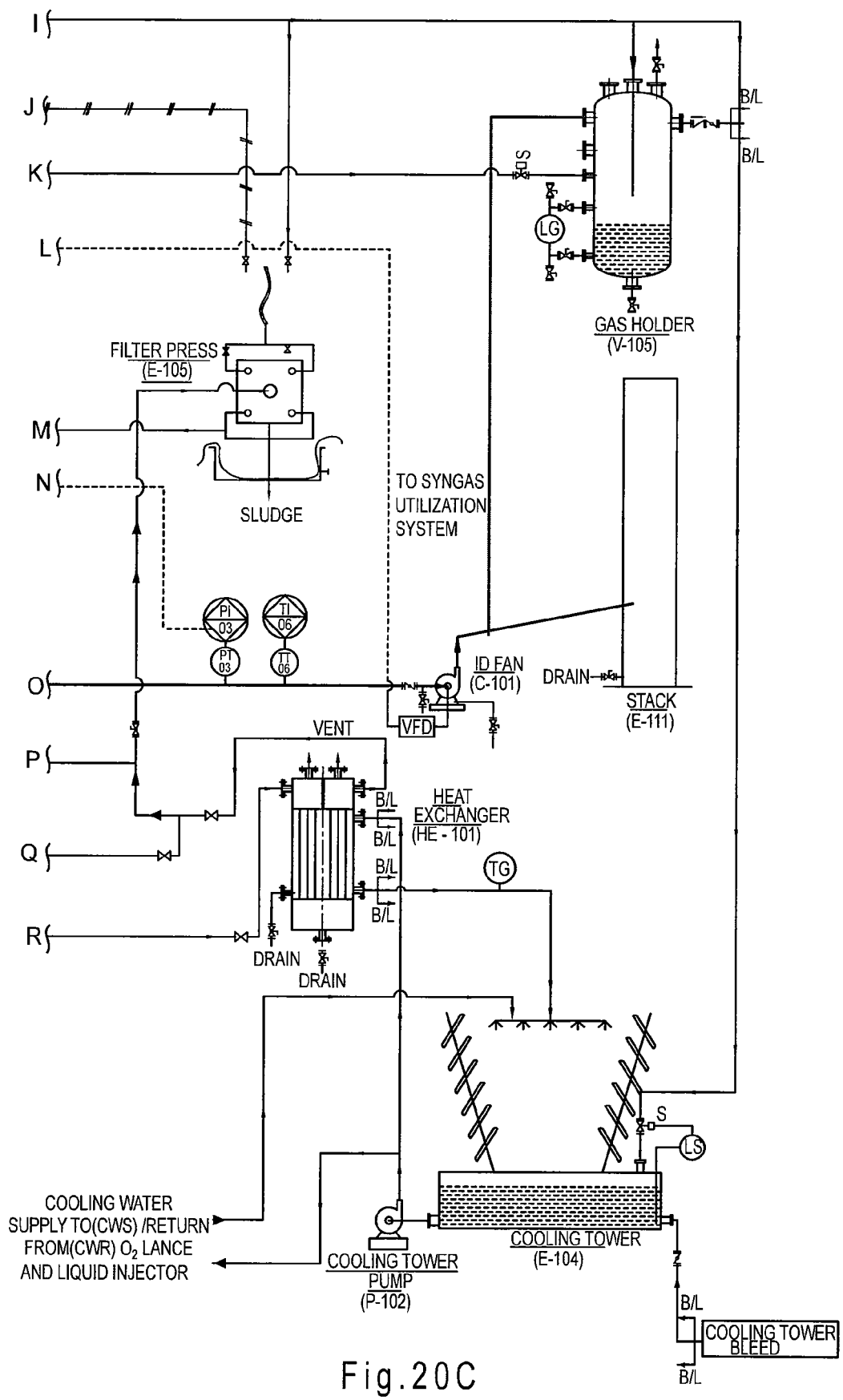

FIGS. 20A-20C are a schematic of a waste treatment system utilizing a vessel as described in FIGS. 2-19. A legend is provided on FIG. 20A identifying how FIGS. 20A-20C related to one another. In FIG. 20A, the waste treatment system includes a feeding hopper that is connected with a waste feed system. A first isolation/charging gate may separate the feeding hopper from the waste feed system, and a second isolation/charging gate may separate the waste feed system from the plasma vessel. In FIG. 20A, the plasma vessel includes a vertical or substantially vertical electrode and a horizontal or substantially horizontal electrode, as explained above. The plasma furnace may be supported by a frame and/or a manual or remote-manual hydraulic jacking system. Slag produced in the plasma vessel may be drained through one or more tapping ports into a slag pot, water tank, sand mold, and/or other container capable of receiving the slag. Gas produced in the plasma furnace may flow to a secondary reaction chamber before processing by gas cleaning and conditioning system. As shown in FIG. 20C, the gas cleaning and conditioning system includes a venturi scrubber, packed bed scrubber, mist elevator, and scrubber circulation tank. Scrubber pumps may be used to circulate water or other solutions to the venturi scrubber and/or mist elevator. A bleed tank may be used to monitor that quality of water circulated to the gas cleaning and conditioning system. A cooling tower may supply cooling water to cool the water in the scrubber circulation tank. An ID fan may be used to pass cleaned and conditioned gas to a syngas utilization system where the syngas may be used for energy production. The synthesis gas will be thermally oxidized (into CO2, H2O, N2 and O2) through the addition of excess air in the secondary reaction chamber. After undergoing cleaning and conditioning in the venturi scrubber and the packed bed tower, the ID fan will convey the thermally oxidized gas to a stack for discharge.

Figure 21:
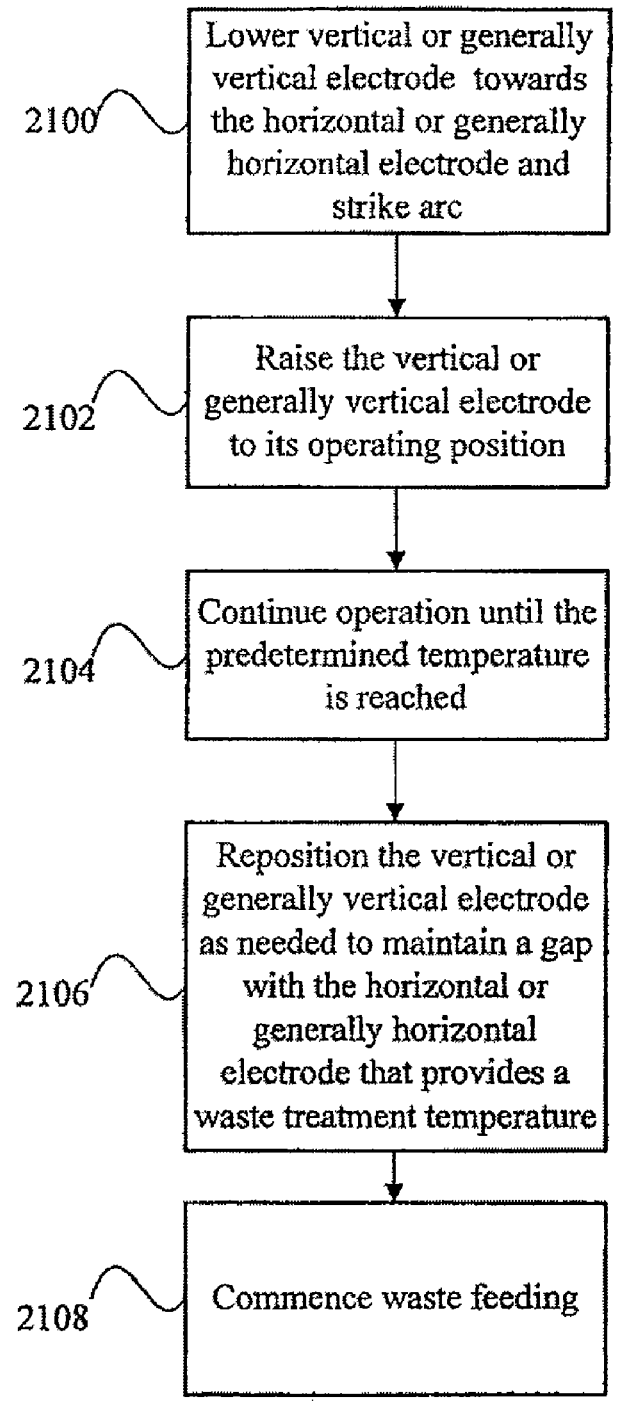
FIG. 21 is a flow chart of a method of preheating a vessel of a waste treatment system.

FIG. 21 is a method of preheating a vessel 202 from a cold condition where the vessel 202 is empty of waste feedstock. At act 2100, the vertical or substantially vertical electrode is lowered towards the horizontal or substantially horizontal electrode at the bottom of the vessel 202 where an arc is struck. In some waste treatment systems, the arc may be struck with the assistance of an igniter when the vertical or substantially vertical electrode is within about 10 mm of the electrode at the bottom of the vessel 202. A protection circuit may be provided within the power supply 132 to shut of the system if a short circuit exists because the electrodes are in direct contact. This shut off system may be engaged if there exists direct contact between the electrodes for longer than a programmed time period, such as about 3 seconds. Once the arc is struck, the vertical or substantially vertical electrode may be raised to an operational position at act 2102. In some waste treatment systems, this operating position may be approximately 25 mm to approximately 75 mm above the lower electrode. The vertical or substantially vertical electrode may be maintained at this position until the vessel 202 reaches a predetermined temperature at act 2104. In some waste treatment systems, this temperature may be about 1000° C. At act 2106 the gap between the electrodes may be varied (e.g., manually, remote manually, or automatically with the aid of an electrode movement system) to obtain through monitoring a predetermined waste treatment temperature. The predetermined waste treatment temperature may be between a range of about 800° C. to 1200° C. At act 2108, once the predetermined waste treatment temperature has been reached, waste feeding operations may commence.

Figure 22:
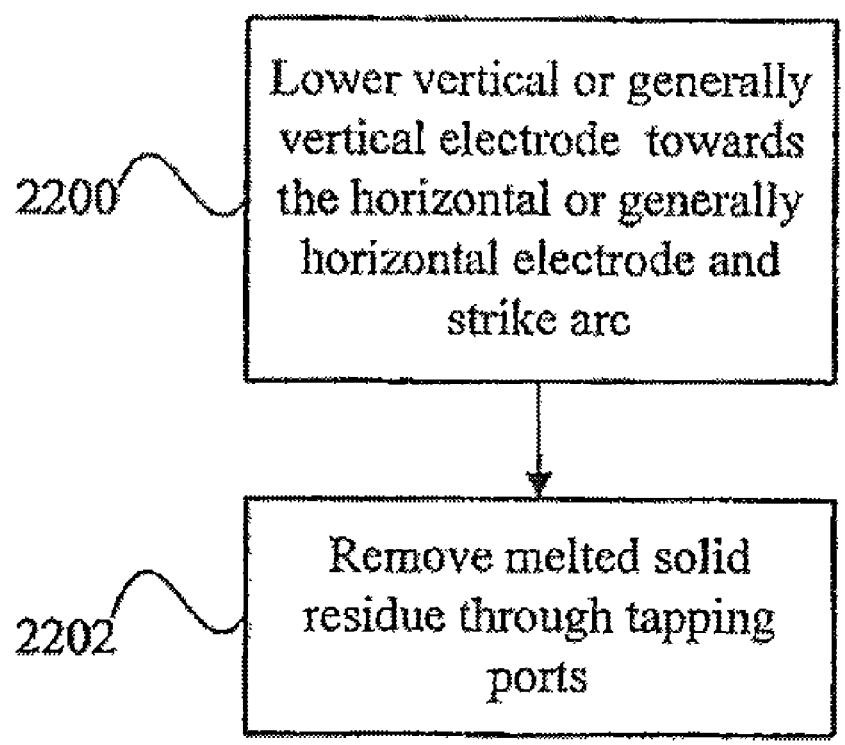
FIG. 22 is flow chart of a method of inorganic residue melting of a waste treatment system.

FIG. 22 is a method of inorganic residue melting. The inorganic residue melting process may be used when the vessel 202 contains solid residue from a previous operation. The inorganic residue melting operation may help to minimize wear on the electrodes, minimize energy consumption, and/or optimize operational time. At act 2200, the vertical or substantially vertical electrode is lowered toward the horizontal or substantially horizontal electrode at the bottom of the vessel 202 where an arc is struck. The electrodes may be operated in this position until temperature within the vessel 202 reaches a predetermined temperature, such as about 1400° C., at which point the tap plugs will be pulled and the tapping process initiated. Operation of the electrodes may continue in this manner until substantially all of the inorganic solid residue has melted and has been tapped out of the vessel. At act 2202, the melted solid residue may be removed from the vessel 202 through one or more tapping ports.

Figure 23:
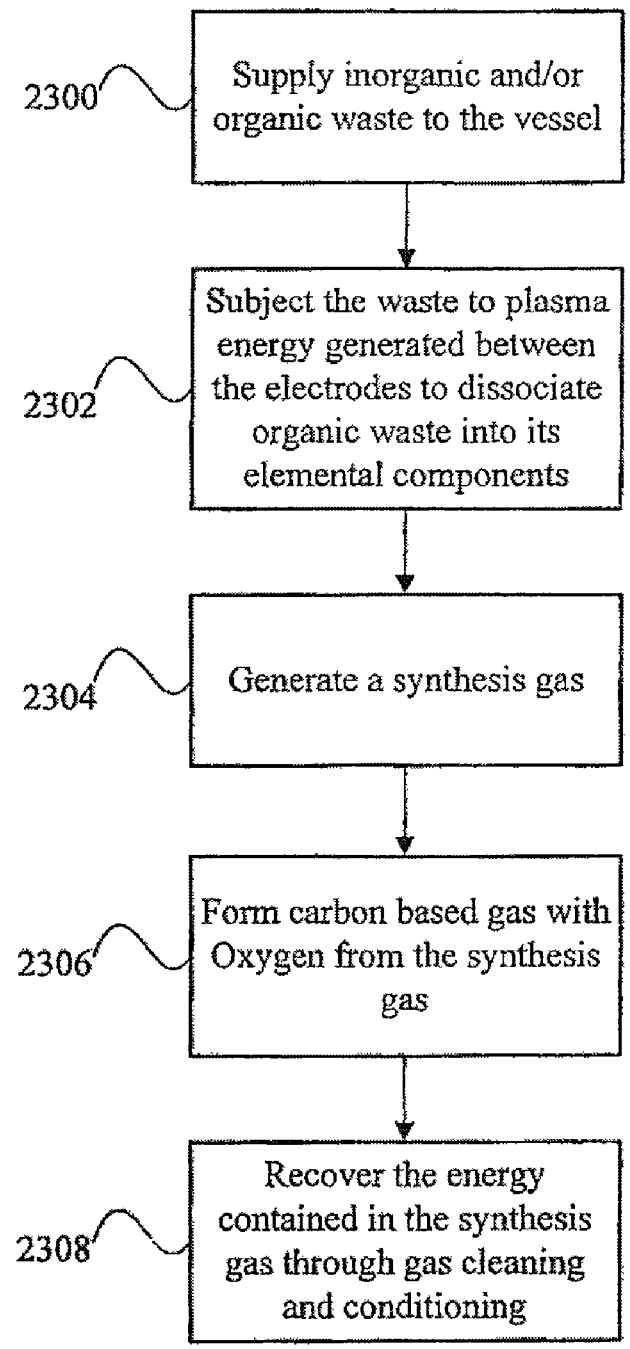
FIG. 23 is flow chart of processing waste with a waste treatment system.

FIG. 23 is a method of processing inorganic and organic waste. At act 2300, inorganic and organic waste may be supplied to the vessel 202. The organic waste may be provided in the form of atomized liquid waste. Atomized liquid waste may be injected into the vessel 202 by one or more air-atomizing nozzles positioned around the circumference of the vessel 202 or attached to a waste feedstock chamber. Alternatively, organic waste may be extracted from solid waste that has been subjected to the energy of the arc electrodes. Also at act 2300, inorganic and/or organic waste may be supplied to the vessel 202 through the waste feed chamber and the waste feed inlet 214.

At act 2302, the waste may be subjected to the arc energy generated between the electrodes until the organic waste is gasified and substantially dissociates into its elemental components. The elemental components of organic waste may include solid carbon (carbon particulate), hydrogen gas, nitrogen, and/or halogens. In some waste treatment systems, the gasified organic waste may be subjected to the energy of the heating system for a predetermined residence time, such as about 2.0 seconds. The gasified organic waste may traverse a cyclonic or substantially cyclonic path while in the vessel 102 to ensure proper mixing and to ensure that the wastes reside in a high-heat zone located in the central lower portions of the furnace.

At act 2304, an oxidant may be added to the elemental components to generate a synthesis gas. As the temperature within vessel increases, the contents, such as air; waste; and/or particulates, within vessel 202 may undergo movement as a result of general physics principles. As the contents within vessel 202 move, the contents may encounter boundaries resulting from the shape of the vessel 202. The shape of the vessel 202 and the location of the synthesis gas exhaust nozzles may facilitate a turbulent/cyclonic/mixing or substantially turbulent/cyclonic/mixing flow of the contents within the vessel 202. The positioning of one or more of the plasma electrodes may also affect the turbulent/cyclonic/mixing or substantially turbulent/cyclonic/mixing flow of synthesis gas within the vessel 202. The turbulent/cyclonic/mixing or substantially turbulent/cyclonic flow within vessel 202 may increase the amount of time (e.g., residence time) that the synthesis gas and some or substantially all of the entrained particulate may remain within a turbulent region of the vessel 202. Additionally, the turbulent/cyclonic or substantially turbulent/cyclonic flow may facilitate the movement of the synthesis gas and some or substantially all of the particulate into the upper chamber of the vessel 202. The position of the syngas outlet, the configuration of the Hot pipe that conveys the syngas out of the vessel and the shape of the upper sections of the vessel lining may assist in creating a limited venturi-type effect for the gas exiting the vessel. Such an effect will help to reduce the carry-over of particulates, increase the residence time and enhance the mixing of the syngases within the vessel. At act 2306, the oxygen may combine with some of the elemental components to form carbon monoxide gas and/or carbon dioxide gas.

At act 2308, the energy contained in the synthesis gas may be recovered, such as to form steam, hot water for commercial uses or used in an especially formulated gas-engine to produce electric power. The synthesis gas may be cooled prior to entering the secondary chamber. The cooled gas may then be conditioned, cleaned, and/or made ready for commercial use.

Figure 24:
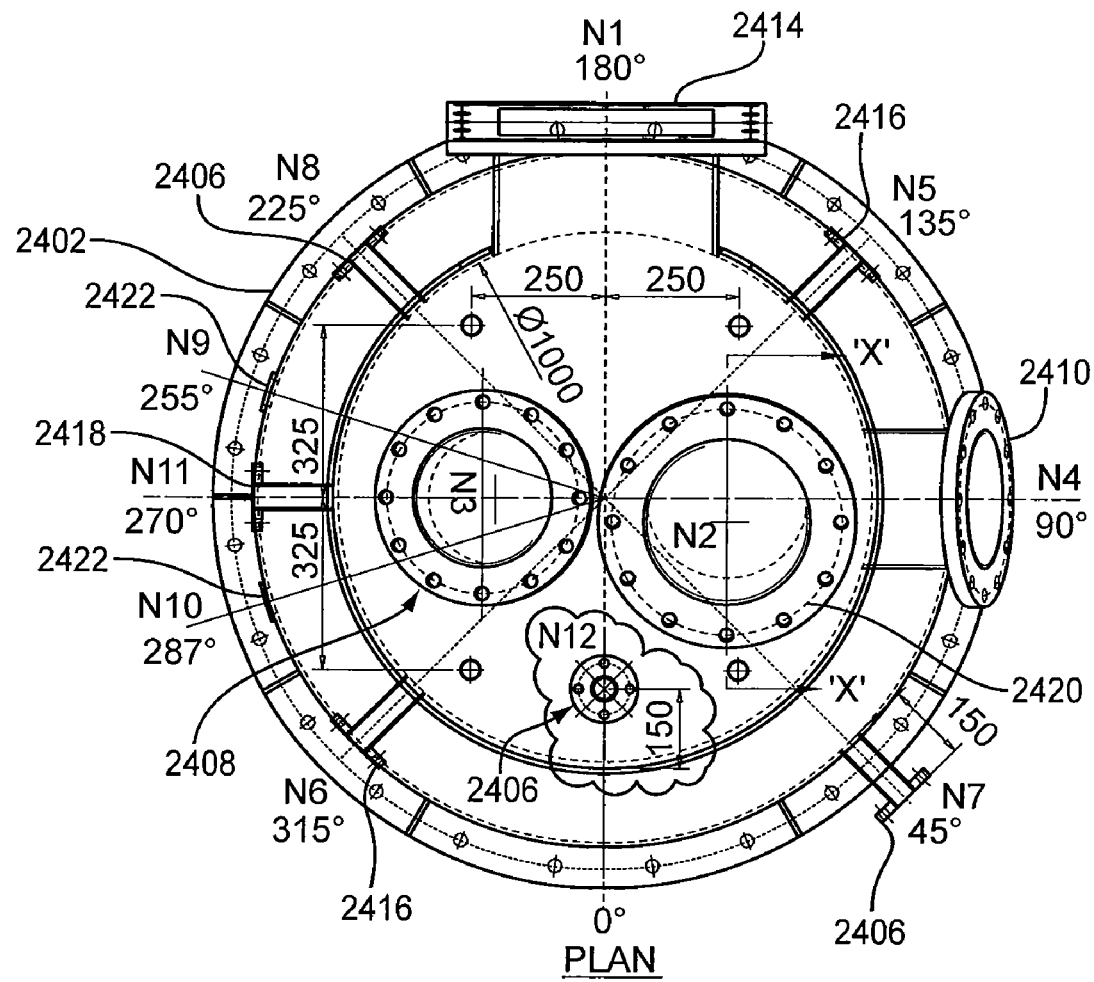
FIG. 24 is a partial schematic of an alternate vessel of a waste treatment system.

FIGS. 24-33 are exemplary illustrations of a second vessel 2402 and corresponding components that may be used in connection with an alternative waste treatment system. While FIGS. 24-33 contain various design measurements, other larger and smaller measurements may be used in designing a waste treatment system according to FIGS. 24-33. FIG. 24 is a top view of an exemplary vessel 2402. In FIG. 24, temperature nozzles 2406 may be positioned at various locations around the circumference of the vessel 2402. The temperature nozzles 2406 may be used to determine the temperature within the vessel 2402. The use of multiple temperature nozzles 2406 aids in obtaining an accurate measure of the temperature within the vessel 2402. Solid, semi-solid, and/or liquid waste may be introduced into the vessel 2402 through waste inlet 2414. Additionally, solvent waste may be introduced into the vessel through a waste feed nozzle 2418. The synthesis gas generated through the pyrolysis process may be vented off to the secondary reaction chamber through a pipe that connects to the vessel 2402 at opening 2420. As shown in FIG. 24, a transferred-arc electrode may be positioned at opening 2408 and a non-transferred-arc electrode may be positioned at opening 2410. Also shown in FIG. 24 are viewing ports 2416 that permit an observer to view the inside of the vessel 2402, the slag pool of the vessel 2402, and/or the transferred-arc electrode and/or non-transferred-arc electrode. Tap ports may be positioned at various locations around the vessel 2402 and are shown in FIG. 24 at 2422. As shown in FIG. 24 and subsequent FIGS. 25-32, circled reference numbers refer to hardware that may be used to construct vessel 2402. A listing of this hardware may be found in Table 8 below.

Figure 25:
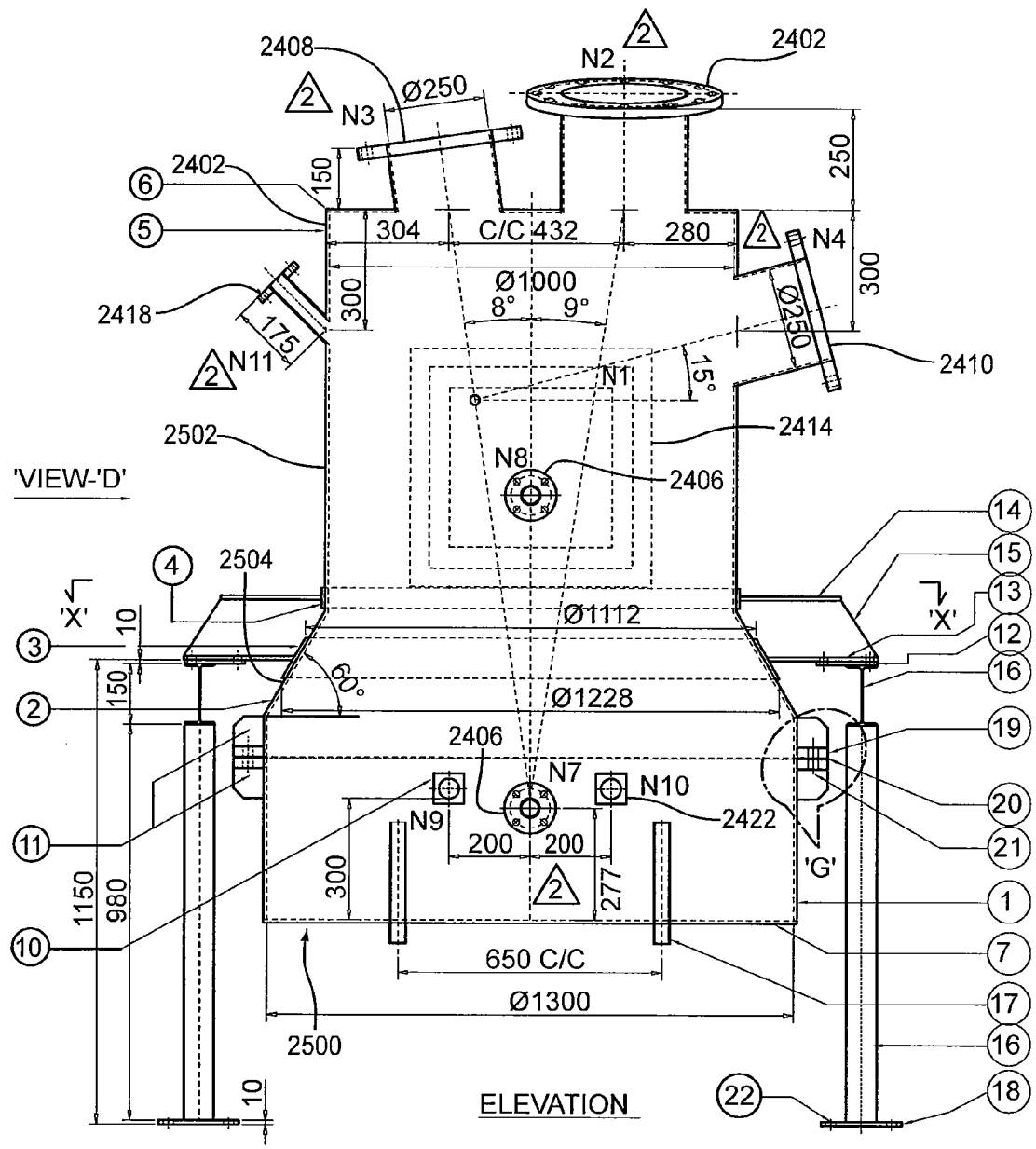
FIG. 25 is a second partial schematic of an alternate vessel of a waste treatment system.

FIG. 25 is an elevation view of the vessel 2402 from FIG. 24. In FIG. 25, the vessel 2402 includes a lower chamber 2500 and an upper chamber 2502. In some systems, a generally frustoconical section 2504 may be positioned between the lower and upper chambers 2500, 2502. Alternatively, the lower and upper chambers, 2500 and 2502, may be coupled/formed together. The transferred-arc electrode may be placed in opening 2408, and the non-transferred-arc electrode may be placed in opening 2410. One or more tapping ports 2422 may be provided around the lower chamber 2500 of the vessel 2402. In FIG. 25, the waste feed inlet into the vessel 2402 is shown as 2414. The vessel 2402 may also include one or more inspection ports 2416 which may provide visibility to the interior of the vessel 2402, the placement of the electrode components, and/or the slag pool at the bottom of the vessel 2402. Additionally, one or more solvent waste feed nozzles 2418 may be provided. In FIG. 25, the solvent waste feed nozzle 2418 is shown as part of the vessel 2402; however the solvent waste feed nozzle 2418 could also be part of the waste feed chamber as explained with regard to FIG. 1. Furthermore, as shown in FIG. 25, the vessel 2402 may be mounted in a rack such that the vessel 2402 is raised off of the floor.

Figure 26:
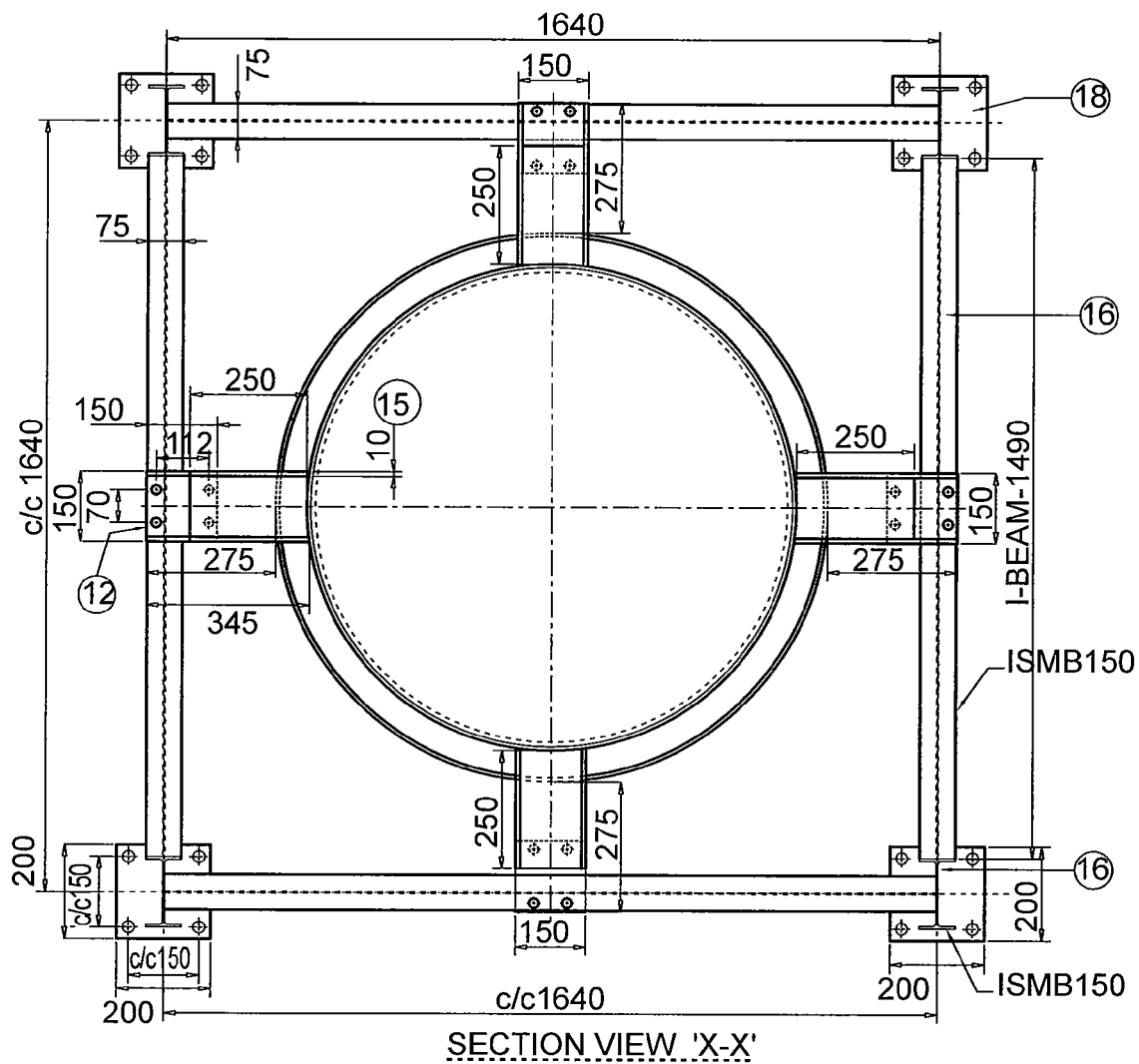
FIG. 26 is a third partial schematic of an alternate vessel of a waste treatment system.
Figure 27:
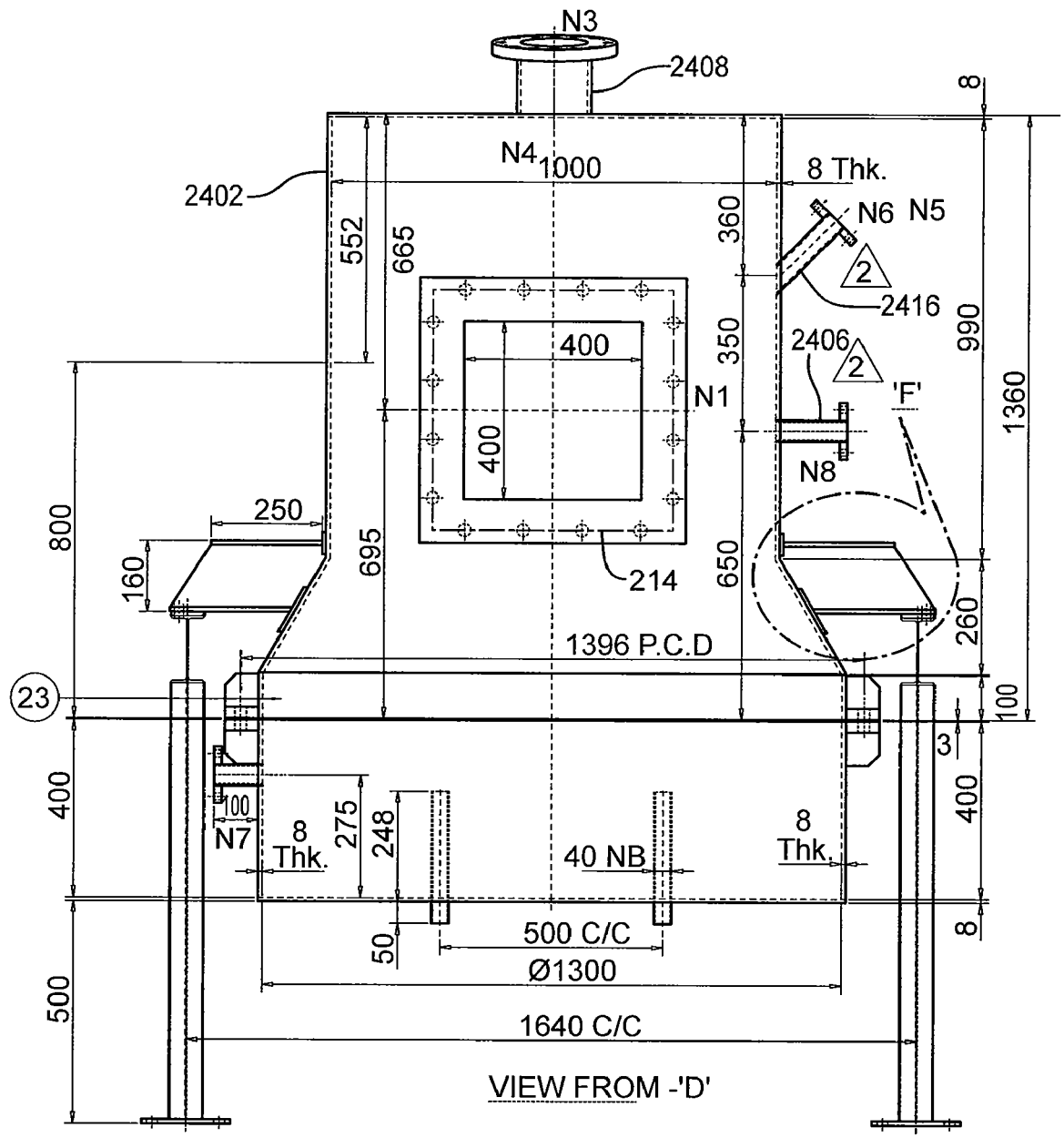
FIG. 27 is a fourth partial schematic of an alternate vessel of a waste treatment system.
Figure 28:
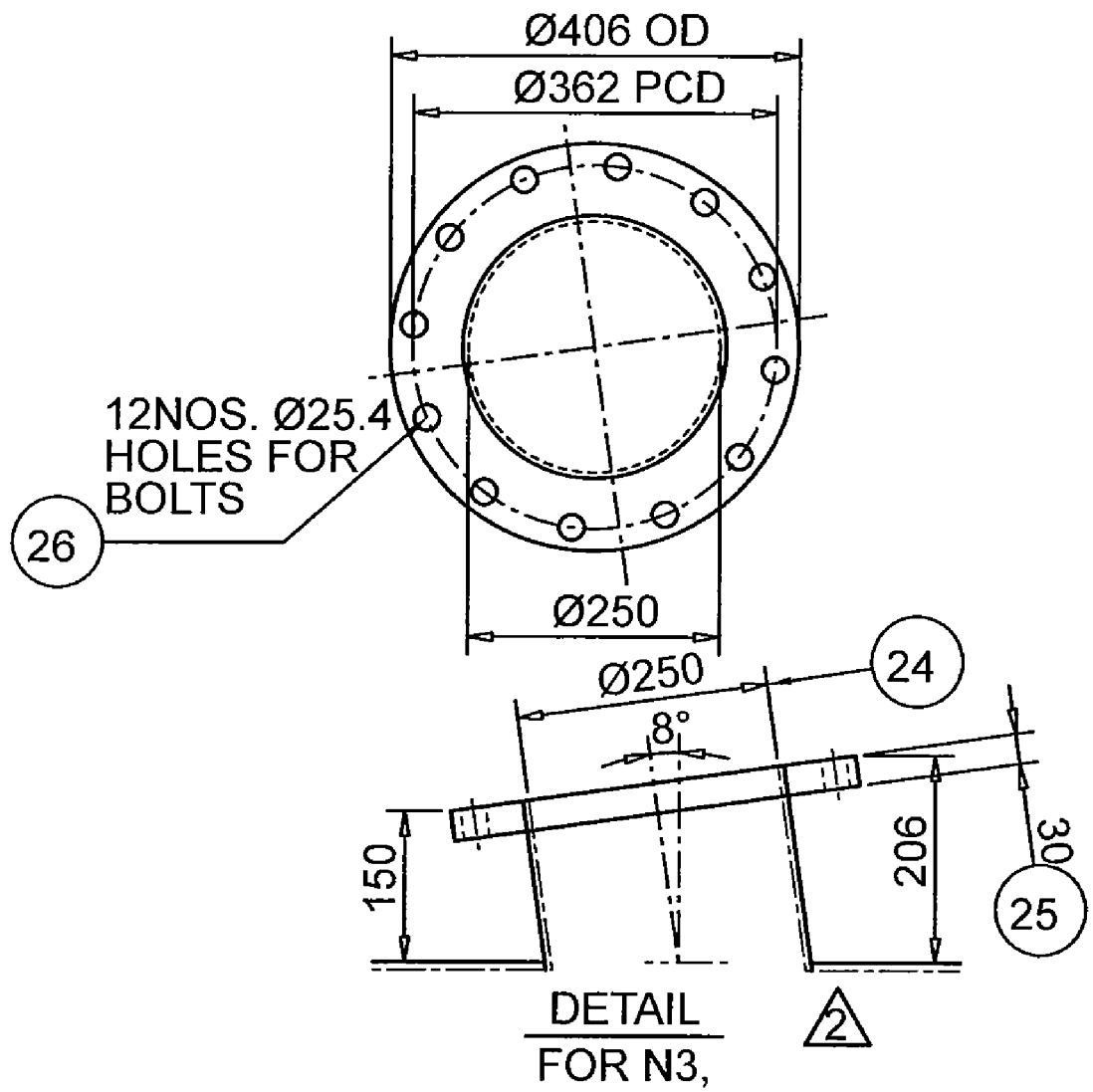
FIG. 28 is a detailed view of a portion of an alternate vessel of a waste treatment system.
Figure 29:
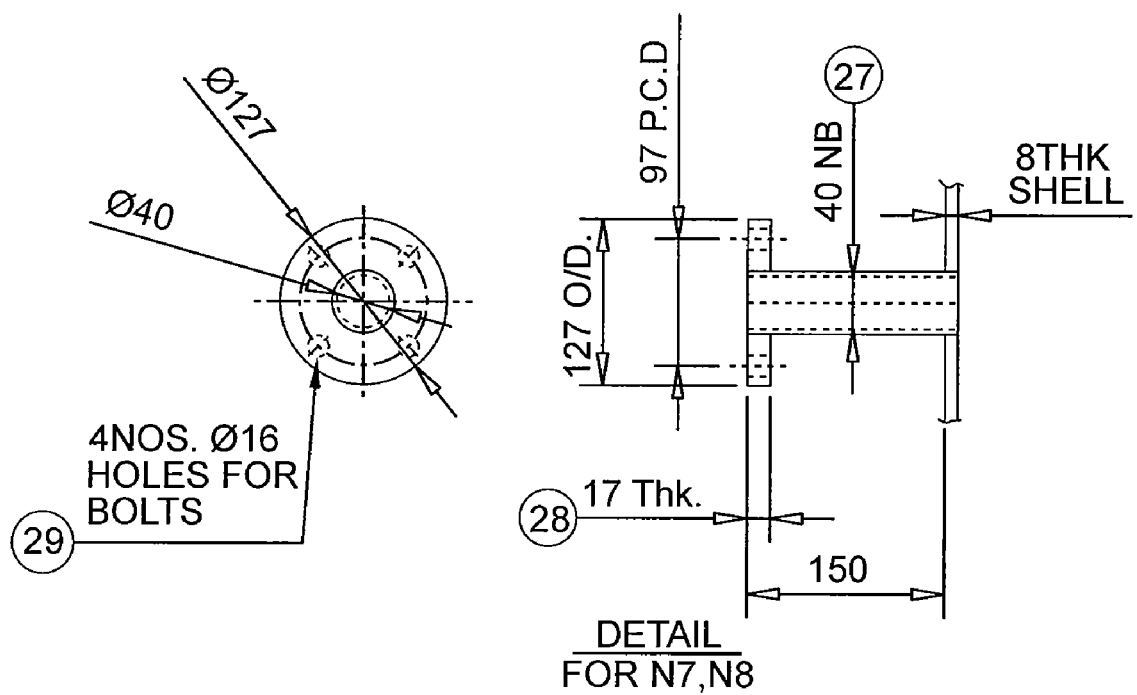
FIG. 29 is a second detailed view of a portion of an alternate vessel of a waste treatment system.
Figure 30:
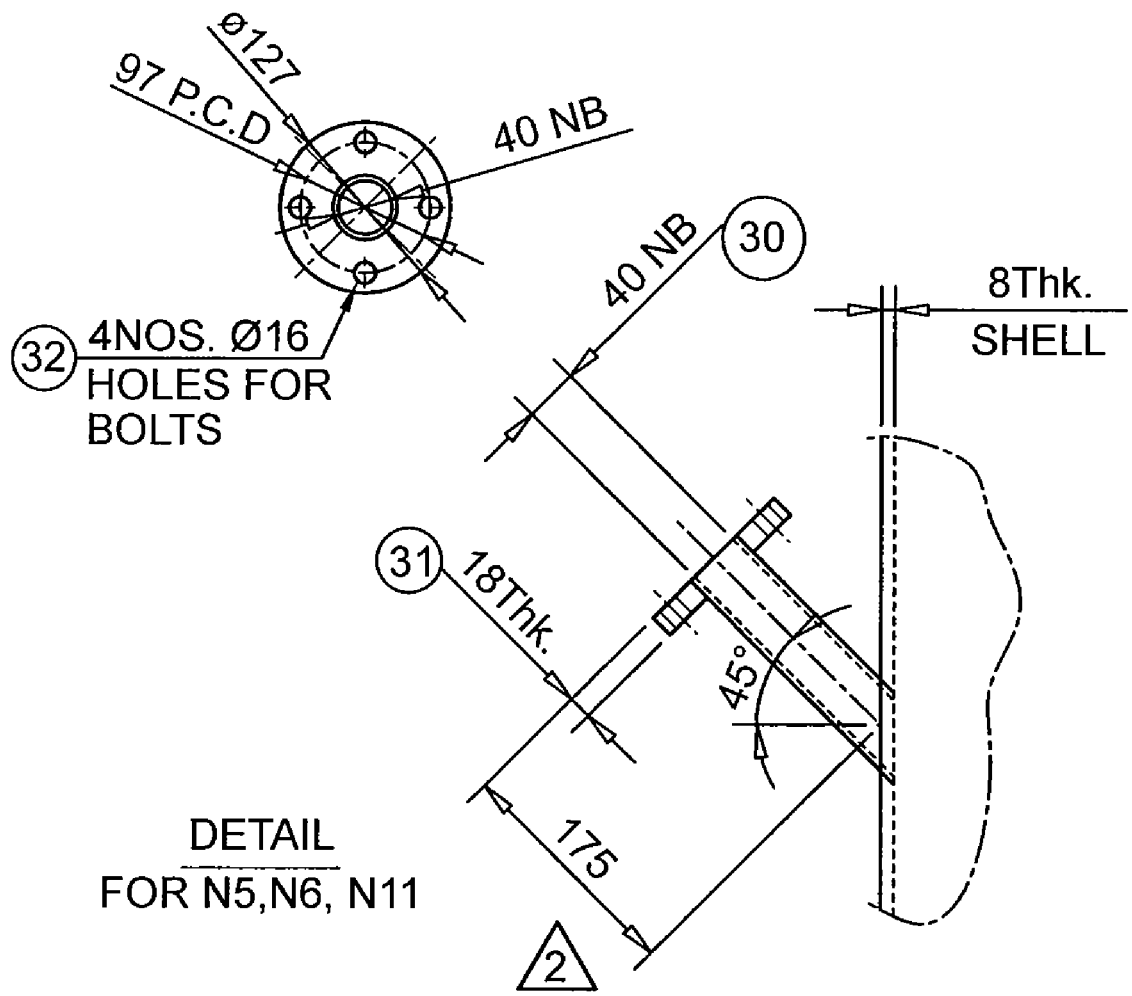
FIG. 30 is a third detailed view of a portion of an alternate vessel of a waste treatment system.
Figure 31:
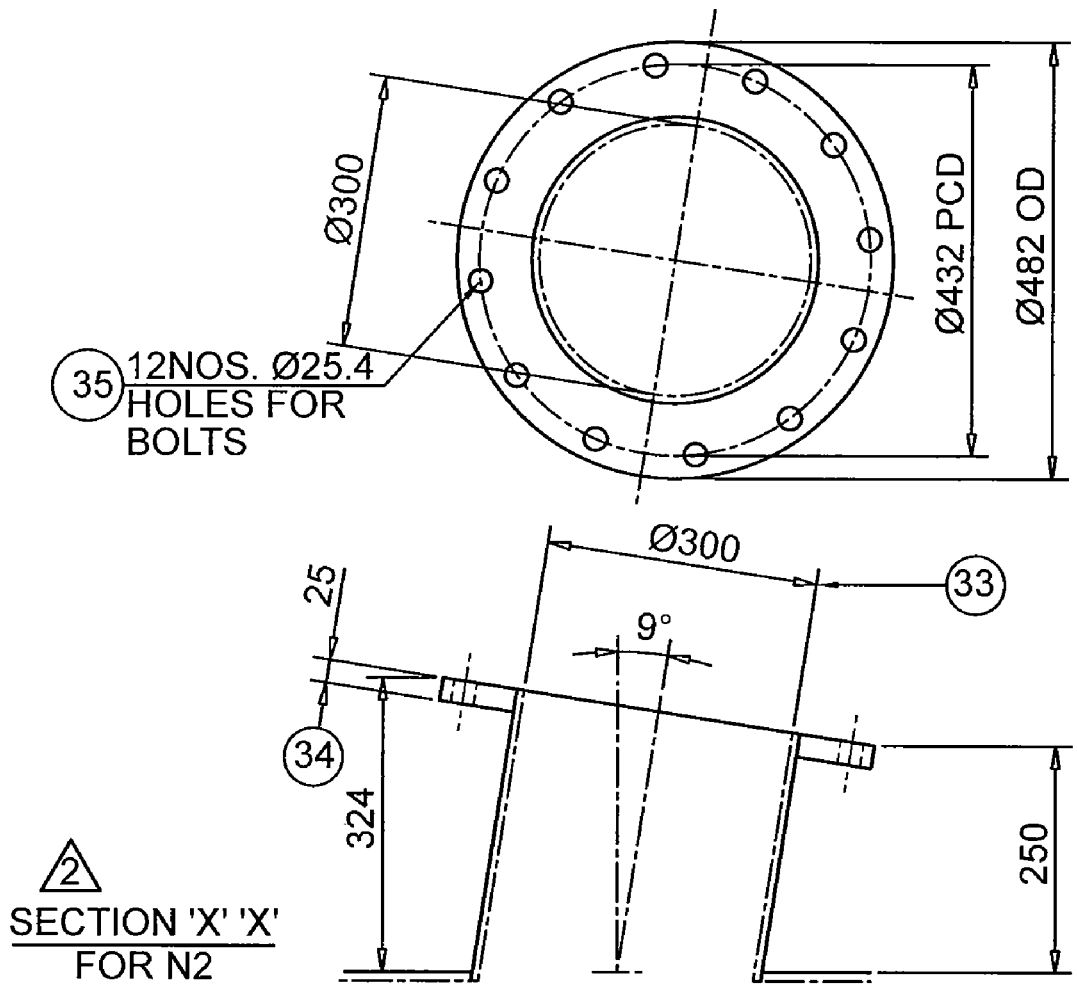
FIG. 31 is a fourth detailed view of a portion of an alternate vessel of a waste treatment system.
Figure 32:
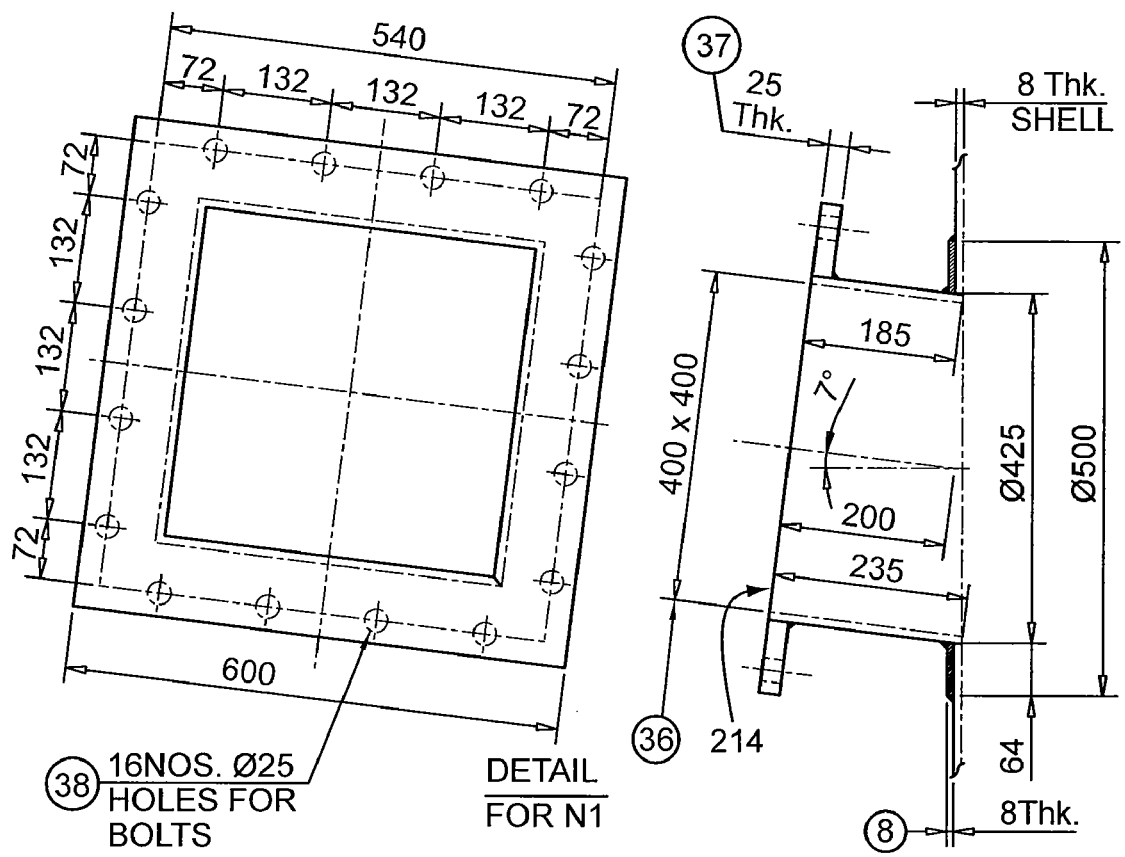
FIG. 32 is a fifth detailed view of a portion of an alternate vessel of a waste treatment system.
Figure 33:
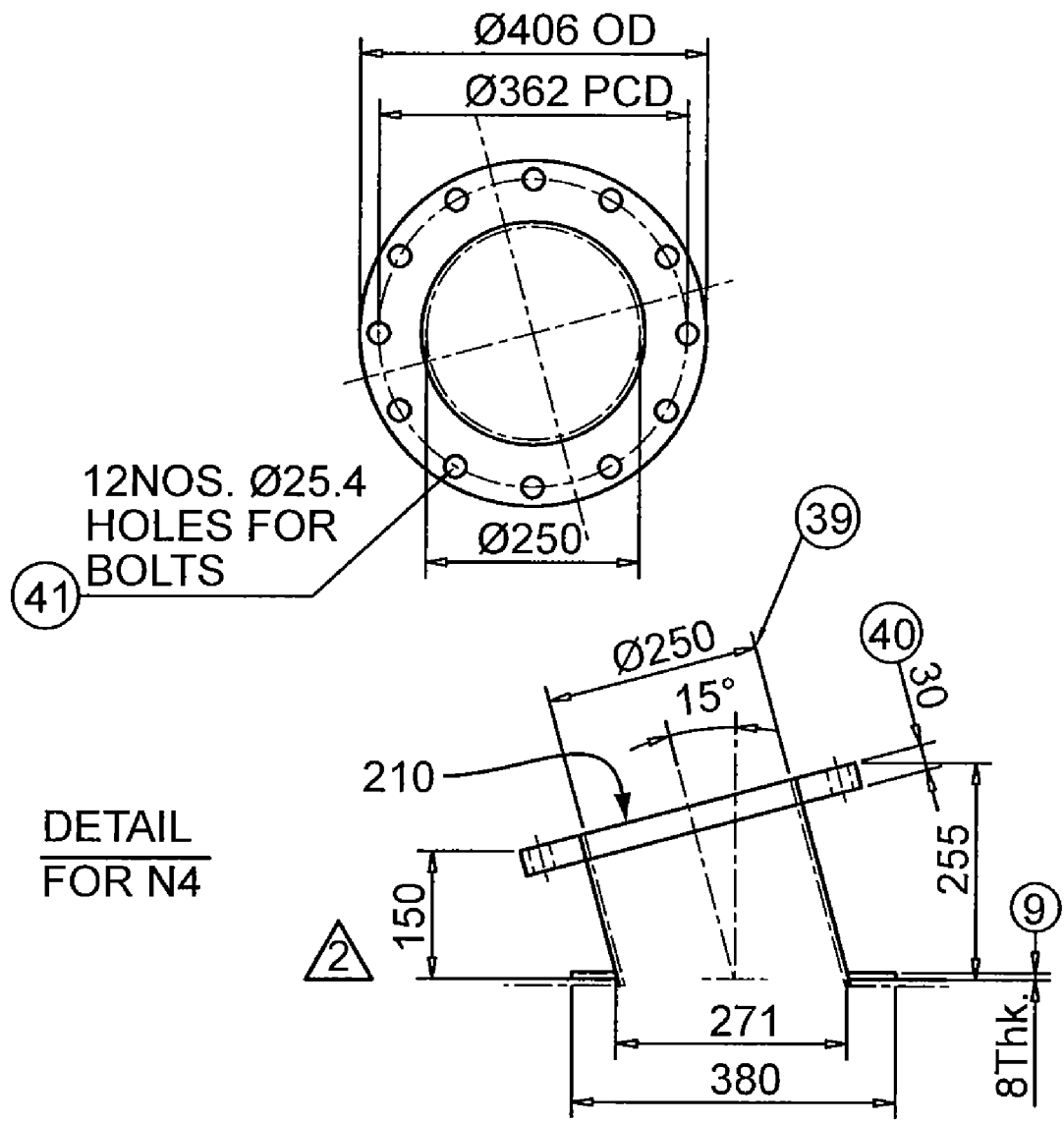
FIG. 33 is a sixth detailed view of a portion of an alternate vessel of a waste treatment system.
Figure 34:
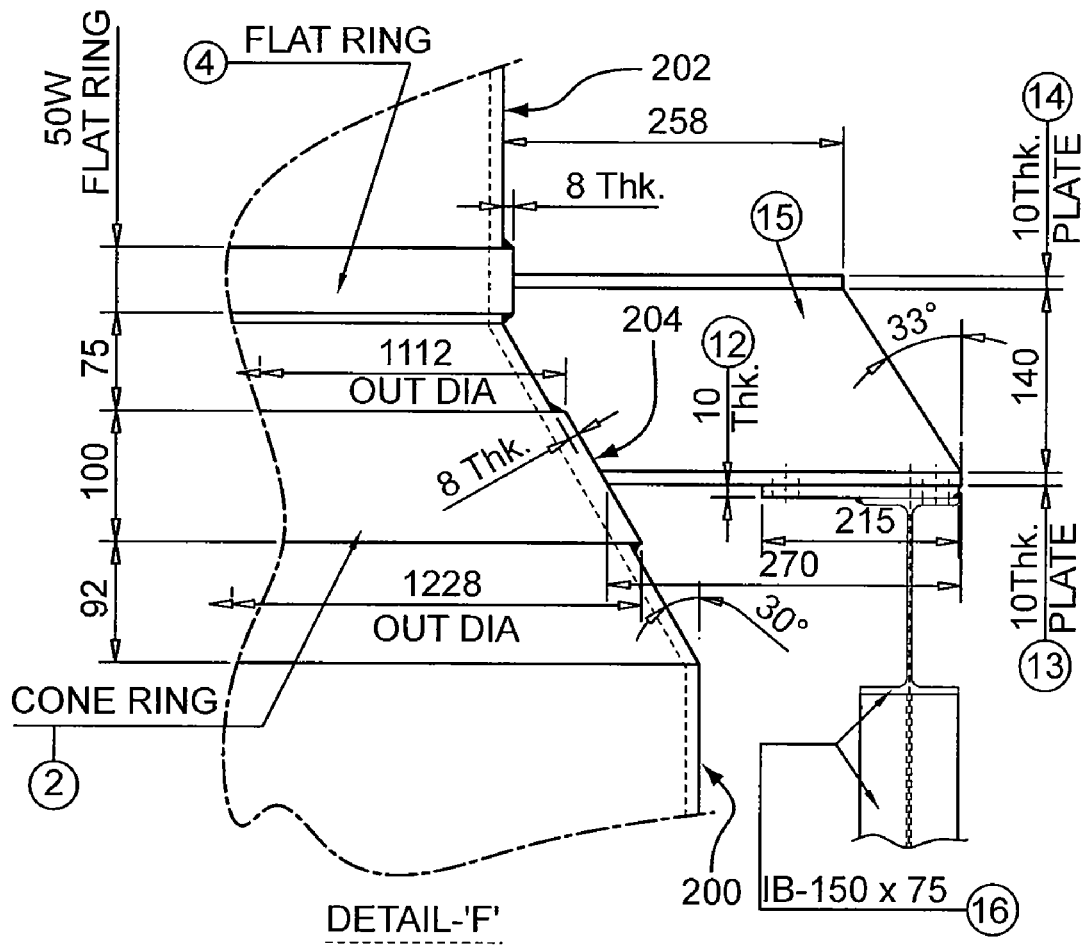
FIG. 34 is a seventh detailed view of a portion of an alternate vessel of a waste treatment system.
Figure 35:
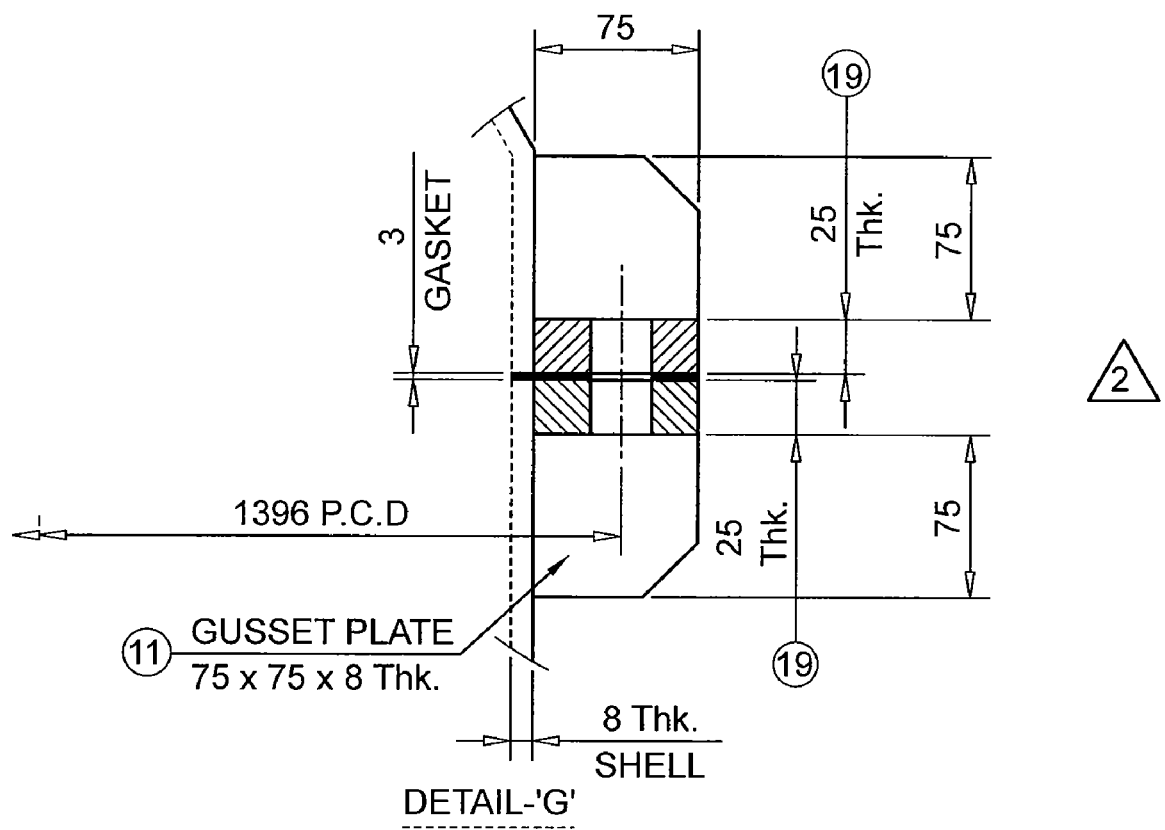
FIG. 35 is an eighth detailed view of a portion of an alternate vessel of a waste treatment system.
Figure 36:
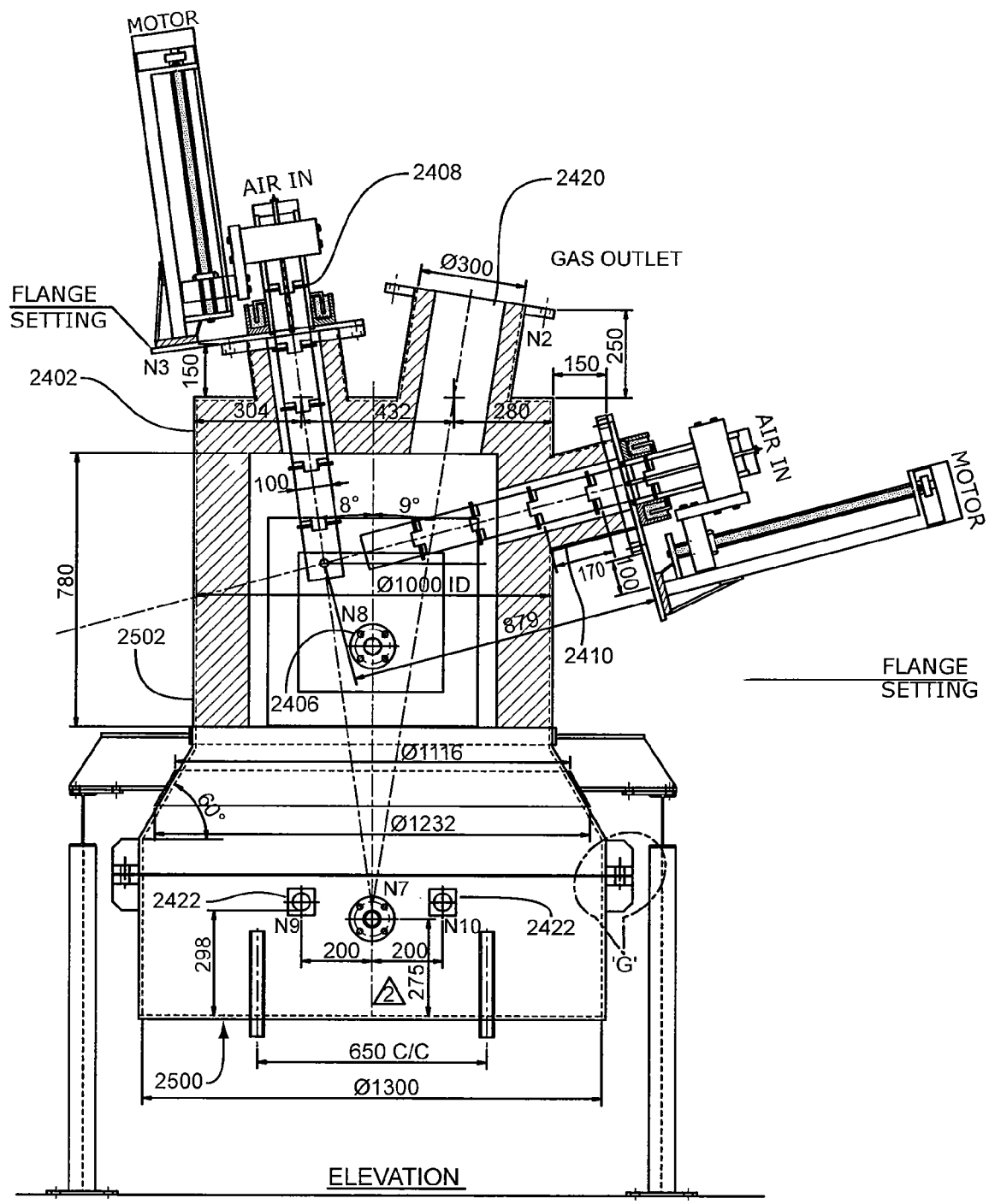
FIG. 36 is a fifth partial view of an alternate vessel of a waste treatment system.

FIG. 26 is a cross-sectional view of the vessel 2402 taken along X-X as shown in FIG. 24. FIG. 27 is an alternate side view of vessel 2402. FIG. 28 is a detailed view of the opening 2408 that receives the transferred-arc electrode, and which shows that this electrode may be positioned at an angle of about 8 degrees to vertical. FIG. 29 is a detailed view of the some of the temperature nozzles 2406 positioned around the vessel 2402. FIG. 30 is a detailed view of the access ports that may be used for view ports 2416 and/or the solvent waste feed nozzle 2418. FIG. 31 is a detailed view of the opening 2420 that may vent off the synthesis gas to the remainder of the waste treatment system. As shown in FIG. 31, the opening 2420 may be at an angle of about 9 degrees to vertical. FIG. 32 is a detailed view of the solid waste feed inlet 2414 on the vessel 2402. In FIG. 32, the solid waste feed inlet 2414 is at an angle of about 7 degrees to horizontal. FIG. 33 is a detailed view of the opening 2410 that may receive the non-transferred-arc electrode. As shown in FIG. 33, the opening 2410 may be at an angle of about 15 degrees to horizontal. FIG. 34 is a detailed view of a frustoconical section 2504 of the vessel 2402 which may connect the lower chamber 2500 and the upper chamber 2502. FIG. 35 is a detailed view of the vessel 2402 where the lower chamber 2500 and the frustoconical section 2504 are coupled/formed together. In FIG. 36 the transferred-arc electrode and non-transferred-arc electrode are placed in the respective openings (2408 and 2410) of the vessel 2402.

The transferred-arc electrode and non-transferred-arc electrode may comprise separate pieces of graphite material that are approximately 450 mm in length and have a main portion that is about 150 mm square. Each portion may have a male extending portion at one end that extends beyond the about 150 mm square portion and a female receiving portion at an opposite end, both of which are configured with threaded connections. To create the electrodes, multiple portions of the separate graphite pieces may be screwed together to form a larger electrode. In some waste treatment systems, a small channel may be drilled and/or formed through the center of the vertical or substantially vertical electrode and/or the horizontal or substantially horizontal electrode to accommodate a small flow of air to act as a plasma carrier gas. In some systems, the amount of air flowing through the channel in the electrode(s) may be about 5 liters per minute. In other systems, the electrodes may be formed into different shapes such as cylindrical, triangular, or other shaped pieces.

The waste treatment system that uses the transferred-arc and non-transferred-arc electrodes may function in different operating modes. The transferred-arc electrode may be mounted through the top of the vessel 2402 vertically or at angle with respect to a center vertical line, such as an angle of about 8 degrees to the vertical. The transferred-arc electrode may be configured to operate as a cathode. A separate graphite anode plate may be positioned at the bottom of the vessel 2402. The anode plate at the bottom of the vessel 2402 may have dimensions of about 300 mm square and be about 100 mm thick at its maximum point. The plate may be shaped such that it will be raised above the refractory lined bottom of the vessel 2402. In some waste treatment systems, the shape of the anode plate may be similar to a truncated cone. Additional graphite anode plates may be positioned at the bottom of the vessel 2402 off-center. These additional anode plates may be connected to the main center anode plate and may radiate outwardly towards the outer portion of the bottom of the vessel 2402. The placement of these additional anode plates allows for the heat generated by the arc between the transferred-arc electrode and the anode plate to be distributed by thermal conduction more thoroughly and uniformly to the rest of the vessel 2402.

The position of the transferred-arc electrode may be such that if it is fully extended, the centerline of the transferred-arc electrode coincides with approximately the center of the vessel 2402 bottom. This position may aid the distribution from the transferred-arc evenly through the bottom mounted graphite plate, the bottom of the vessel 2402, and/or inorganic material resident at the bottom of the vessel 2402.

A non-transferred-arc electrode may comprise the electrode that is inserted from the side of the vessel 2402. The side mounted electrode may be mounted at an angle with respect to a horizontal line bisecting the vessel 2402, such as an angle of about 15 degrees. In the non-transferred-arc mode, the bottom end of the transferred-arc electrode is located at an elevation with the vessel 2402 that is slightly above the top entrance of the waste inlet port, and non-transferred-arc electrode is extended into the vessel 2402 such that the end of this non-transferred-arc electrode is positioned below the end of the transferred-arc electrode. A selected flow of air may be fed through a centerline channel drilled or formed through one or both of the electrodes such that the air is ionized as it passes through the plasma arc crated between the non-transferred-arc electrode and the transferred-arc electrode. The air may enhance the heat distribution of the heat generating system. The location of a plasma plume generated when the electrodes are operating in a non-transferred-arc mode may be located in the general vicinity of the center of the vessel 2402 generally in from the waste feed inlet. In some systems, the plasma plume may further be positioned such that when the waste feedstock is introduced into the vessel 2402 it will not contact the electrodes, thereby avoiding potential damage to the electrodes. Positioning of the transferred-arc electrode and/or the non-transferred-arc electrode may be used to create a turbulent high-heat zone within the vessel 2402. Further, the gap between the transferred-arc electrode and non-transferred-arc electrode may be controlled manually, remote manually, or automatically by the electrode movement control system.

In some waste treatment systems, the transferred-arc and non-transferred arc electrodes may operate at different times in the operating sequence. The transferred-arc electrode may be used, in the transferred-arc mode causing an arc between the transferred-arc electrode and the bottom mounted anode plate, during a start-up sequence to bring the vessel 2002 to an operating temperature between about 1000° C. and about 1400° C. In some instances, the transferred-arc electrode may be used to melt some or all of the inorganic constituents of the waste feedstock. After reaching the operating temperature, waste may be introduced into the system and the transferred-arc electrode may also be used for processing organic waste feedstock, liquid feedstock, and waste containing mixtures of organic and inorganic constituents during feeding operations. The transferred-arc electrode may be retracted upwards and the non-transferred-arc electrode may be moved horizontally into or out of the vessel 2002 such that the position of each may be adjusted depending on the operation mode of the system. Due to the movement of the transferred-arc electrode and the non-transferred-arc electrode, each may be housed within a sealing and insulating assembly. These assemblies may insulate the electrode bodies and maintain the structural elements with a predefined temperature range, and may reduce or avoid the need for additional cooling. In some waste treatment systems, the transferred-arc electrode and/or the non-transferred arc electrode may be repositioned manually, remote manually, and/or with an electrode movement control system. One or more sensors may monitor the position and/or the operating voltage of the one or more electrodes to determine the position within the vessel 2002 during the different operation modes.

The position of the transferred-arc electrode and/or the non-transferred arc electrode may depend on the gap between the electrodes during a particular operating mode. The size of the gap may be selected so that the operation voltage of the plasma torches is substantially maintained at a design level. The design level may be selected based on design considerations of the vessel 102 shape and/or size, and or the transformed power supply. The position of the transferred-arc cathode 110 and/or the transferred arc anode 112 may depend on the gap between the cathode 110 and anode 112 during a particular operating mode. The size of the gap may be selected so that the operation voltage of the plasma torches is substantially maintained at a design level. The design level may be selected based on design considerations of the vessel 102 shape and/or size, and or the transformed power supply. The higher the operating voltage, the larger the gap may be between the electrodes and the lower the operating current. An electrode movement control system may adjust the positioning of the gap between the electrodes. In some systems, the gap may be adjusted based on a voltage output signal from the one or more plasma electrodes. If the voltage drops below a minimum predetermined threshold, the electrode movement control system may automatically increase the gap between the plasma electrodes until the voltage is increased to or above the minimum predetermined threshold range. If the voltage increases above a maximum predetermined threshold, the electrode movement control system may automatically reduce the gap between the plasma electrodes until the voltage is stabilized at the maximum predetermined threshold. In some waste treatment systems 100 that operate with 100 kW power from the plasma electrodes, the gap between the electrodes may be selected so that the operating voltage is approximately 80 to approximately 120 volts. In these systems, the minimum and maximum predetermined thresholds may also be about 100 volts, and the gap between the torch electrodes may be about 10 mm to about 100 mm. The plasma generating system may also be outfitted with a High Frequency igniter that automatically re-establishes an arc from its actual position without the need to reduce the electrode gap.

The gap between the cathode 110 and the anode 112 may be controlled by an electrode movement control system. The electrodes may be positioned based on operator measurements, such as a position with respect to the center line of the vessel 102. As the electrodes are consumed, the electrode movement control system may move the unused portions of one or more of the electrodes into the vessel 102. When a certain amount of one or more of the electrodes is consumed, a replacement length of electrode may be attached to the end of an electrode that is furthest from the center of the vessel 102. The replacement length of electrode may be attached by threading the new portion of electrode length to the existing electrode.

The electrode movement control system may include a mechanical system to control the movement of one or more of the electrodes. In some systems, the mechanical system may include an inching motor and gear mechanism. The electrode movement control system may also include a Supervisory Control and Data Acquisition ("SCADA") system, such as the hardware and software developed and used by PEAT International, Inc. (Northbrook, Ill.) and which is configured to run on a computer utilizing a Windows operating system. The SCADA system may acquire measurement data about the arc voltage and adjust the position of one or more electrodes automatically to obtain a desired arc voltage or temperature within the vessel 102. Alternatively, the position of one or more electrodes may be adjusted manually or remote manually through a motor and gear system to obtain a desired arc voltage or temperature within the vessel 102. In some waste treatment systems, the electrode movement control system may include safety features that prevent movement of the electrodes. In some systems, these safety features may include preventing movement of the electrodes when two or more electrodes are touching one another. In such instances, the movement control system may disable the inching motor until the position of one or more of the electrodes is manually reset by operator action. In other systems, movement of the electrodes may include physical equipment, such as limiting switches, guide pins/tracks, or evaluative software to inhibit movement of one or more electrodes beyond a particular point into or out of the vessel 102.

Control of the gas outlet temperature at the top of the vessel 2002 may be controlled by automatically adjusting the power of the non-transferred arc electrode. The power of the electrodes may be controlled by signals from a gas outlet temperature controller that are provided to a heating system generator panel. In some waste treatment systems, the control signals may be between about 4 milliamps ("mAmp") to about 20 mAmp. Plasma torch control may be accomplished by an interface between the main control system and the plasma power panel. Signals are received from the torch power panel relating to voltage and current. Voltage signals are provided by the torch panel in the range of about 0 to about 300 volts DC. A converter may convert these signals into about a 4 to about 20 mAmp signal. Current provided by the plasma torch panel will be in the range of about 0 to about 1500 Amps. This current signal will be converted, within the plasma torch panel by a "shunt," into about 0 to about 75 mVolts. This about 0 to about 75 mVolt signal may then be converted into about a 4 to about 20 mAmp signal. The voltage and current signals provided by the plasma torch panel allow for the exchange of direct information on voltage, current and power for the plasma torch in the SCADA system. The plasma torch power can be controlled by varying the current supply and the voltage, the voltage is a function of the distance between anode and cathode during arcing. The movement of the electrodes may be controlled manually directly from the torch panel or automatically from the SCADA system.

Figure 37A:
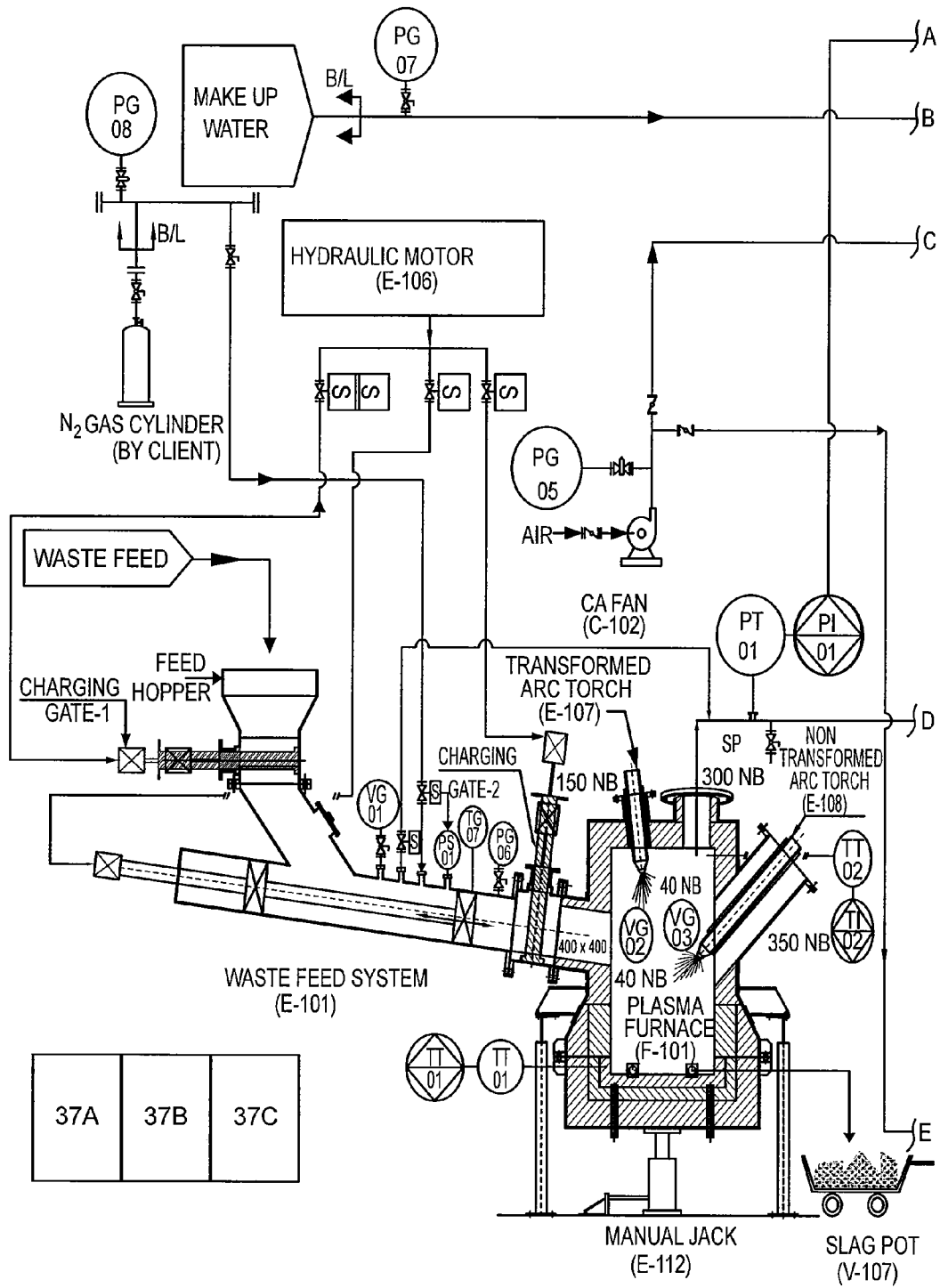
FIGS. 37A-37C are an alternate schematic of a waste treatment system.
Figure 37B:
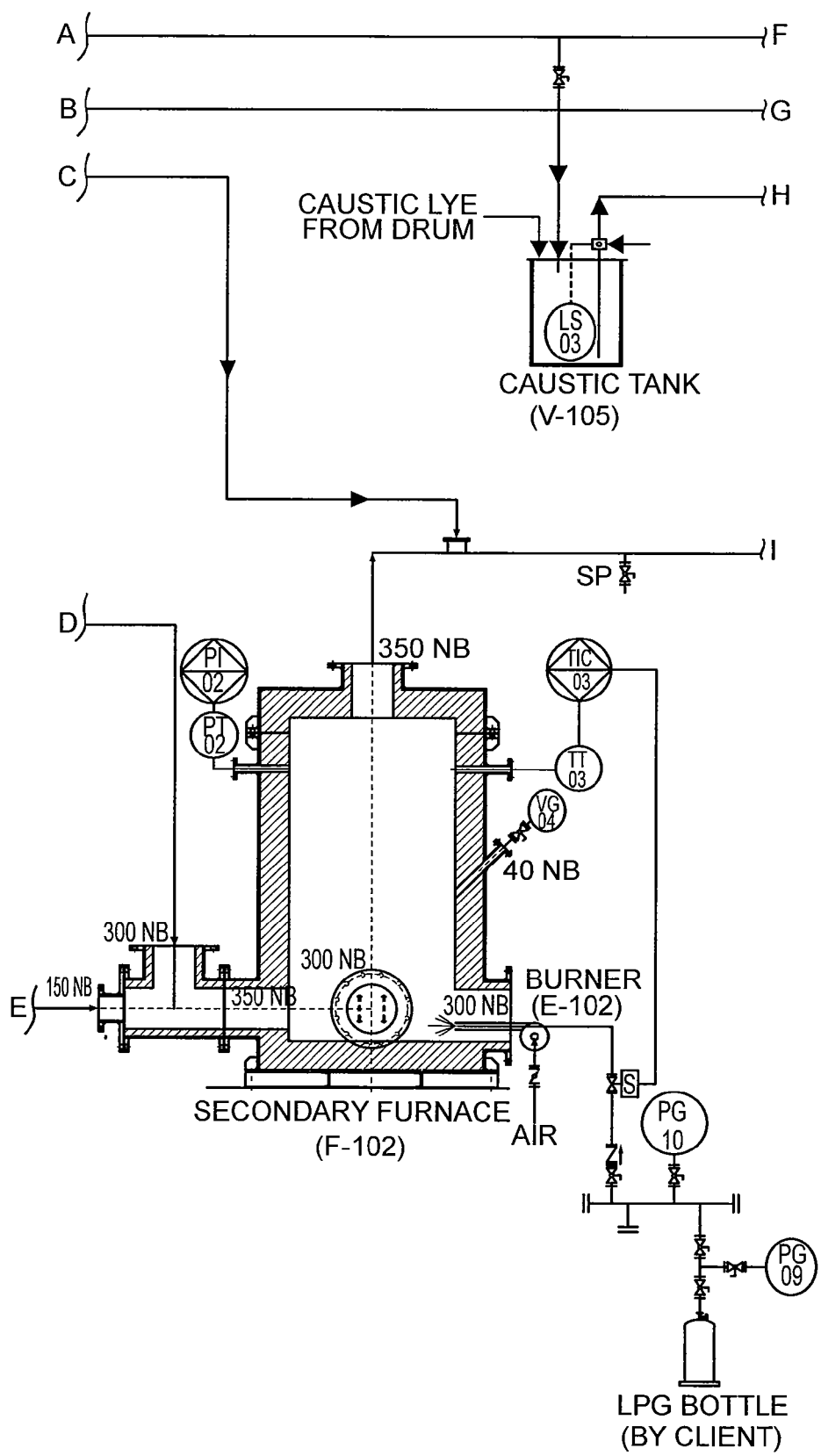
Figure 37C:
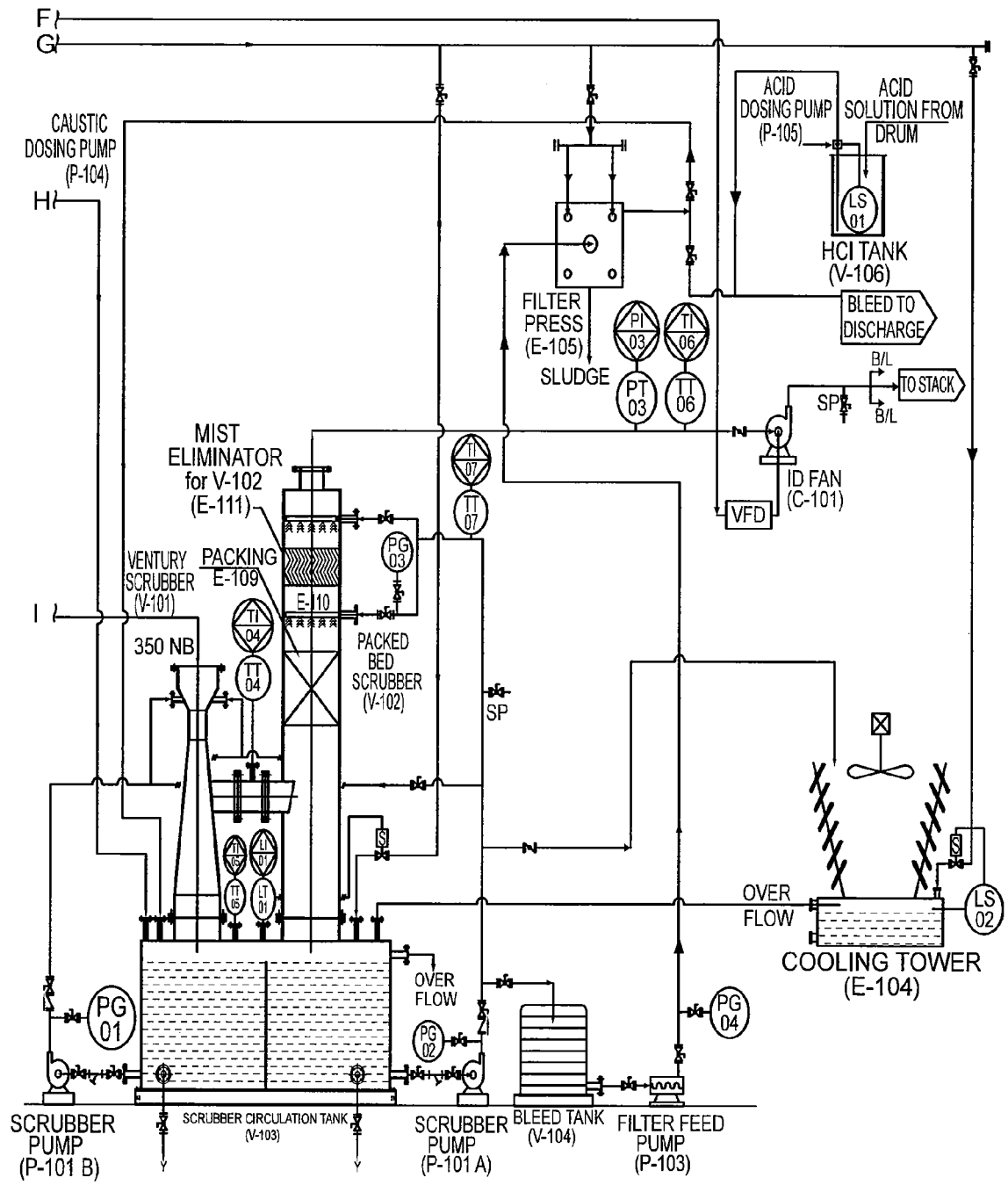

FIGS. 37A-37C are a schematic of a waste treatment system utilizing the vessel 2402 detailed in FIGS. 24-36. A legend is provided on FIG. 37A identifying how FIGS. 37A-37C related to one another. In FIG. 37A, the waste treatment system includes a feeding hopper that is connected with a waste feed system. A first isolation/charging gate may separate the feeding hopper from the waste feed system, and a second isolation/charging gate may separate the waste feed system from the plasma furnace/vessel. In FIG. 37A, the plasma furnace includes a transferred-arc electrode and a non-transferred-arc electrode, as explained above. The plasma furnace may be supported by a frame and/or a manual or automated hydraulic jacking system. Slag produced in the plasma furnace may be drained through one or more tapping ports into a slag pot, water tank, sand mold, and/or other contain capable of receiving the slag. Gas produced in the plasma furnace may flow to a secondary furnace before processing by gas cleaning and conditioning system. In FIG. 37C, the gas cleaning and conditioning system includes a venturi scrubber, packed bed scrubber, mist elevator, and scrubber circulation tank. Scrubber pumps may be used to circulate water or other solutions to the venturi scrubber and/or mist elevator. A bleed tank may be used to monitor that quality of water circulated to the gas cleaning and conditioning system. A cooling tower may supply water to the scrubber circulation tank. An ID fan may be used to pass cleaned and conditioned gas to a syngas utilization system where the syngas may be used for energy production. When the syngas utilization system is not available, however, the synthesis gas will be thermally oxidized (into CO2, H2O, N2 and O2) through the addition of excess air in the secondary reaction chamber. After undergoing cleaning and conditioning in the venturi scrubber and the packed bed tower, the ID fan will convey the thermally oxidized gas to a stack for discharge.

Figure 38:
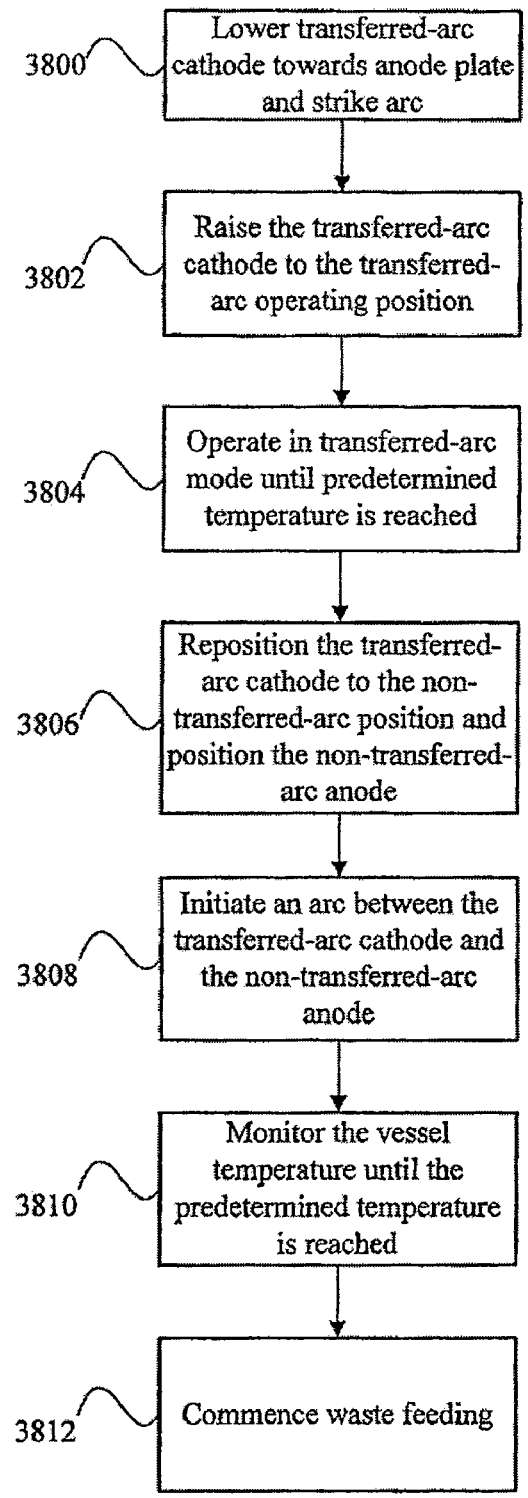
FIG. 38 is a flow chart of a method of preheating an alternate vessel of a waste treatment system.

FIG. 38 is a method of preheating the vessel 2402 from a cold condition where the vessel 2402 is empty of waste feedstock. At act 3800, the transferred-arc electrode is lowered towards the anode plate at the bottom of the vessel 2402 where an arc is struck. In some waste treatment systems, the arc may be struck with the assistance of an igniter when the transferred-arc electrode is within about 10 mm of the anode at the bottom of the vessel 2402. A protection circuit may be provided within the power supply 132 to shut of the system if a short circuit exists because the transferred-arc electrode and the anode plate are in direct contact. This shut off system may be engaged if there exists direct contact between the transferred-arc electrode and the anode plate for longer than a programmed time period, such as about 3 seconds. Once the arc is struck, the transferred-arc electrode is raised to a transferred-arc operating position at act 3802. In some waste treatment systems, this position may be approximately 25 mm above the anode electrode. The transferred-arc electrode may be operated at this position until the vessel 2402 reaches a predetermined temperature at act 3804. In some waste treatment systems, this temperature may be about 1000° C. At act 3806, the transferred-arc electrode may be retracted to the non-transferred-arc position, and the non-transferred-arc electrode may be moved into position within the vessel 2402. In some waste treatment systems, the position of the transferred-arc electrode at act 3806 may be slightly above the upper portion of the solid waste feed inlet, and the end of the non-transferred-arc electrode within the vessel 2402 may be positioned below the transferred-arc electrode. At act 3808 an arc between the transferred-arc electrode and the non-transferred-arc anode is initiated. At act 3610, the temperature within the vessel 2402 is monitored until a predetermined value is reached. The predetermined temperature may be between a range of about 600° C. and about 800° C. At act 3812, once the predetermined temperature of act 3610 has been reached, waste feeding operations may commence.

Figure 39:
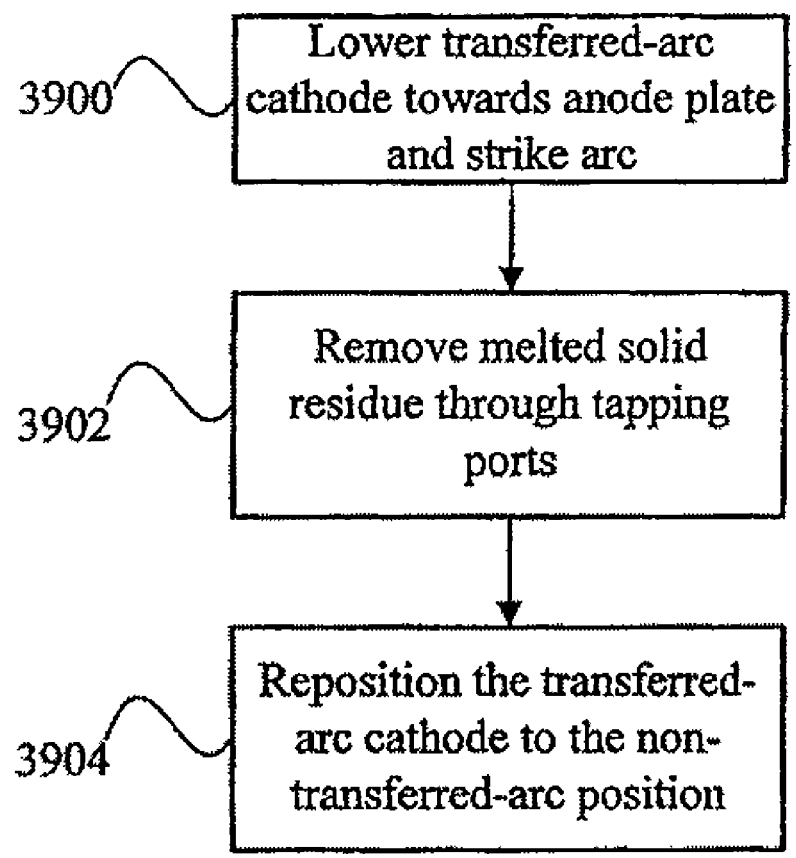
FIG. 39 is flow chart of an alternate method of inorganic residue melting of a waste treatment system.

FIG. 39 is a method of inorganic residue melting. The inorganic residue melting process may be used when the vessel 2402 contains solid residue from a previous operation. The inorganic residue melting operation may help to minimize wear on the electrodes, minimize energy consumption, and/or optimize operational time. At act 3900, the transferred-arc electrode is lowered toward the anode plate at the bottom of the vessel 2402 where an arc is struck. The transferred-arc electrode may be operated in this position until the temperature within the vessel 2402 reaches a predetermined temperature, such as about 1400° C. The transferred-arc electrode may be operated in this mode until substantially all of the inorganic solid residue within the vessel 2402 has melted. At act 3902, the melted solid residue may be removed from the vessel 2002 through one or more tapping ports.

Figure 40:
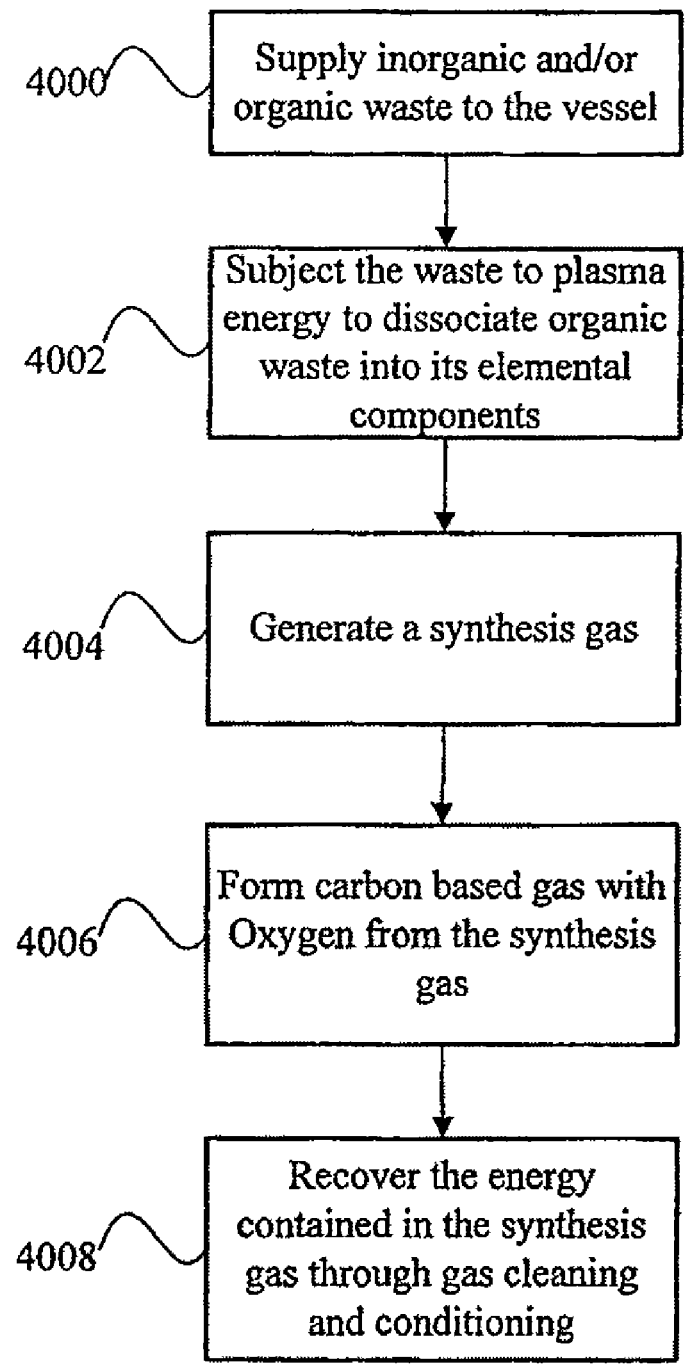
FIG. 40 is an alternate flow chart of processing waste with a waste treatment system.

FIG. 40 is a method of processing inorganic and organic waste. At act 4000, inorganic and organic waste may be supplied to the vessel 2402. The organic waste may be provided in the form of atomized liquid waste. Atomized liquid waste may be injected into the vessel 2402 by one or more air-atomizing nozzles. Alternatively, organic waste may be extracted from solid waste that has been subjected to the energy of the arc electrodes. Also at act 4000, inorganic and/or organic waste may be supplied to the vessel 102 through the waste feed chamber and the waste feed inlet 2414.

At act 4002, the waste may be subjected to the energy of the transferred-arc electrode and the non-transferred-arc electrode until the organic waste is gasified and substantially dissociates into its elemental components. The elemental components of organic waste may include solid carbon (carbon particulate), hydrogen gas, nitrogen, and/or halogens. In some waste treatment systems, the gasified organic waste may be subjected to the energy of the heating system for a predetermined residence time, such as about 2.0 seconds. The gasified organic waste may traverse a cyclonic or substantially cyclonic path while in the vessel 2402. In addition to the gasified organic waste becoming dissociated as a result of the supplied energy, some of the gasified organic waste may become dissociated as a result of its cyclonic or substantially cyclonic movement. As the gasified organic waste moves within the vessel 2402, some of the gasified organic waste particles may collide with other gasified organic waste and/or the sides of the vessel which may result in dissociation.

At act 4004, oxygen may be added to the elemental components to generate a synthesis gas. At act 4006, the oxygen may combine with some of the elemental components to form carbon monoxide gas and/or carbon dioxide gas.

At act 4008, the energy contained in the synthesis gas may be recovered, such as to form steam, hot water for commercial uses or used in an especially formulated gas-engine to produce electric power. The synthesis gas may be cooled prior to entering the secondary reaction chamber. The cooled gas may then be conditioned, cleaned, and/or made ready for commercial use.

As the temperature within vessel increases, the contents, such as air; waste; and/or particulates, within vessel 2402 may undergo movement as a result of general physics principles. As the contents within vessel 2402 moves, the contents may encounter boundaries resulting from the shape of the generally cylindrical or frustoconical section 2504 of the vessel 2402. The shape of the vessel and the location of the syngas exhaust nozzles may facilitate a turbulent/cyclonic or substantially turbulent/cyclonic flow of the contents within the vessel 2402. The positioning of one or more of the plasma electrodes may enhance the turbulent/cyclonic or substantially turbulent/cyclonic flow within the vessel 2402. The turbulent/cyclonic or substantially turbulent/cyclonic flow within vessel 2402 may increase the amount of time (e.g., residence time) that the synthesis gas and some or substantially all of the entrained particulate may remain within turbulent region. Additionally, the turbulent/cyclonic or substantially turbulent/cyclonic flow may facilitate the movement of the synthesis gas and some or substantially all of the particulate into the upper reaction chamber 2502.

In some waste treatments systems described above, operational temperatures within the vessel may be obtained in approximately 60 to approximately 90 minutes, and the system may cool down automatically after the heating system is shutdown.

Tables 1-6 are exemplary operation design parameters that may be used with the waste treatment system 100. However, other operations and/or configurations may be realized.

TABLE 1

Utilities and Consumables

Liquefied petroleum gas or natural gas: about 1.5 liters per hour
Electrical: about 130 KW, about 380 to about 415 volts, 3-Phase
Water: about 12 liters per minute
Sodium Hydroxide: about 0.65 to about 1.35 kg/hr (depending on the water composition)

TABLE 2

Waste Stream Flexibility

Biomedical wastes, including infectious, pathological, chemo
Universal and/or industrial waste streams such as batteries and/or electronic waste, solvents, and/or sludges
Contaminated soils
Incinerator fly ash

TABLE 3

Efficiency

Approximately 60 kg/hr capacity occupying less than about 50 square meters which may be positioned on two about 10 m × about 2 m skids with a high point of about 4.5 meters
Capability to operate approximately 24 hours per day
Fast heat-ups to a predetermined temperature between about 1,000° C. and about 1,400° C., and natural cool downs
Automated process control allows the system to be operated by a single trained operator (supported part-time by field personnel
Capable of processing nearly all types of solid feedstack.

TABLE 4

Economics

Installed capital cost may cost less than $0.08 per kilogram 10-year amortization)
Operations and maintenance costs as low as $0.29 per kilogram
System investment generates a favorable net-present value with low payback periods, based on existing market prices, industry dynamics, and metrics

TABLE 5

Environmental

Emissions are below the requirements of 40 CFR part 60, subpart FFFF and/or 40 CFR part 60, subpart Ec (US Environmental Protections Agency)
Substantially no secondary pollution or by-products are generated - all of the feedstock may be 100% waste
May eliminate future liabilities to the generators resulting from the use of outside collection, treatment, and disposal services that are potentially unscrupulous
A high volume (over about 200 to about 1) and weight (over about 10 to about 1) reductions
High destruction and removal efficiencies ("DRE's") of organic materials (greater that about 99.99999%)
Non-leaching of glass products produced by the waste treatment system
Alternative energy recover options provides a valuable source of alternative energy of approximately 200,000 kcal/hr

TABLE 6

Typical Outputs

About 5 kilograms per hour of glass matrix
About 750 Nm$^3$/hr of clean gas
About 4 m3/day or approximately 45 gallons/hour of water discharge, of which less than about 2% is salt

TABLE 7

| No. | Description | Size | Unit Wt. (kg) | Qnty Wt. (kg) | Quantity |
|---|---|---|---|---|---|
| 1 | Bottom Shell | 4085 L × 750 W × 8 Thk. | 193 | 193 | 1 |
| 2 | Bottom Closer | 1316 Ø × 8 Thk. | 86 | 86 | 1 |
| 3 | Body Flanges | 1316 ID × 1470 OD × 25 Thk. | 67 | 134 | 2 |
| 4 | Pipe | 300 NB × 100 L × Sch40 | 8 | 16 | 2 |
| 5 | Flange | 316 ID × 482 OD × 25 Thk. | 25 | 50 | 2 |
| 6 | Gusset Plate | 75 × 75 × 8 Thk. | 0.35 | 9 | 24 |
| 7 | Gasket | 1466 OD × 1316 ID × 3 Thk. | — | — | 1 |
| 8 | Nut and Bolt | M24 × 100 LG | — | — | 24 |
| 9 | Top Shell | 4085 L × 1360 W × 9 Thk. | 350 | 350 | 1 |
| 10 | Top Closer | 1316 Ø × 8 Thk. | 86 | 86 | 1 |
| 11 | Padding Plate | 200 × 200 × 8 Thk. | 3 | 12 | 4 |
| 12 | Base Plate | 150 × 150 × 10 Thk. | 2 | 8 | 4 |
| 13 | Plat for Lugs | 275 × 150 × 10 Thk. | 3 | 12 | 4 |
| 14 | Plate for Lugs | 260 × 150 × 10 Thk. | 2.5 | 10 | 4 |
| 15 | Plate for Lugs | 170 × 150 × 10 Thk. | 2 | 16 | 8 |
| 16 | ISMB 150 | 150 NB × 10175 LG | 15 | 153 | 1 |
| 17 | Base Plate for Lugs | 200 × 200 × 10 Thk. | 3.15 | 13 | 4 |
| 18 | Foundation Bolt | M22 × 50 LG | — | — | 16 |
| 19 | Padding Plate | 500 × 500 × 8 Thk. | 16 | 16 | 1 |
| 20 | Pipe | 250 NB × 200 LG | 17 | 17 | 1 |
| 21 | Flange | 260 ID × 406 OD × 25 Thk. | 16.5 | 16.5 | 1 |
| 22 | Nut and Bolt | M22 × 75 LG | — | — | 20 |
| 23 | Pipe | 40 NB × 150 LG | 0.6 | 0.6 | 1 |
| 24 | Flange | 50 ID × 127 OD × 17 Thk. | 1.4 | 1.4 | 1 |
| 25 | Nut and bolt | M12 × 50 LG | — | — | 4 |
| 26 | Pipe | 40 NB × 175 LG | 0.6 | 1.8 | 3 |
| 27 | Flange | 50 ID × 127 OD × 17 Thk. | 1.4 | 5.6 | 4 |
| 28 | Nut Bolt | M12 × 50 LG | — | — | 8 |
| 29 | Pipe | 350 NB × 525 LG | 29 | 29 | 1 |
| 30 | Flange | 324 ID × 483 OD × 25 Thk. | 25 | 25 | 1 |
| 31 | Nut and Bolt | M22 × 100 LG | — | — | 12 |
| 32 | Pipe | 400 SQ × 235 LG | 24 | 24 | 1 |
| 33 | Flange | As Shown × 25 Thk. | 37 | 37 | 1 |
| 34 | Nut and bolt | M22 × 100 LG | — | — | 12 |
| 35 | Nut and Bolt | M25 × 100 LG | — | — | 24 |
| 36 | Pipe | 150 Ø × 275 LG | 8 | 8 | 1 |
| 37 | Flange | 150 ID × 279.4 OD × 25 Thk. | 9 | 9 | 1 |
| 38 | Nut and Bolt | M20 × 100 LG | — | — | 8 |
| 39 | Pipe | 200 Ø × 250 LG | 2 | 2 | 1 |
| 40 | Flange | 221.5 ID × 343 OD × 25 Thk. | 12 | 12 | 1 |

TABLE 8

| No. | Description | Size | Unit Wt. (kg) | Qnty Wt. (kg) | Quantity |
|---|---|---|---|---|---|
| 1 | Bottom Shell | 1300 ID × 400 Lg × 8 Thk. | 103 | 103 | 1 |
| 2 | Cone | As shown × 8 Thk. | 31 | 31 | 1 |
| 3 | Cone Ring | As shown × 8 Thk. | 26.5 | 26.5 | 1 |
| 4 | Flat Ring | As shown × 8 Thk. | 13 | 13 | 1 |
| 5 | Shell | 1000 ID × 990 Lg × 8 Thk. | 198 | 198 | 1 |
| 6 | Top Cover | Ø 1016 × 8 Thk. | 51 | 51 | 1 |
| 7 | Bottom Cover | 1316 ID × 8 Thk. | 85 | 85 | 1 |
| 8 | Padding Plate | 500 × 500 × 8 Thk. | 5 | 5 | 1 |
| 9 | Padding Plate | 380 OD × 270 ID × 8 Thk. | 3.5 | 3.5 | 1 |
| 10 | Padding Plate | 75 × 75 × 8 Thk. | 0.35 | 0.7 | 2 |
| 11 | Gusset Plate | 150 × 150 × 10 Thk. | 0.35 | 9 | 24 |
| 12 | Base Plate | 260 × 150 × 10 Thk. | 2 | 8 | 4 |
| 13 | Plate | 275 × 150 × 10 Thk. | 3 | 12 | 4 |
| 14 | Plates | 260 × 150 × 10 Thk. | 3 | 10 | 4 |
| 15 | Plate | As shown × 10 Thk. | 6.25 | 50 | 8 |
| 16 | ISMB 150 | 150 NB × 10175 LG | 15 | 153 | 1 |
| 17 | Pipe | 40 NB × 300 LG | 1.25 | 5 | 4 |
| 18 | Base Plate | 200 × 200 × 10 Thk. | 3.15 | 13 | 4 |
| 19 | Main Flange | 1466 OD × 1316 ID × 25 Thk. | 6416 | 128 | 2 |
| 20 | Gasket | 1466 OD × 1316 ID × 3 Thk. | — | — | 1 |
| 21 | Nut and Bolt | M24 × 100 LG | — | — | 24 |
| 22 | Foundation bolt | M22 × 50 LG | — | — | 16 |
| 23 | Shell | 40 NB × 11300 ID × 100 Lg × 8 Thk. | 26 | 26 | 1 |
| 24 | Pipe | 250 NB × 200 LG | 12 | 12 | 1 |
| 25 | Flange | 260 ID × 406 OD × 25 Thk. | 16.5 | 16.5 | 1 |
| 26 | Nut and bolt | M20 × 75 LG | — | — | 12 |
| 27 | Pipe | 40 NB × 150 LG | 0.6 | 1.2 | 2 |
| 28 | Flange | 50 ID × 127 OD × 17 Thk. | 1.4 | 2.8 | 2 |

TABLE 8-continued

| No. | Description | Size | Unit Wt. (kg) | Qnty Wt. (kg) | Quantity |
|---|---|---|---|---|---|
| 29 | Nut Bolt | M12 × 50 LG | — | — | 8 |
| 30 | Pipe | 40 NB × 175 LG | 0.6 | 1.8 | 3 |
| 31 | Flange | 50 ID × 127 OD × 17 Thk. | 1.4 | 4 | 3 |
| 32 | Nut and Bolt | M12 × 50 LG | — | — | 12 |
| 33 | Pipe | 300 NB × 320 LG | 2524 | 25 | 1 |
| 34 | Flange | 324 ID × 483 OD × 25 Thk. | 25 | 25 | 1 |
| 35 | Nut and bolt | M22 × 100 LG | — | — | 12 |
| 36 | Pipe | 400 SQ × 235 LG | 24 | 24 | 1 |
| 37 | Flange | As shown × 25 Thk. | 37 | 37 | 1 |
| 38 | Nut and Bolt | M20 × 100 LG | — | — | 16 |
| 39 | Pipe | 250 ID × 200 LG × 8 Thk. | 12 | 12 | 1 |
| 40 | Flange | 260 ID × 406 LG × 25 Thk. | 16 | 16 | 1 |
| 41 | Nut and Bolt | M25 × 100 LG | — | — | 12 |

While various embodiments of the invention have been described, it will be apparent to those of ordinary skill in the art that many more embodiments and implementations are possible within the scope of the invention. Furthermore, while various dimensions are described in the specification and/or figures, these dimensions are exemplary values. It is contemplated that larger or smaller dimensions may be employed within the scope of the invention. Accordingly, the invention is not to be restricted except in light of the attached claims and their equivalents.

We claim:

1. A waste treatment system, comprising:
a vessel, the vessel having an open space that receives waste feedstock;
at least two plasma electrodes, each extending into the vessel; and
an electrode movement control system that is configured to automatically move along different axes a first plasma electrode and a second plasma electrode, from the at least two plasma electrodes, a distance mart from each other to produce a substantially constant temperature within the open space of the vessel to facilitate a pyrolysis process to treat the waste feedstock.

2. The system of claim 1, further comprising a waste feed system coupled to the vessel.

3. The system of claim 2, where the waste feed system comprises a solid waste feed system.

4. The system of claim 2, where the waste feed system comprises a liquid waste feed system.

5. The system of claim 1, where one of the at least two plasma electrodes is mounted through a top of the vessel.

6. The system of claim 1, where one of the at least two plasma electrodes is mounted through a side of the vessel.

7. The system of claim 1, further comprising a secondary chamber where synthesis gas output by the vessel is transformed into nitrogen, oxygen, carbon dioxide, or water vapor.

8. The system of claim 1, where the electrode movement control system is further configured to adjust the distance between the first plasma electrode and the second plasma electrode when an operation voltage between the first plasma electrode and the second plasma electrode fluctuates beyond a predetermined threshold band.

9. The system of claim 8, where the distance between the first plasma electrode and the second plasma electrode comprises a range between about 10 millimeters to about 75 millimeters.

10. The system of claim 8, where the predetermined threshold of operation voltage comprises a value between about 80 volts to about 120 volts.

11. The system of claim 1, where the first plasma electrode and the second plasma electrode produce heat to dissociate organic molecules of the waste feedstock into elemental components.

12. The system of claim 11, where the vessel comprises a reduced atmosphere as compared to a secondary chamber, positioned downstream of the vessel.

13. The system of claim 1, where the first plasma electrode and the second plasma electrode produce heat to melt inorganic constituents of the waste feedstock.

14. The system of claim 1, where the at least two plasma electrodes comprise graphite.

15. The system of claim 1, where the electrode movement control system is further configured to independently move the first plasma electrode and the second plasma electrode.

* * * * *

UNITED STATES PATENT AND TRADEMARK OFFICE
CERTIFICATE OF CORRECTION

PATENT NO. : 8,252,244 B2  
APPLICATION NO. : 12/364613  
DATED : August 28, 2012  
INVENTOR(S) : Jose A. Capote et al.

Page 1 of 1

It is certified that error appears in the above-identified patent and that said Letters Patent is hereby corrected as shown below:

In the Claims

In column 29, claim 1, line 37, after "plasma electrodes, a distance" replace "mart" with --apart--.

Signed and Sealed this  
Twenty-fifth Day of December, 2012

David J. Kappos  
*Director of the United States Patent and Trademark Office*